(12) United States Patent
Jia et al.

(10) Patent No.: US 10,917,175 B2
(45) Date of Patent: Feb. 9, 2021

(54) SYSTEMS AND METHODS FOR FULL DUPLEX COHERENT OPTICS

(71) Applicant: CABLE TELEVISION LABORATORIES, INC, Louisville, CO (US)

(72) Inventors: Zhensheng Jia, Superior, CO (US); Luis Alberto Campos, Superior, CO (US); Jing Wang, Broomfield, CO (US); Mu Xu, Broomfield, CO (US); Haipeng Zhang, Broomfield, CO (US); Curtis Dean Knittle, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 16/676,295

(22) Filed: Nov. 6, 2019

(65) Prior Publication Data

US 2020/0076508 A1     Mar. 5, 2020

Related U.S. Application Data

(63) Continuation-in-part of application No. 16/543,509, filed on Aug. 16, 2019, which is a continuation-in-part of application No. 16/274,152, filed on Feb. 12, 2019, now Pat. No. 10,735,097,
(Continued)

(51) Int. Cl.
*H04B 10/40* (2013.01)
*H04B 10/61* (2013.01)
*H04B 10/50* (2013.01)
*H04L 5/14* (2006.01)
*H04B 10/25* (2013.01)

(52) U.S. Cl.
CPC ....... *H04B 10/40* (2013.01); *H04B 10/25891* (2020.05); *H04B 10/50* (2013.01); *H04B 10/61* (2013.01); *H04L 5/14* (2013.01)

(58) Field of Classification Search
CPC .... H04B 10/40; H04B 10/2504; H04B 10/50; H04B 10/61; H04L 5/14
See application file for complete search history.

(56) References Cited

U.S. PATENT DOCUMENTS

| | | | |
|---|---|---|---|
| 9,853,734 B1* | 12/2017 | Fan | H04B 10/6165 |
| 2016/0119057 A1* | 4/2016 | Mekis | H04J 14/02 398/51 |
| 2018/0145761 A1* | 5/2018 | Zhuge | H04B 10/40 |

* cited by examiner

*Primary Examiner* — Mina M Shalaby
(74) *Attorney, Agent, or Firm* — Armstrong Teasdale LLP

(57) ABSTRACT

A full duplex communication network includes an optical transmitter end having a first coherent optics transceiver, an optical receiver end having a second coherent optics transceiver, and an optical transport medium operably coupling the first coherent optics transceiver to the second coherent optics transceiver. The first coherent optics transceiver is configured to simultaneously transmit a downstream optical signal and receive an upstream optical signal. The second coherent optics transceiver is configured to simultaneously receive the downstream optical signal from the first coherent optics transceiver and transmit the upstream optical signal first coherent optics transceiver. At least one of the downstream optical signal and the upstream optical signal includes at least one coherent optical carrier and at least one non-coherent optical carrier.

15 Claims, 52 Drawing Sheets

Related U.S. Application Data which is a continuation-in-part of application No. 16/198,396, filed on Nov. 21, 2018.

(60) Provisional application No. 62/589,121, filed on Nov. 21, 2017, provisional application No. 62/636,249, filed on Feb. 28, 2018, provisional application No. 62/629,555, filed on Feb. 12, 2018, provisional application No. 62/719,072, filed on Aug. 16, 2018, provisional application No. 62/756,378, filed on Nov. 6, 2018.

SYSTEMS AND METHODS FOR FULL DUPLEX COHERENT OPTICS

CROSS REFERENCE TO RELATED APPLICATIONS

This application is a continuation in part of U.S. application Ser. No. 16/543,509, filed Aug. 16, 2019. U.S. application Ser. No. 16/543,509 is a continuation in part of U.S. application Ser. No. 16/274,152, filed Feb. 12, 2019. U.S. application Ser. No. 16/274,152 is a continuation in part of U.S. application Ser. No. 16/198,396, filed Nov. 21, 2018. U.S. application Ser. No. 16/198,396 claims the benefit of and priority to U.S. Provisional Patent Application Ser. No. 62/589,121, filed Nov. 21, 2017, and to U.S. Provisional Patent Application Ser. No. 62/636,249, filed Feb. 28, 2018. U.S. application Ser. No. 16/274,152 also claims the benefit of and priority to U.S. Provisional Patent Application Ser. No. 62/629,555, filed Feb. 12, 2018. U.S. application Ser. No. 16/543,509 also claims the benefit of and priority to U.S. Provisional Patent Application Ser. No. 62/719,072, filed Aug. 16, 2018. The present application also claims the benefit of and priority to U.S. Provisional Patent Application Ser. No. 62/756,378, filed Nov. 6, 2018. All of these applications are incorporated herein by reference in their entireties.

BACKGROUND

The field of the disclosure relates generally to communication networks, and more particularly, to bidirectional networks employing coherent optics technologies.

Most network operators have very limited fiber available between the headend (HE)/hub and the fiber node to use for data and video services, often only just 1-2 fiber strands. With end users demanding more bandwidth to the home, operators need a strategy on how to increase capacity in the access network. One way is to add more fiber between the HE/hub and the fiber node, but retrenching is costly and time consuming, so return on investment (RoI) makes this option unattractive. A solution that re-uses the existing infrastructure is therefore considerably preferable.

Coherent optics technology is becoming common in the subsea, long-haul, and metro networks, but has not yet been fully integrated into the access networks. However, it is desirable to utilize coherent optics technology in the access network because the distances from the HE/hub to the fiber node are much shorter using coherent optics technologies in comparison with conventional system technologies. One proposed technique for expanding the capacity of existing fiber infrastructures implements coherent optics bidirectional transmission on a single fiber. Bidirectional transmission effectively doubles (or more) the amount of transmission capability available to cable operators.

Bidirectional transmission is attractive to network operators that have limited availability of leased or owned fibers, and who desire separation of different services (residential, business, and cellular connections) to end users/endpoints of the network. However, existing coherent transceiver designs have been unable to fully leverage the capabilities of bidirectional transmission. In particular, conventional implementations of single laser sources for both the transmitter and the local oscillator (LO) result in significant crosstalk that has prevented bidirectional transmission. Accordingly, it is desirable to develop systems and methods that successfully implement coherent optics technology in bidirectional transmission between the hub and the fiber node.

SUMMARY

In an embodiment, a communication network, includes an optical hub having a first coherent optics transceiver, a fiber node having a second coherent optics transceiver, an optical transport medium operably coupling the first coherent optics transceiver to the second coherent optics transceiver, a first optical circulator disposed at the optical hub, and a second optical circulator disposed at the fiber node. The first coherent optics transceiver is configured to (i) transmit a downstream optical signal at a first wavelength, and (ii) receive an upstream optical signal at the first wavelength. The second coherent optics transceiver is configured to (i) receive the downstream optical signal from the first coherent optics transceiver at the first wavelength, and (ii) transmit the upstream optical signal at the first wavelength. The first and second optical circulators are configured to separate the downstream optical signal from the upstream optical signal.

In an embodiment, a full duplex communication network includes an optical transmitter end having a first coherent optics transceiver, an optical receiver end having a second coherent optics transceiver, and an optical transport medium operably coupling the first coherent optics transceiver to the second coherent optics transceiver. The first coherent optics transceiver is configured to (i) transmit a downstream optical signal at a first wavelength, and (ii) simultaneously receive an upstream optical signal at a second wavelength. The second coherent optics transceiver is configured to (i) receive the downstream optical signal, and (ii) simultaneously transmit the upstream optical signal. The first wavelength has a first center frequency separated from a second center frequency of the second wavelength.

In an embodiment, a full duplex communication network includes an optical transmitter end having a first coherent optics transceiver, an optical receiver end having a second coherent optics transceiver, and an optical transport medium operably coupling the first coherent optics transceiver to the second coherent optics transceiver. The first coherent optics transceiver is configured to simultaneously transmit a downstream optical signal and receive an upstream optical signal. The second coherent optics transceiver is configured to simultaneously receive the downstream optical signal from the first coherent optics transceiver and transmit the upstream optical signal first coherent optics transceiver. At least one of the downstream optical signal and the upstream optical signal includes at least one coherent optical carrier and at least one non-coherent optical carrier.

In an embodiment, a full duplex communication network includes a first coherent optics transceiver having a first transmitting portion and a first receiving portion, a second coherent optics transceiver having a second transmitting portion and a second receiving portion, an optical transport medium operably coupling the first coherent optics transceiver to the second coherent optics transceiver, and a coherent optics interface disposed within the first coherent optics transceiver. The coherent optics interface includes a lineside interface portion, a clientside interface portion, and a control interface portion. The clientside interface portion is configured for electrical communication within at least one of the first optics transmitting portion and the first receiving portion. The lineside interface portion is configured for optical communication with the optical transport medium.

In an embodiment, an interface subsystem for a coherent optical transceiver includes an optical transmitter, an optical receiver, a control layer, an electrical interface portion in operable communication with the optical transmitter and the optical receiver on a host side of the interface subsystem, a management interface portion in operable communication with the control layer, and an optical interface portion in operable communication with the optical transmitter and the optical receiver on a host side of the interface subsystem.

BRIEF DESCRIPTION

These and other features, aspects, and advantages of the present disclosure will become better understood when the following detailed description is read with reference to the accompanying drawings in which like characters represent like parts throughout the drawings, wherein.

Figure 48:
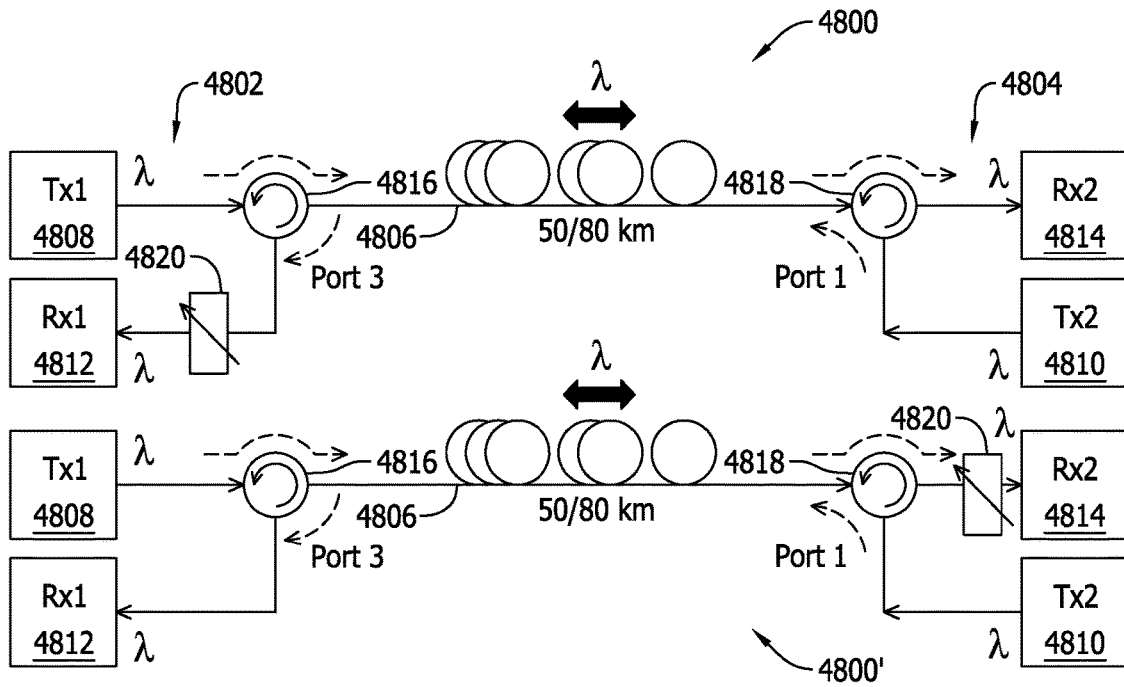
FIG. 48 is a schematic illustration of a coherent optics network architecture.
Figure 49A:
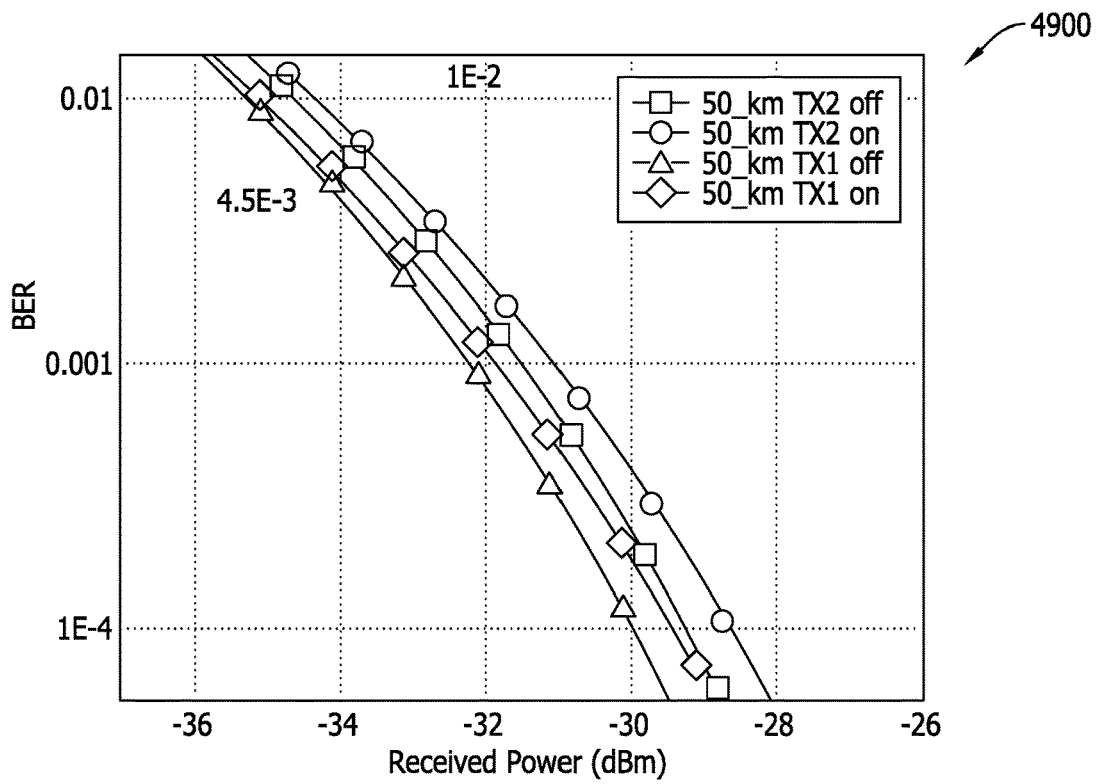
Figure 49B:
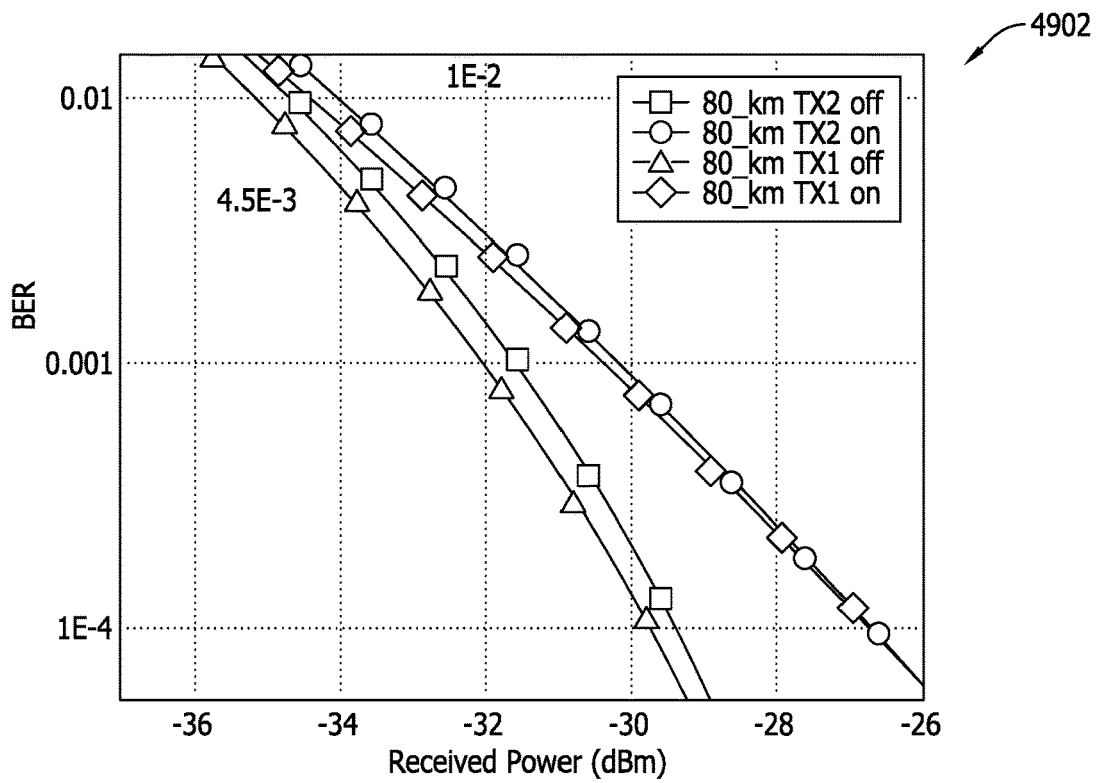

FIGS. 49A-B are graphical illustrations of comparative plots of bit error rate against received power for the architecture depicted in FIG. 48.

Figure 50:
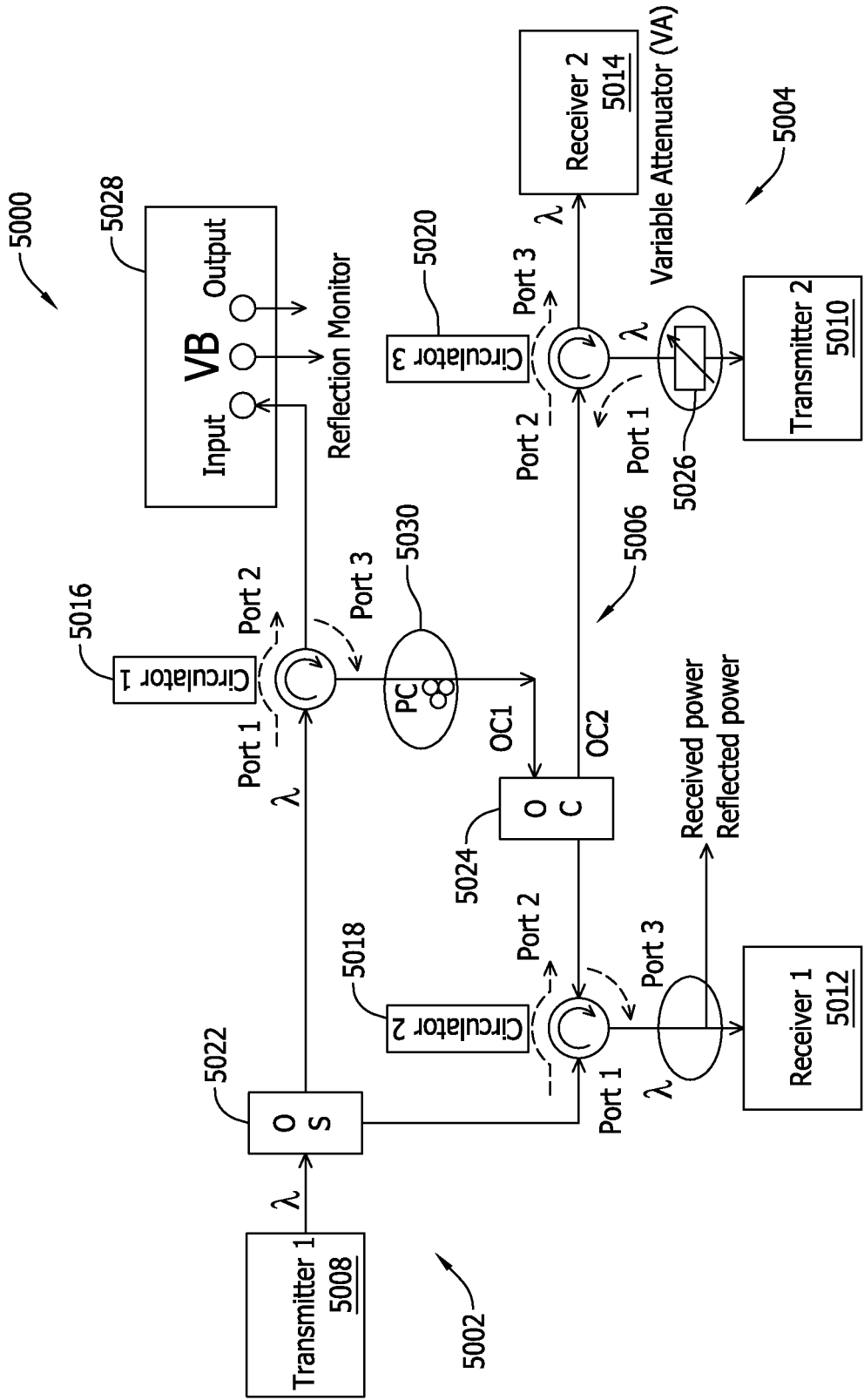

FIG. 50 is a schematic illustration of a coherent optics network architecture.

Figure 51A:
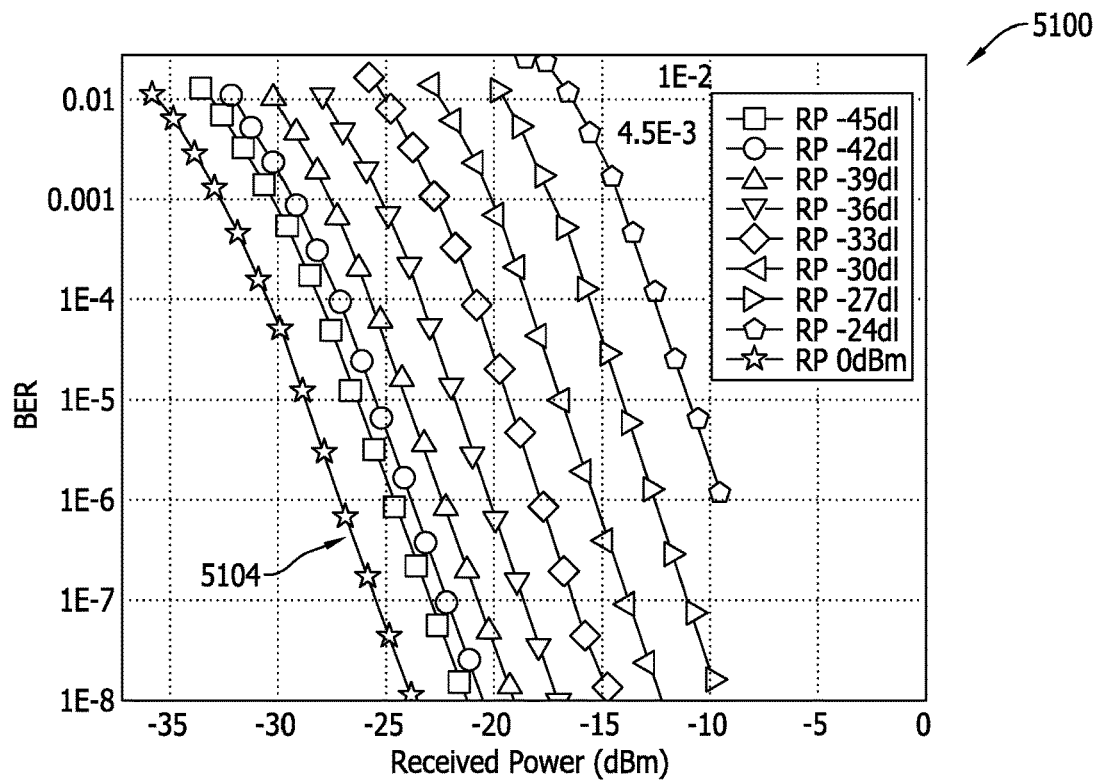

FIG. 51A is graphical illustration of a comparative plot of bit error rate against received power for the architecture depicted in FIG. 50.

Figure 51B:
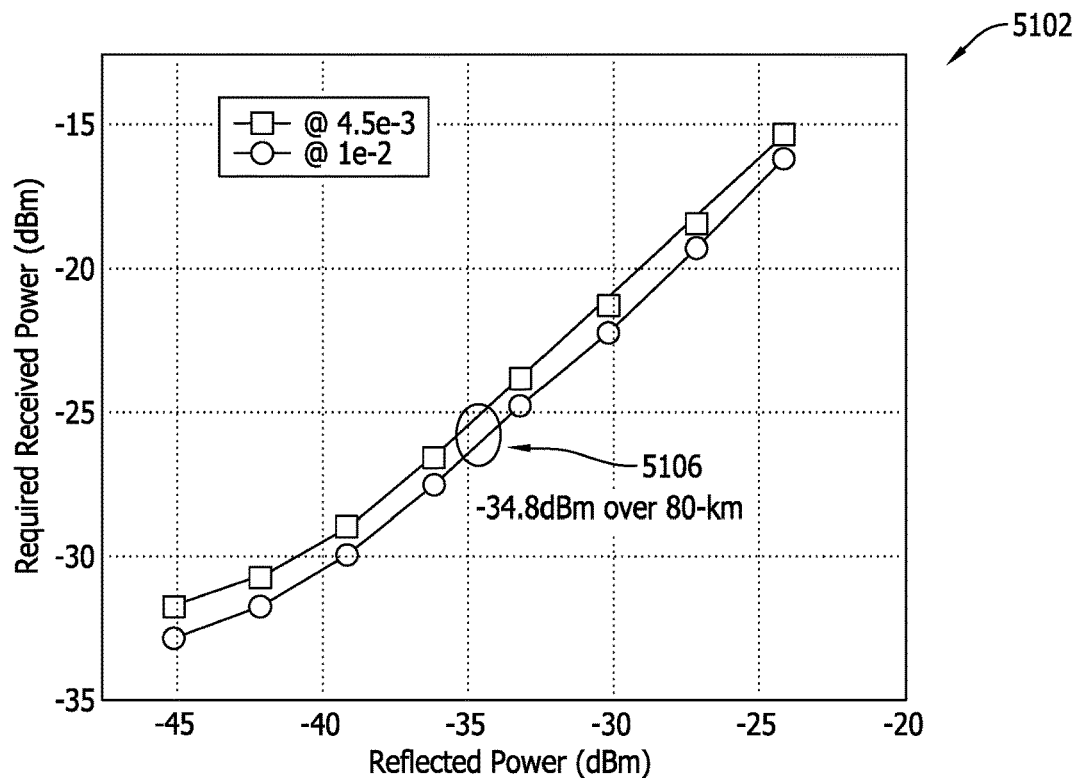

FIG. 51B is graphical illustration of a comparative plot of required received power against reflected power for the architecture depicted in FIG. 50.

Figure 52:
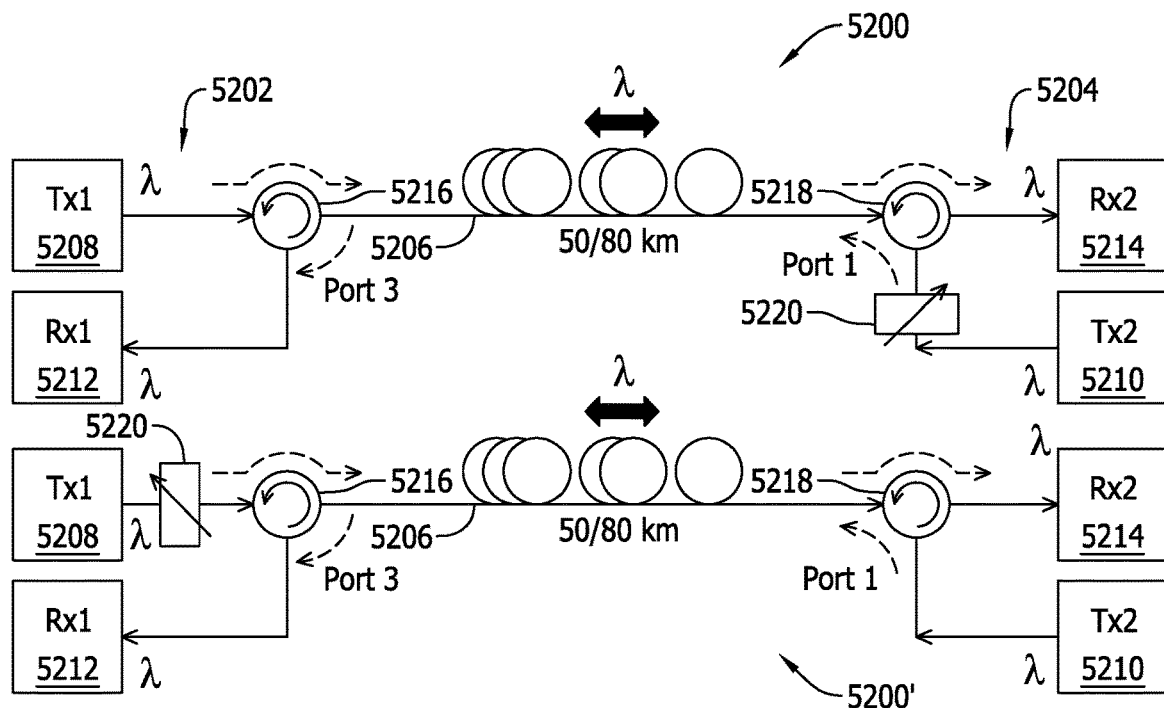

FIG. 52 is a schematic illustration of a coherent optics network architecture.

Figure 53A:
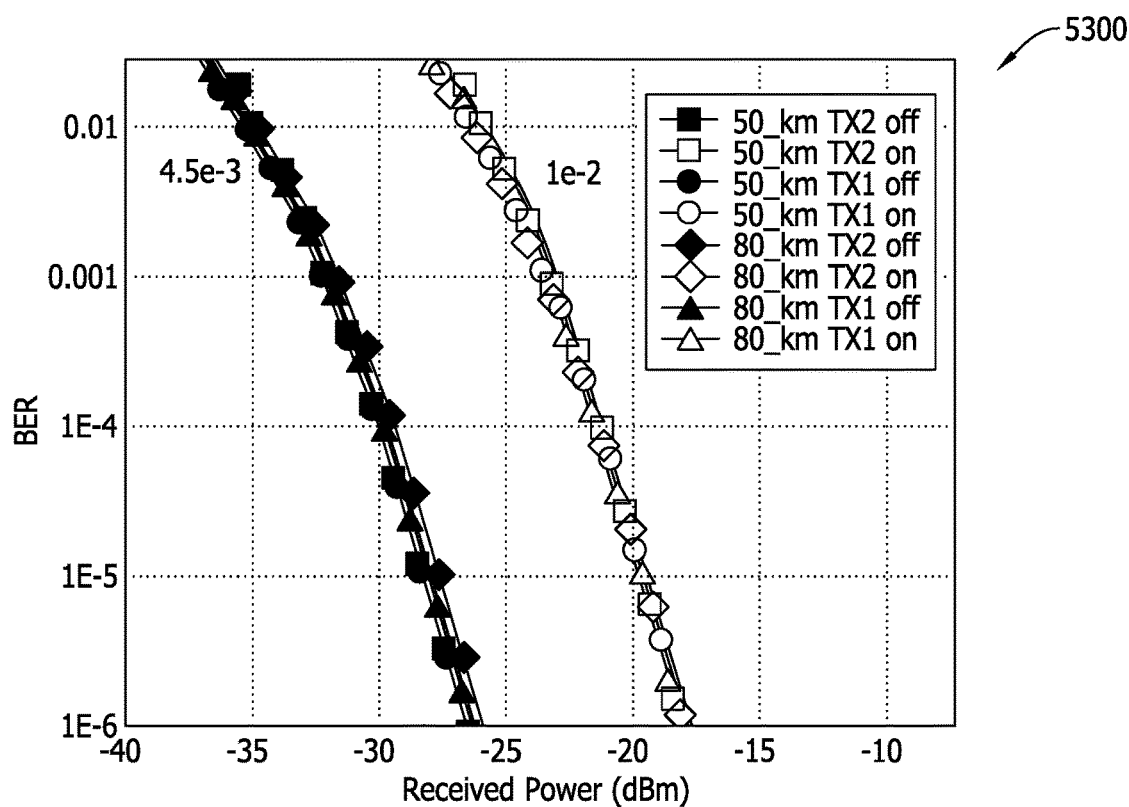
Figure 53B:
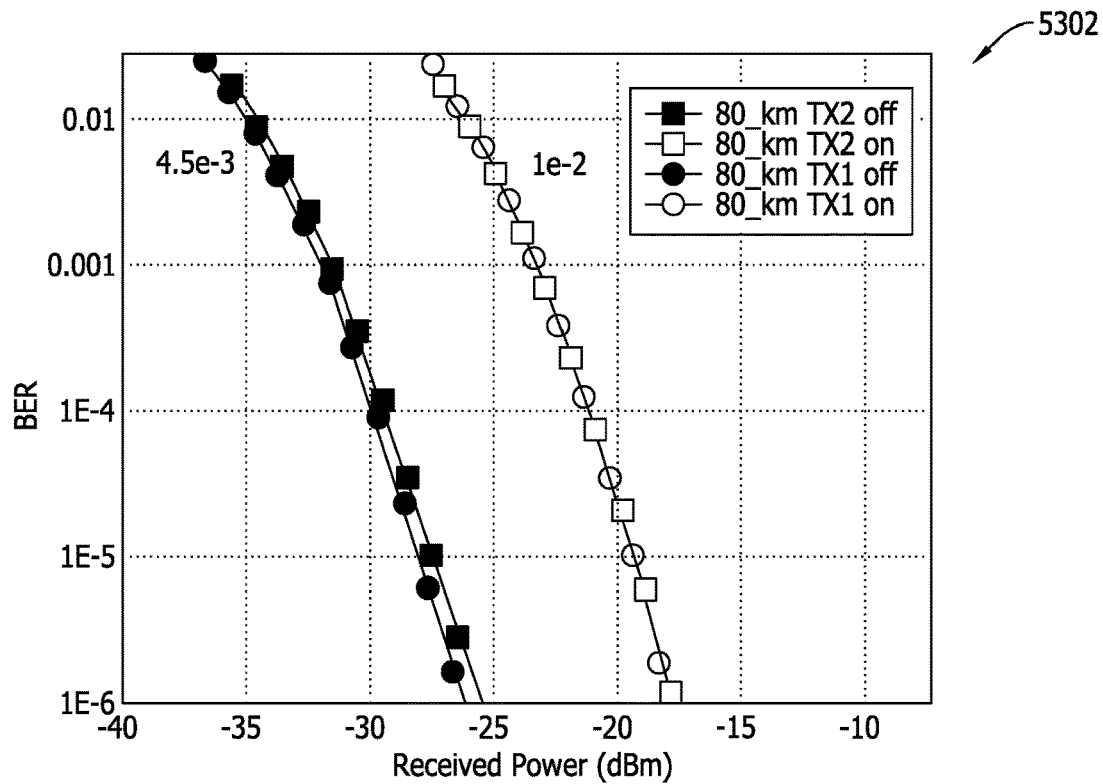
Figure 53C:
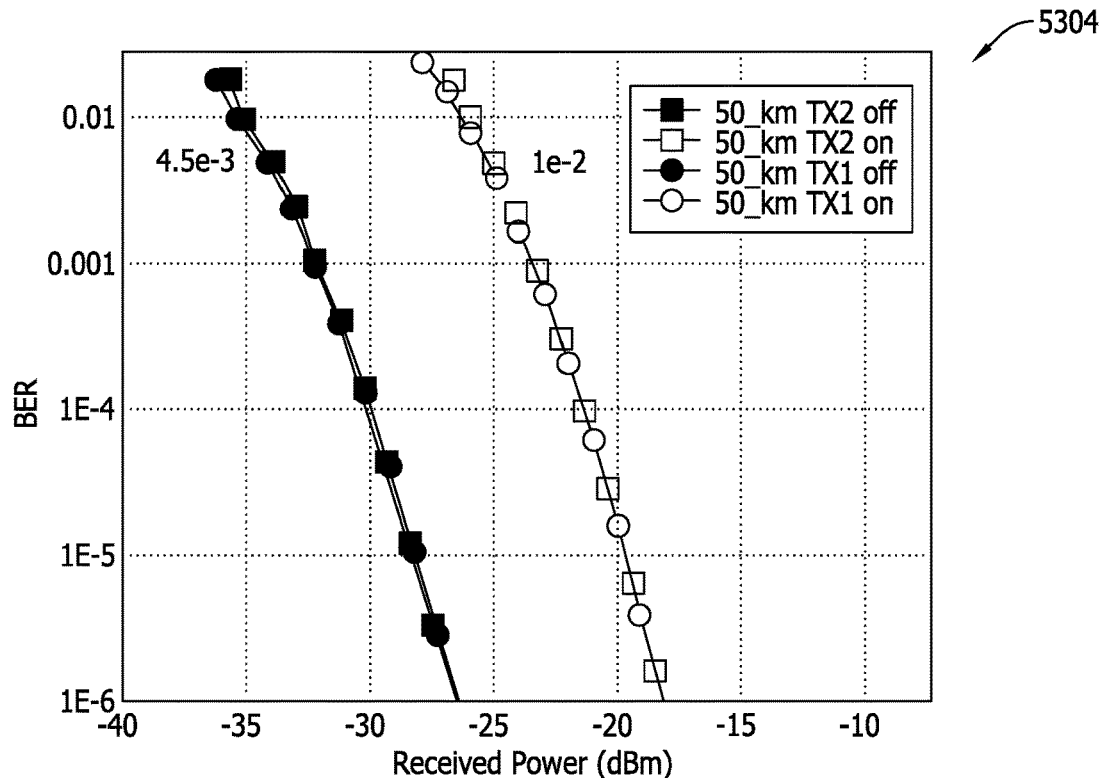

FIGS. 53A-C are graphical illustrations of comparative plots of bit error rate against received power for the architecture depicted in FIG. 52.

Figure 54:
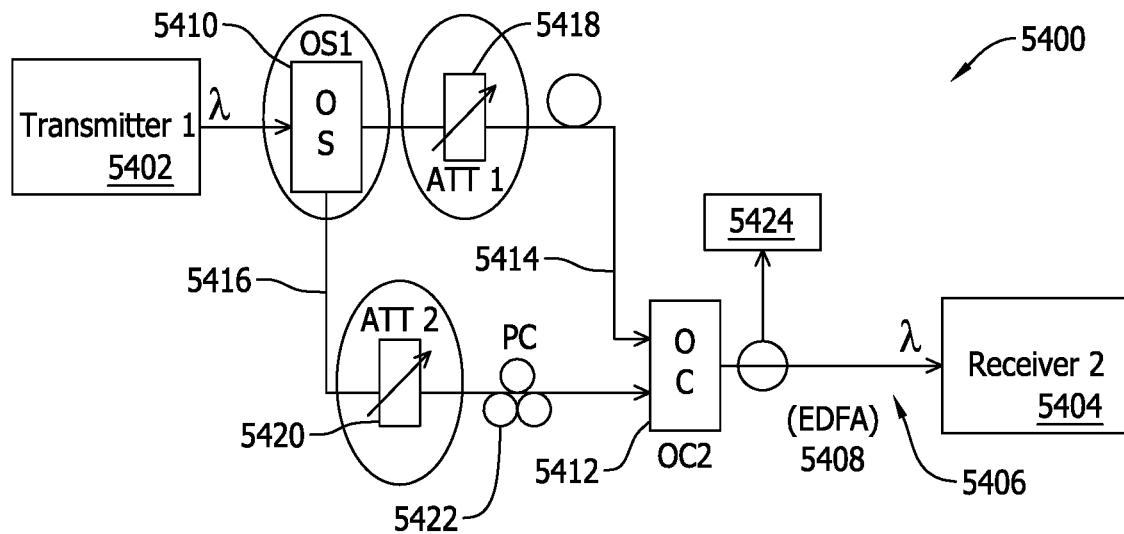

FIG. 54 is a schematic illustration of a coherent optics network architecture test subsystem.

Figure 55:
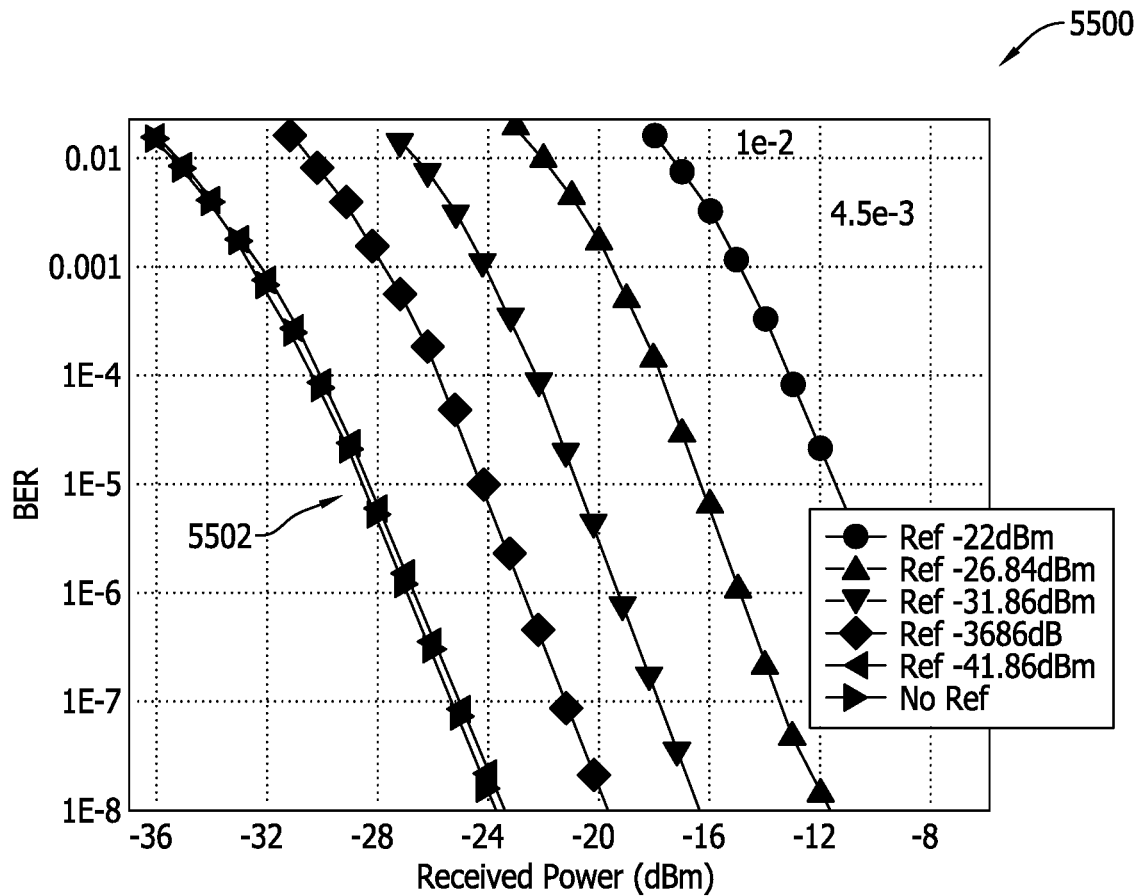

FIG. 55 is graphical illustration of a comparative plot of bit error rate against received power for the architecture depicted in FIG. 54.

Figure 56:
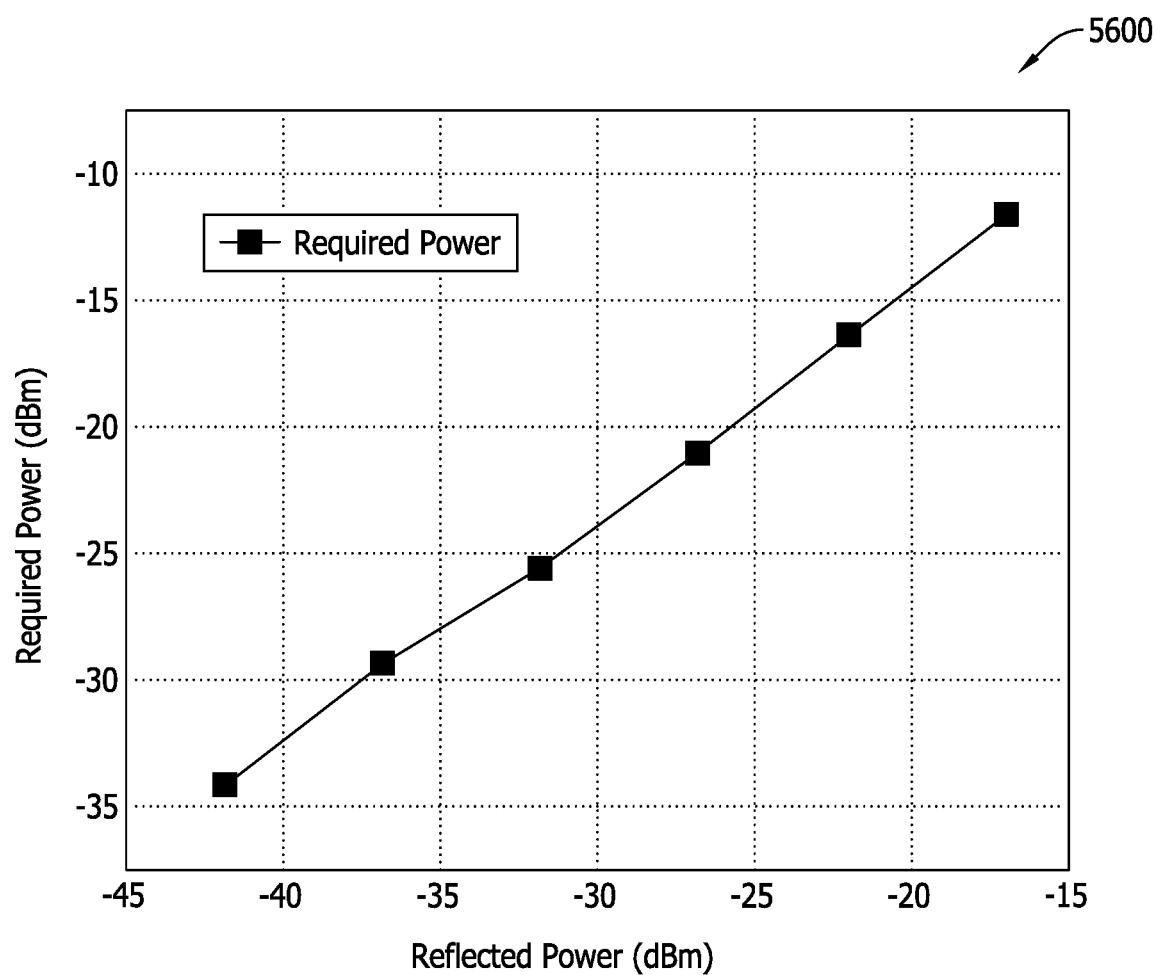

FIG. 56 is graphical illustration of a comparative plot of required power against reflected power for the architecture depicted in FIG. 54.

Figure 57:
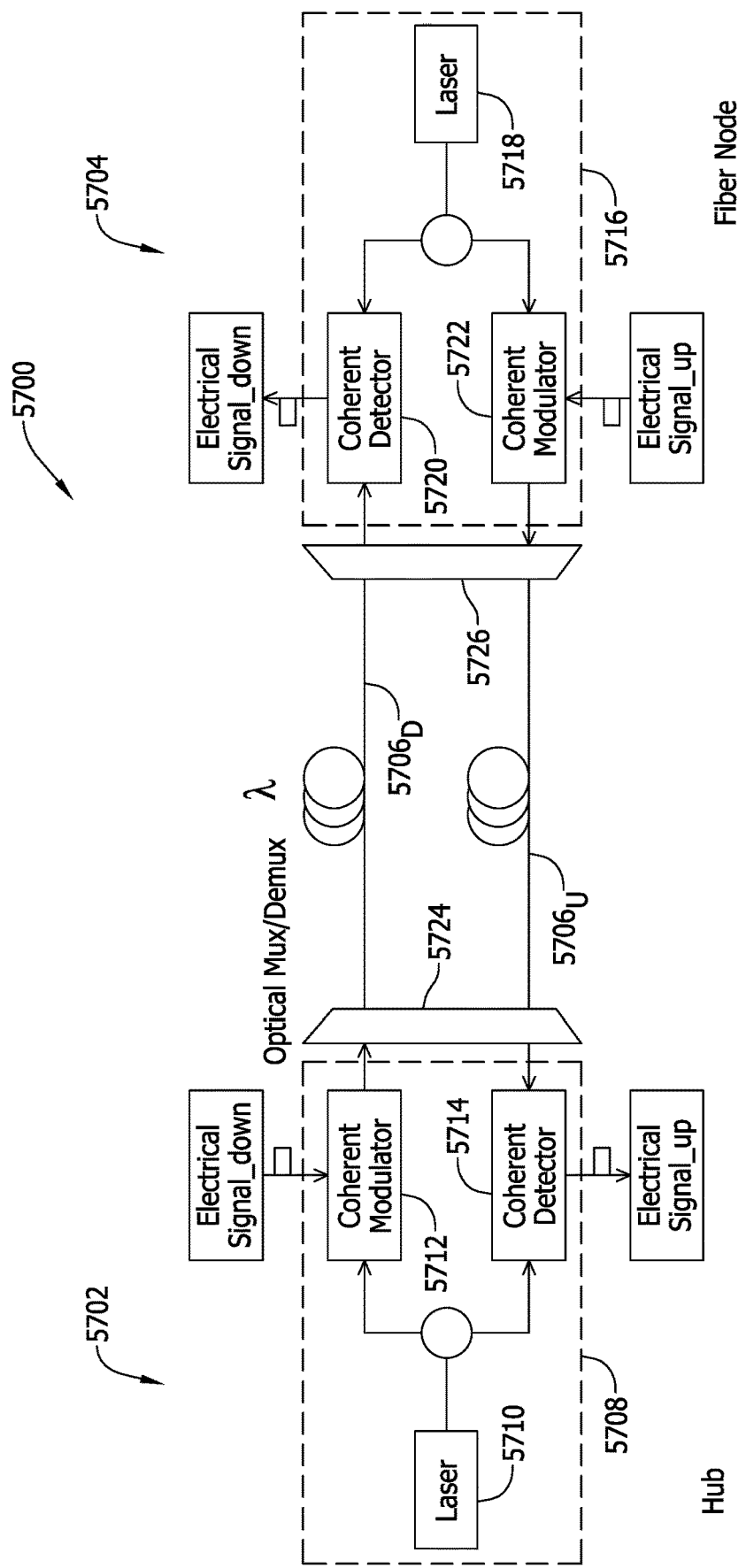

FIG. 57 is a schematic illustration of a coherent optics network architecture.

Figure 58:
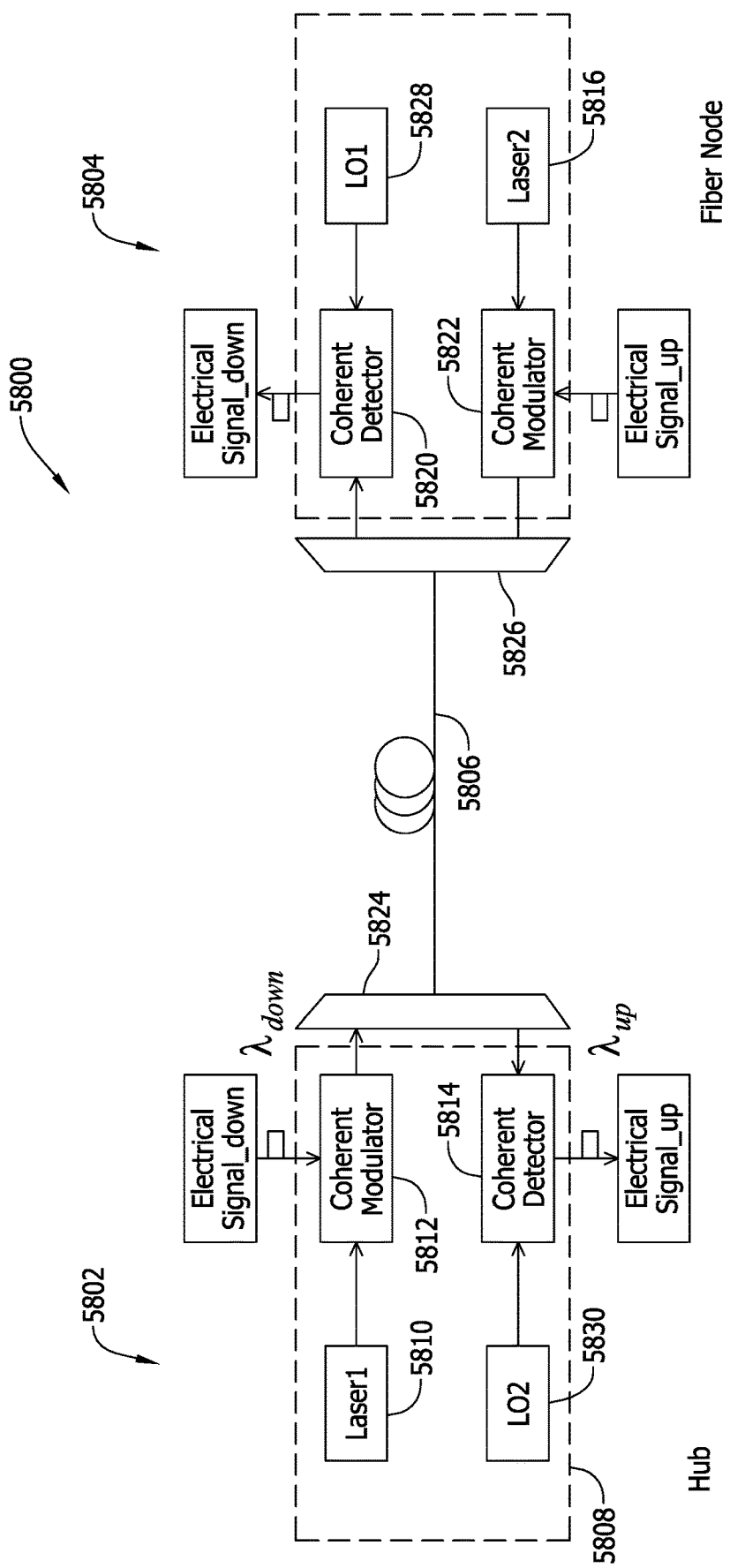

FIG. 58 is a schematic illustration of a coherent optics network architecture.

Figure 59:
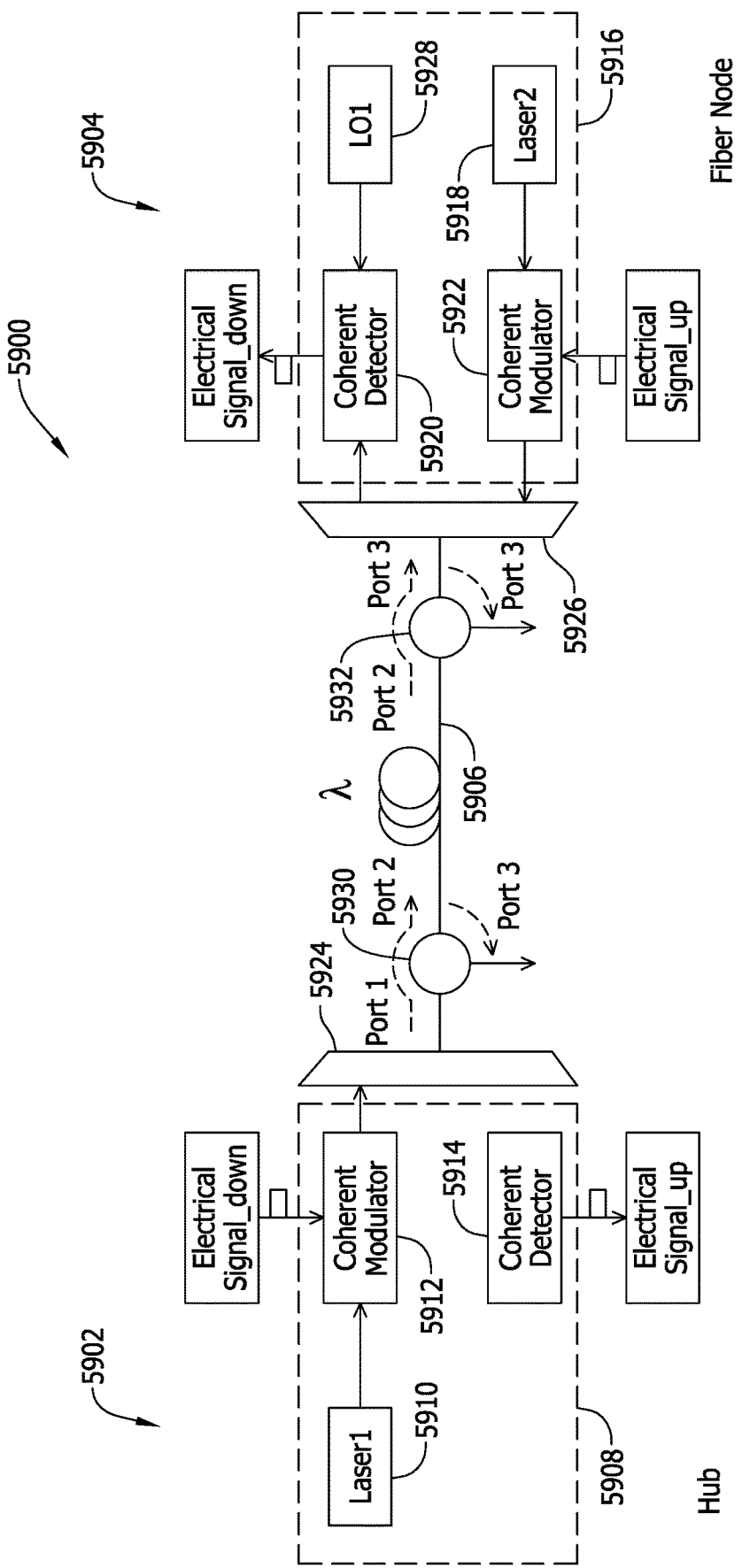

FIG. 59 is a schematic illustration of a coherent optics network architecture.

Figure 60:
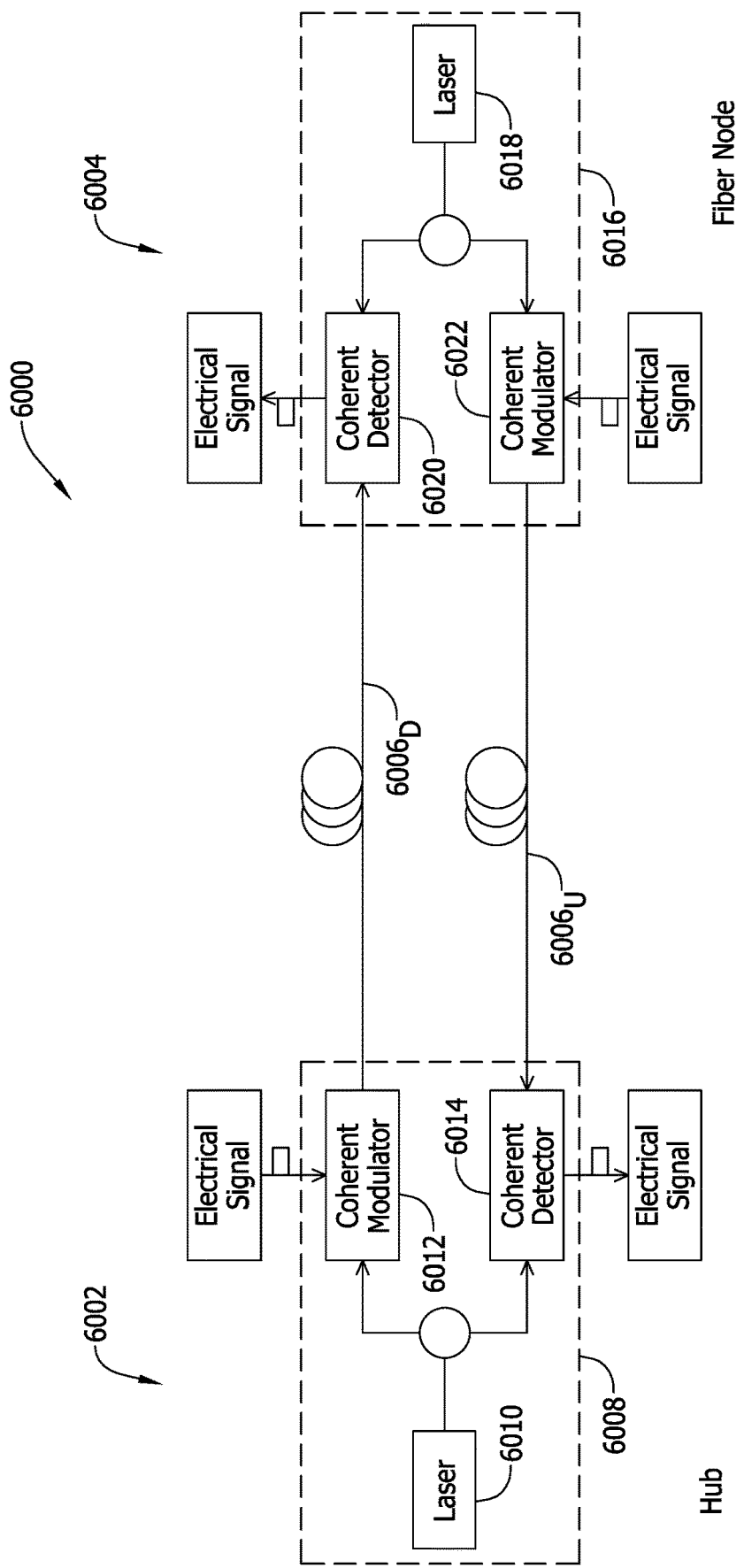

FIG. 60 is a schematic illustration of a coherent optics network architecture.

Figure 61:
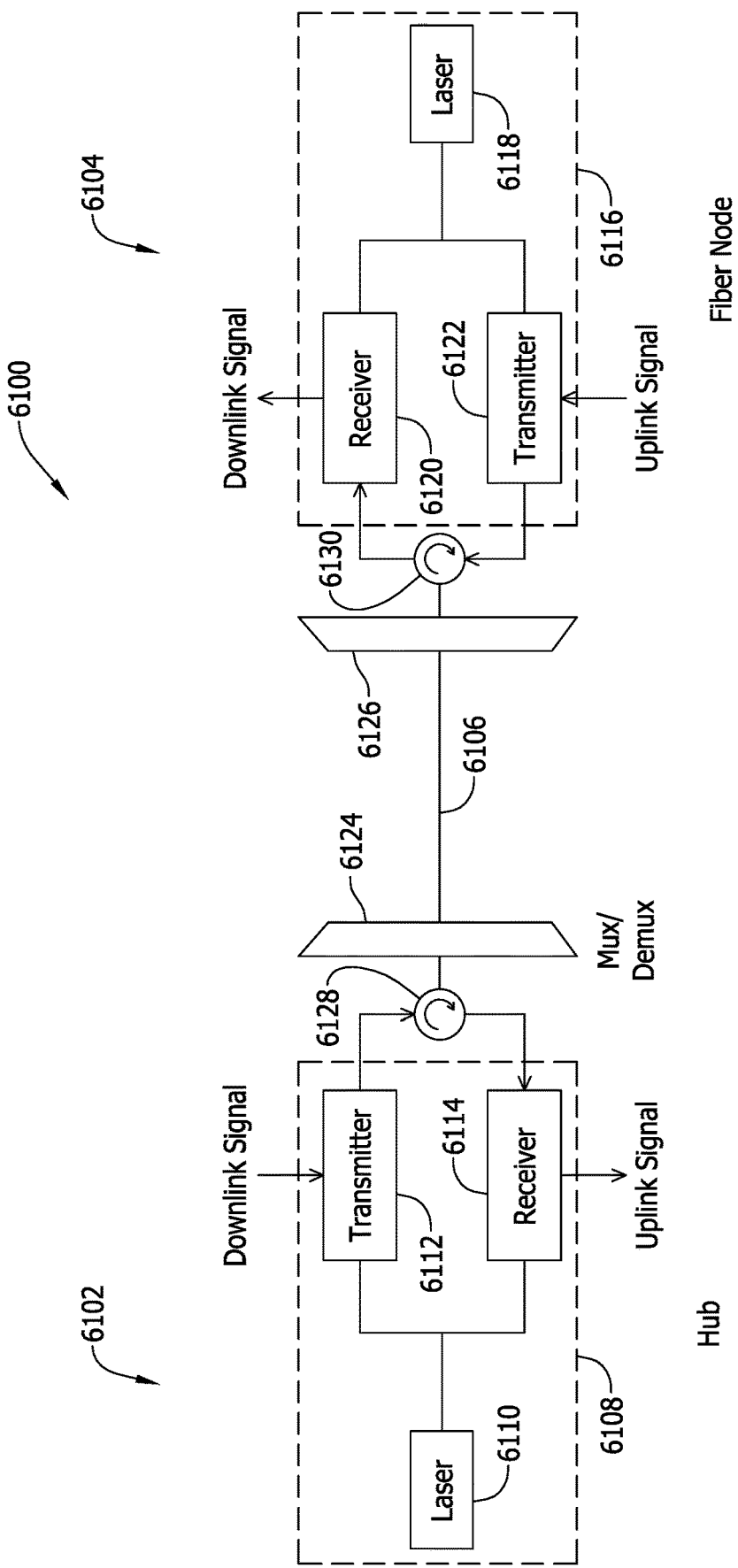

FIG. 61 is a schematic illustration of a coherent optics network architecture.

Figure 62:
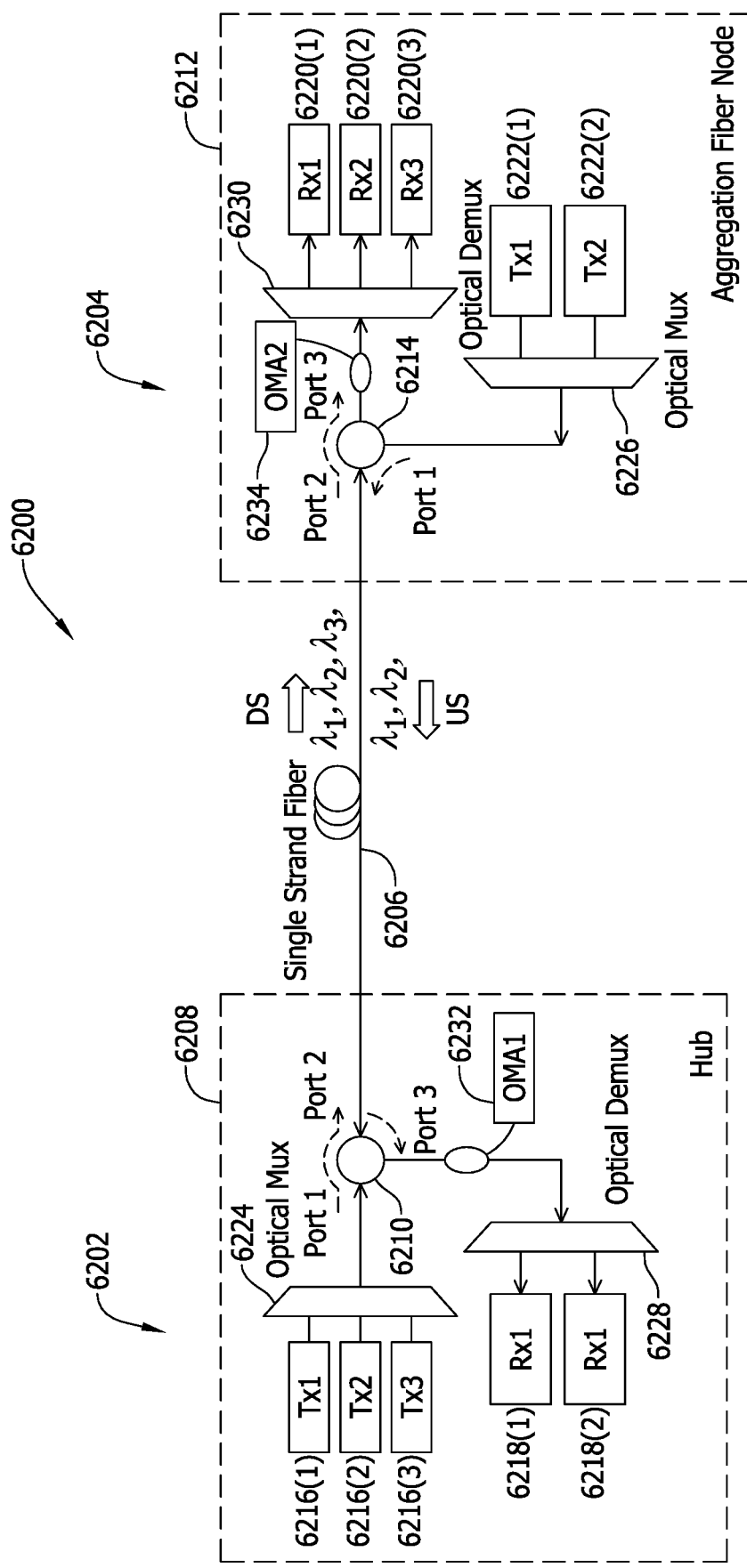

FIG. 62 is a schematic illustration of a coherent optics network architecture.

Figure 63:
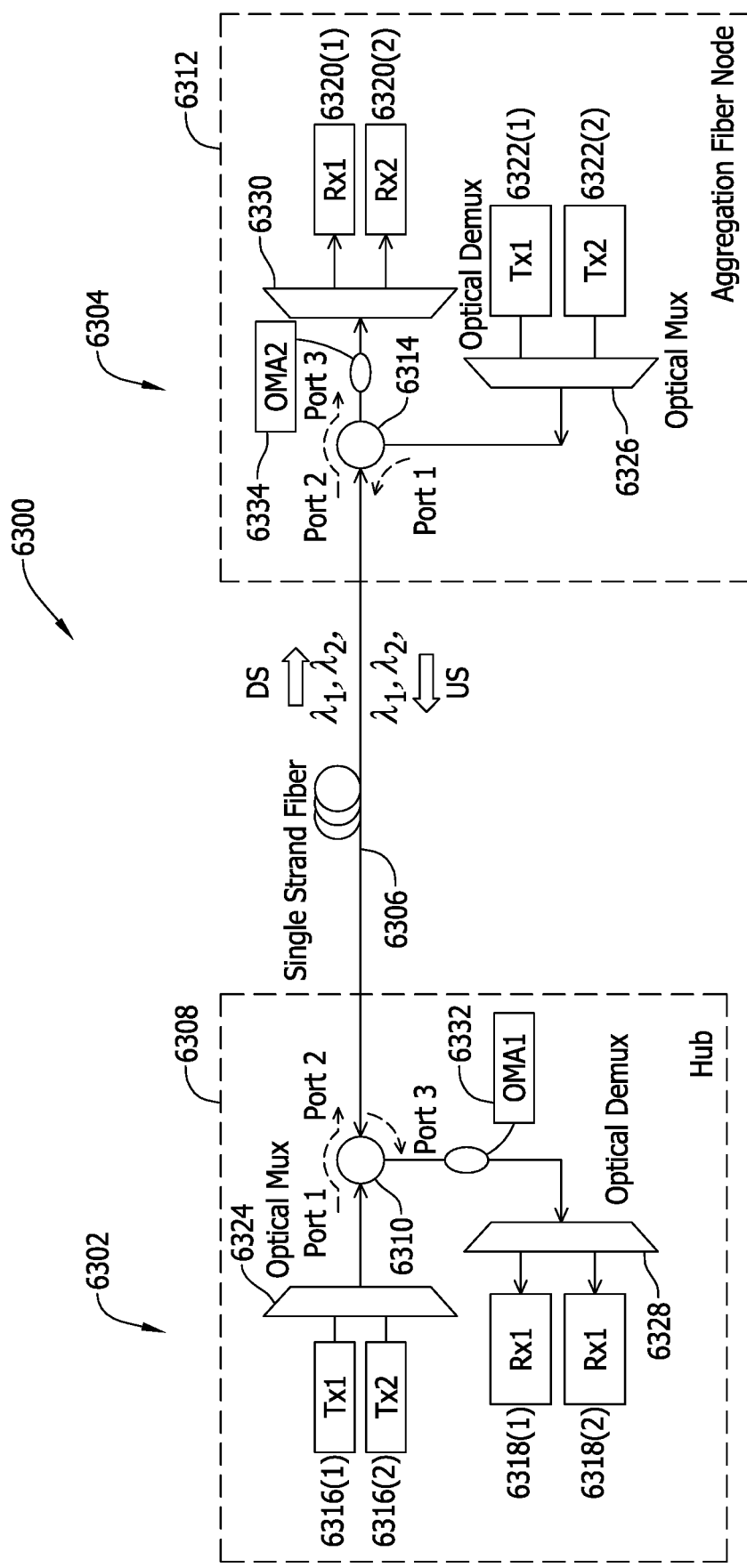

FIG. 63 is a schematic illustration of a coherent optics network architecture.

Figure 64:
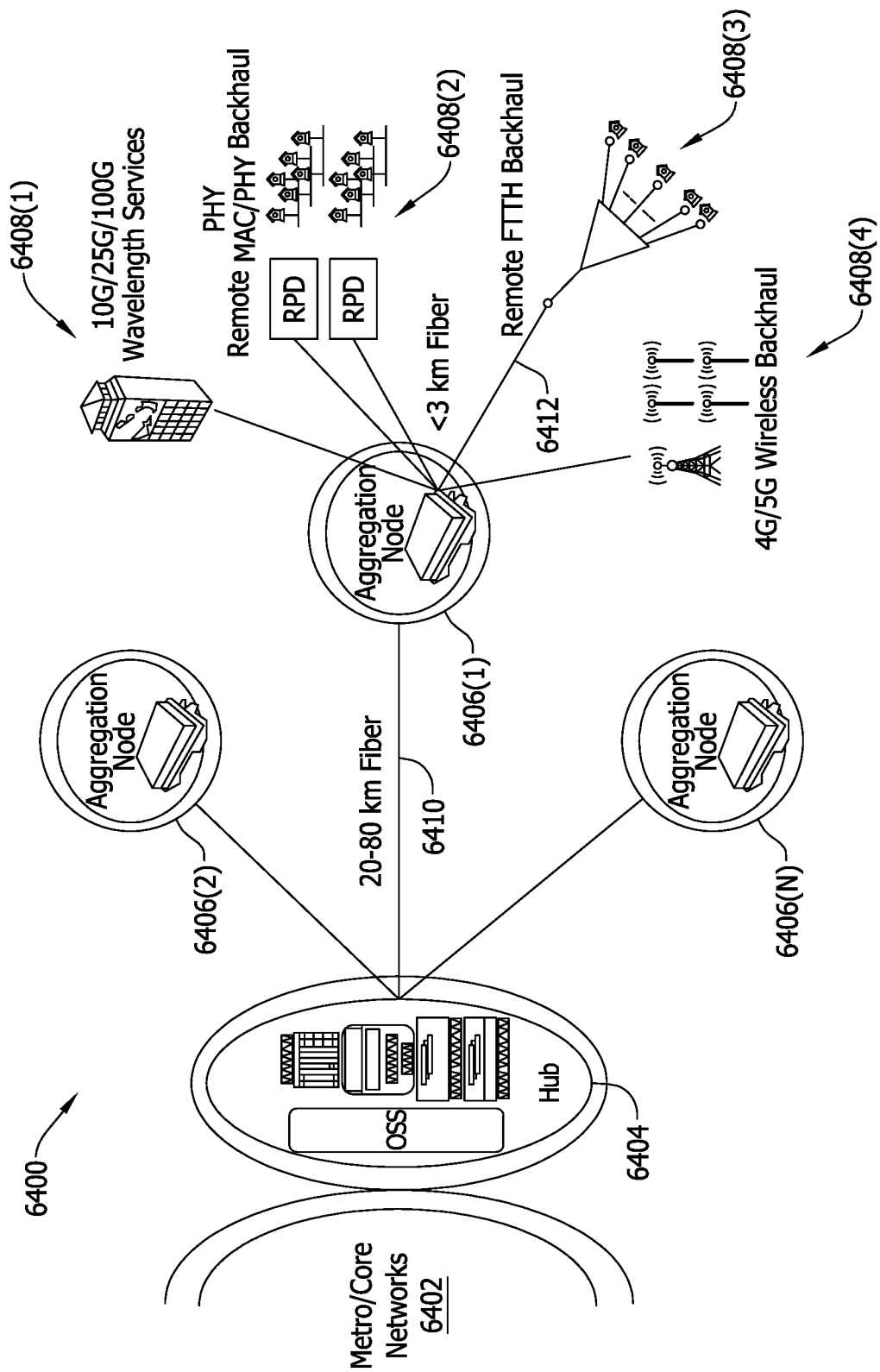

FIG. 64 is a schematic illustration of an optical communications network system.

Figure 65B:
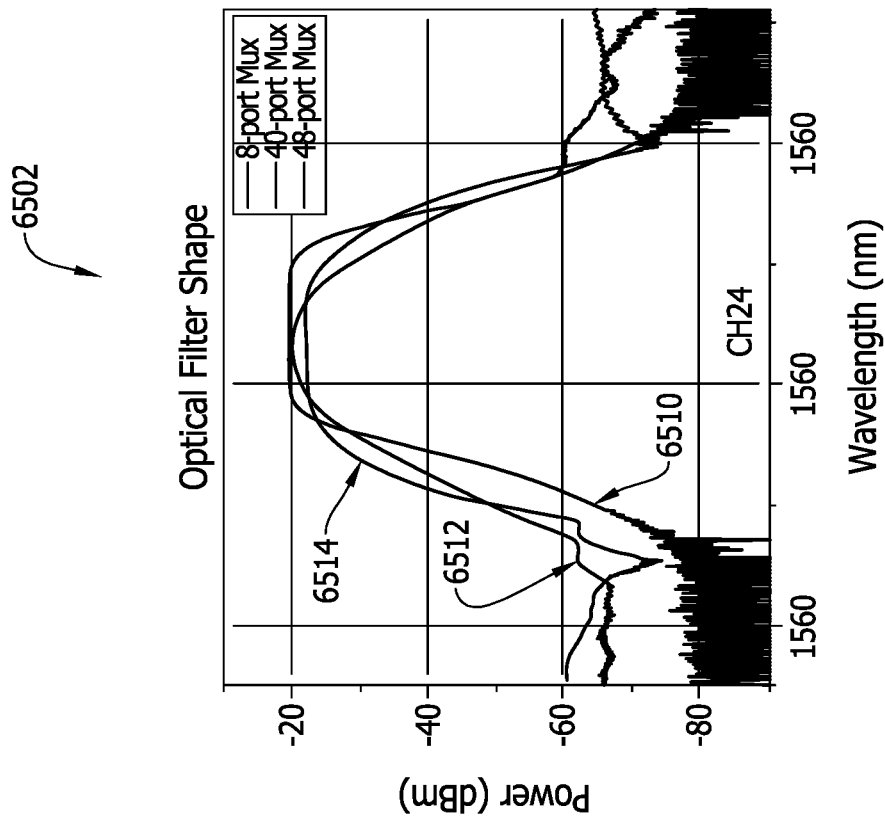
Figure 65A:
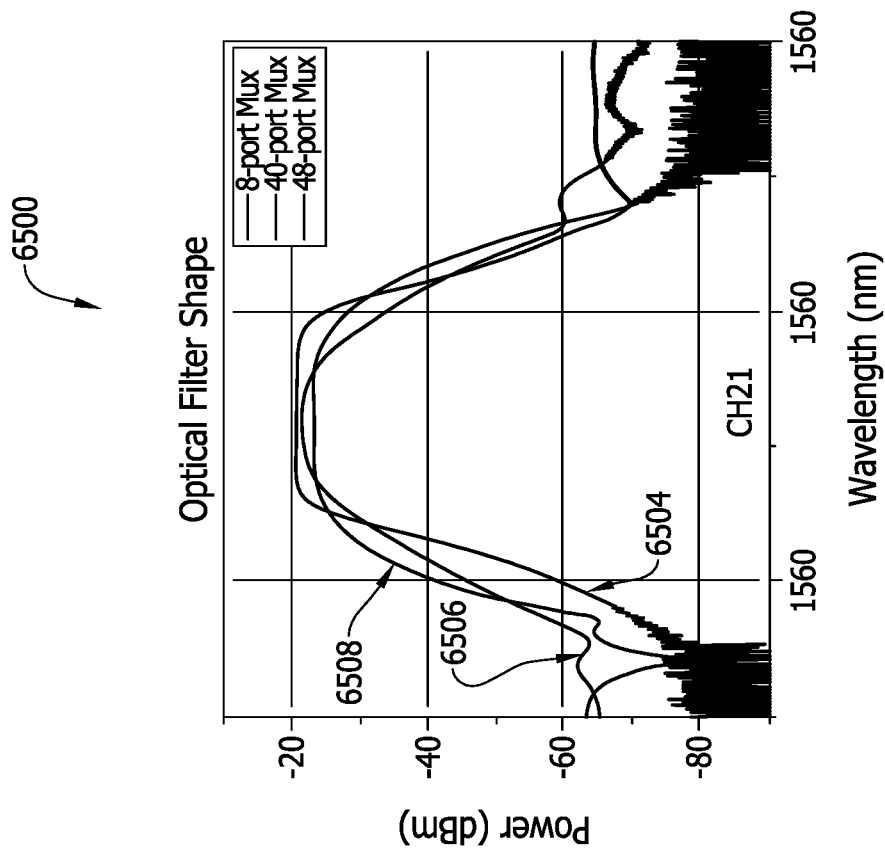

FIGS. 65A-B are graphical illustrations of comparative optical spectrum plots.

Figure 66:
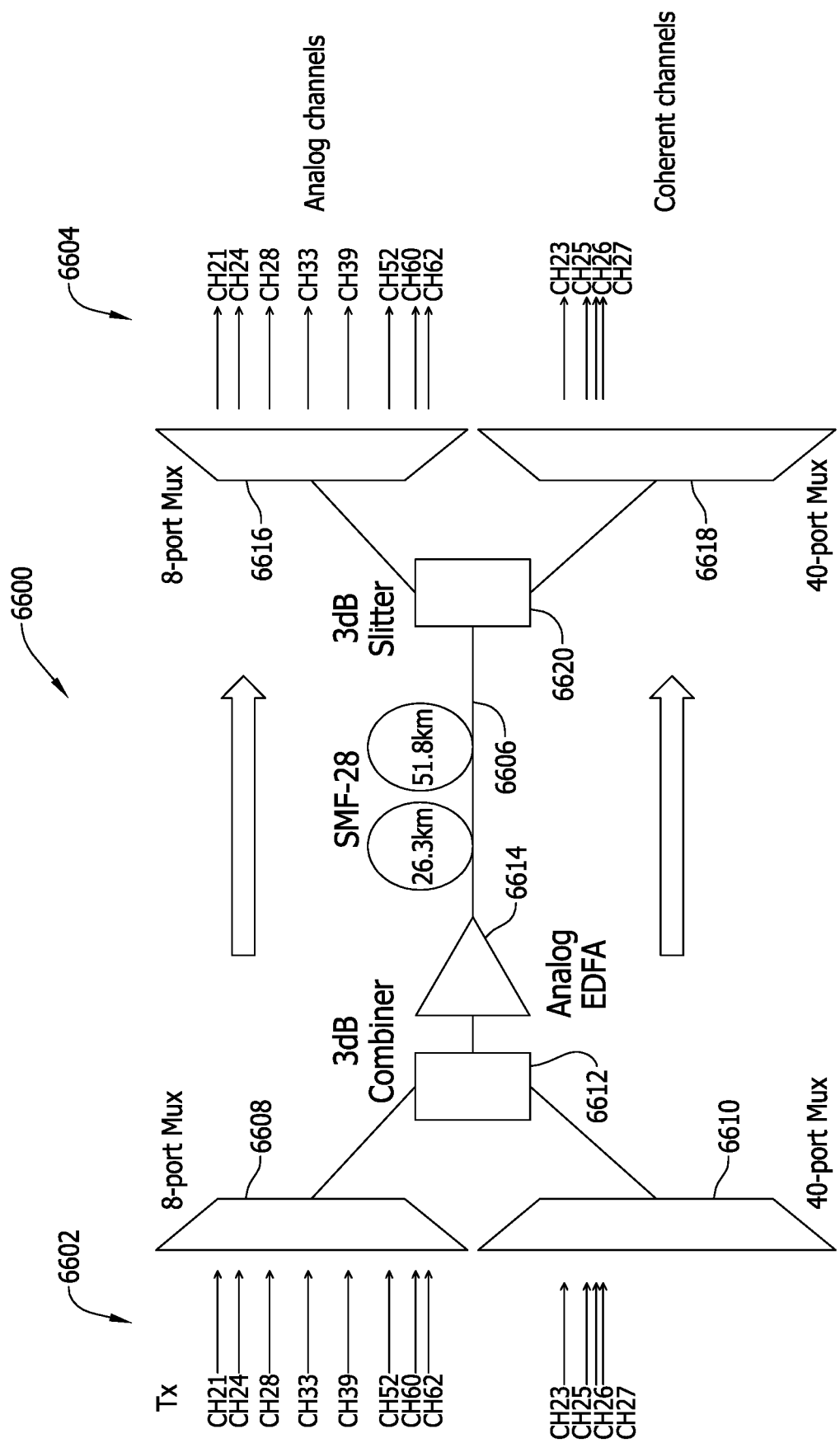

FIG. 66 is a schematic illustration of a coherent optics network architecture test subsystem.

Figure 67B:
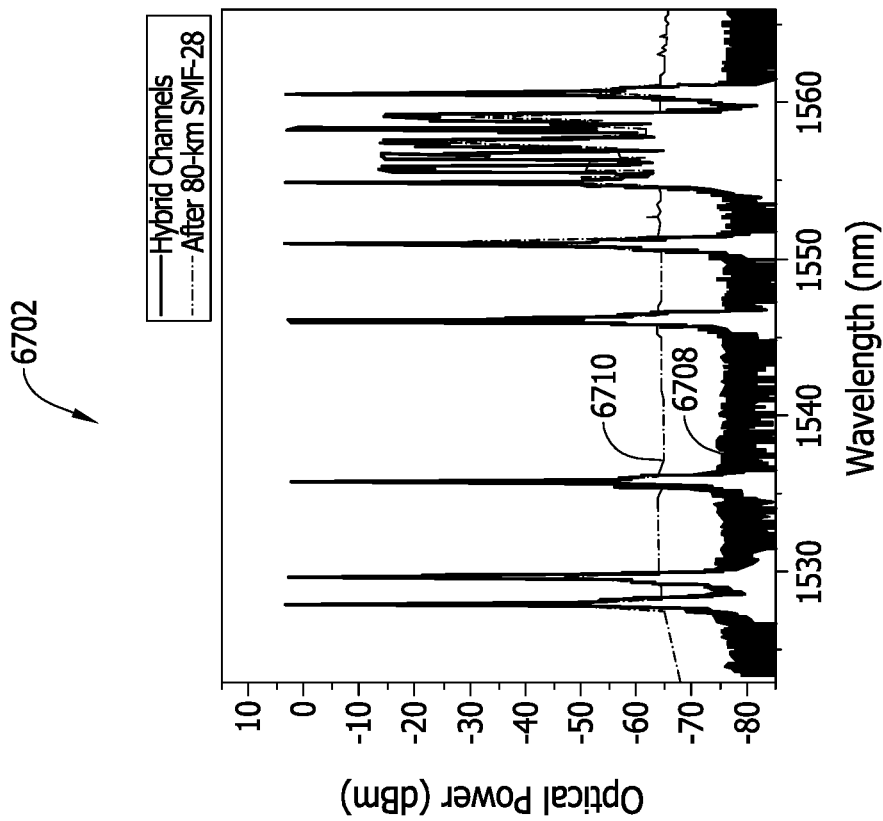
Figure 67A:
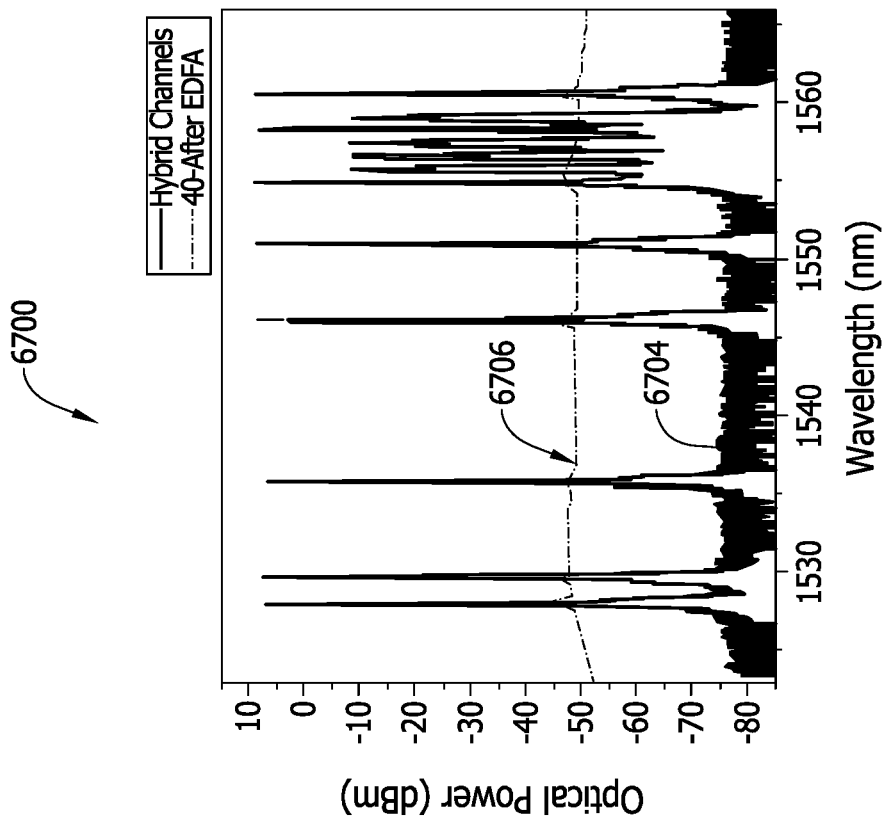

FIGS. 67A-B are graphical illustrations of comparative optical spectrum plots.

Figures 68A, 68B:
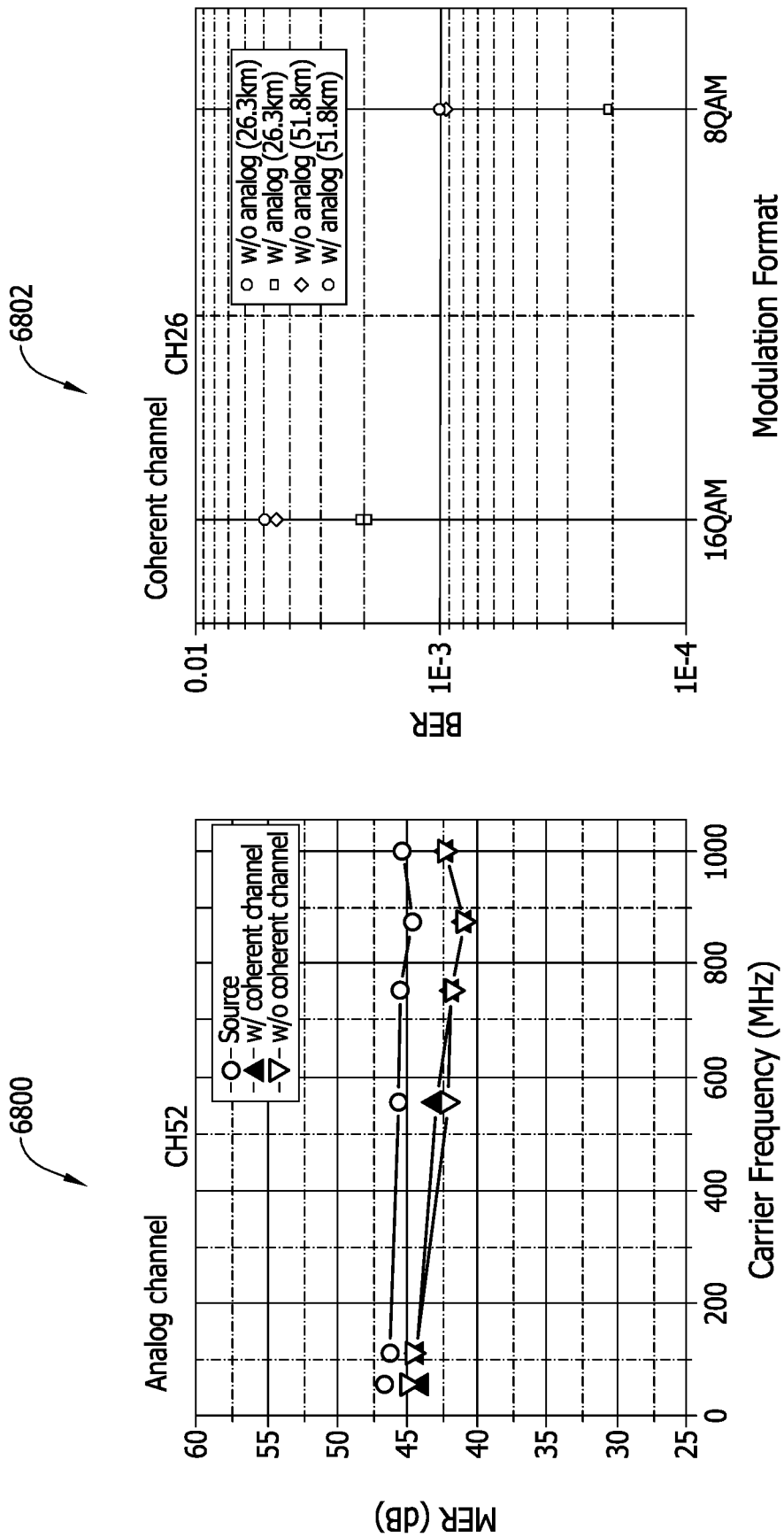

FIG. 68A is a graphical illustration of a comparative plot 7000 of modulation error ratio against carrier frequency for the analog channels transmitted by the subsystem depicted in FIG. 66.

FIG. 68B is a graphical illustration of a comparative plot 7002 of bit error rate against modulation format for the coherent channels transmitted by the subsystem depicted in FIG. 66.

Figure 69:
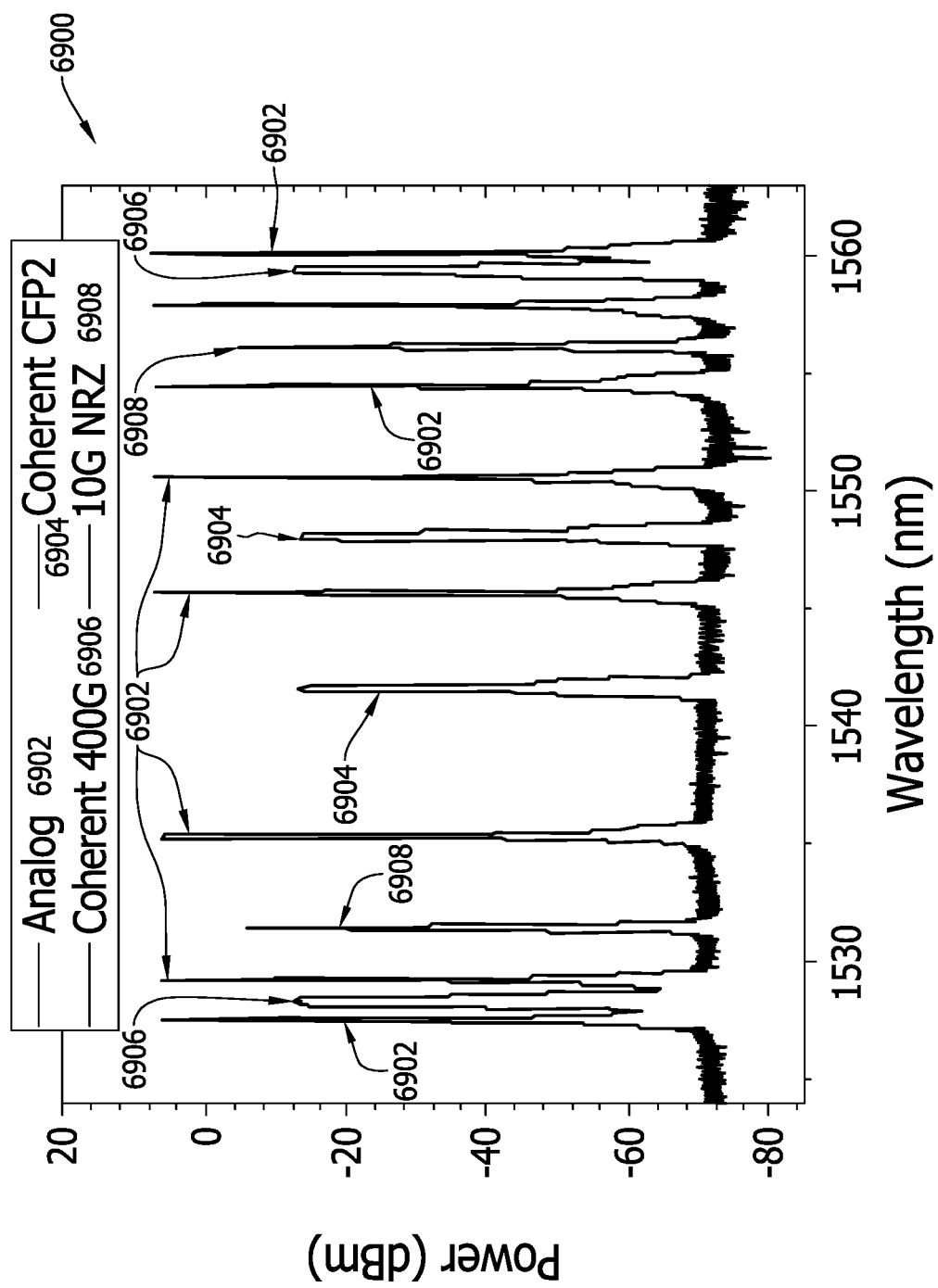

FIG. 69 is a graphical illustration of a comparative optical spectrum plot.

Figure 70:
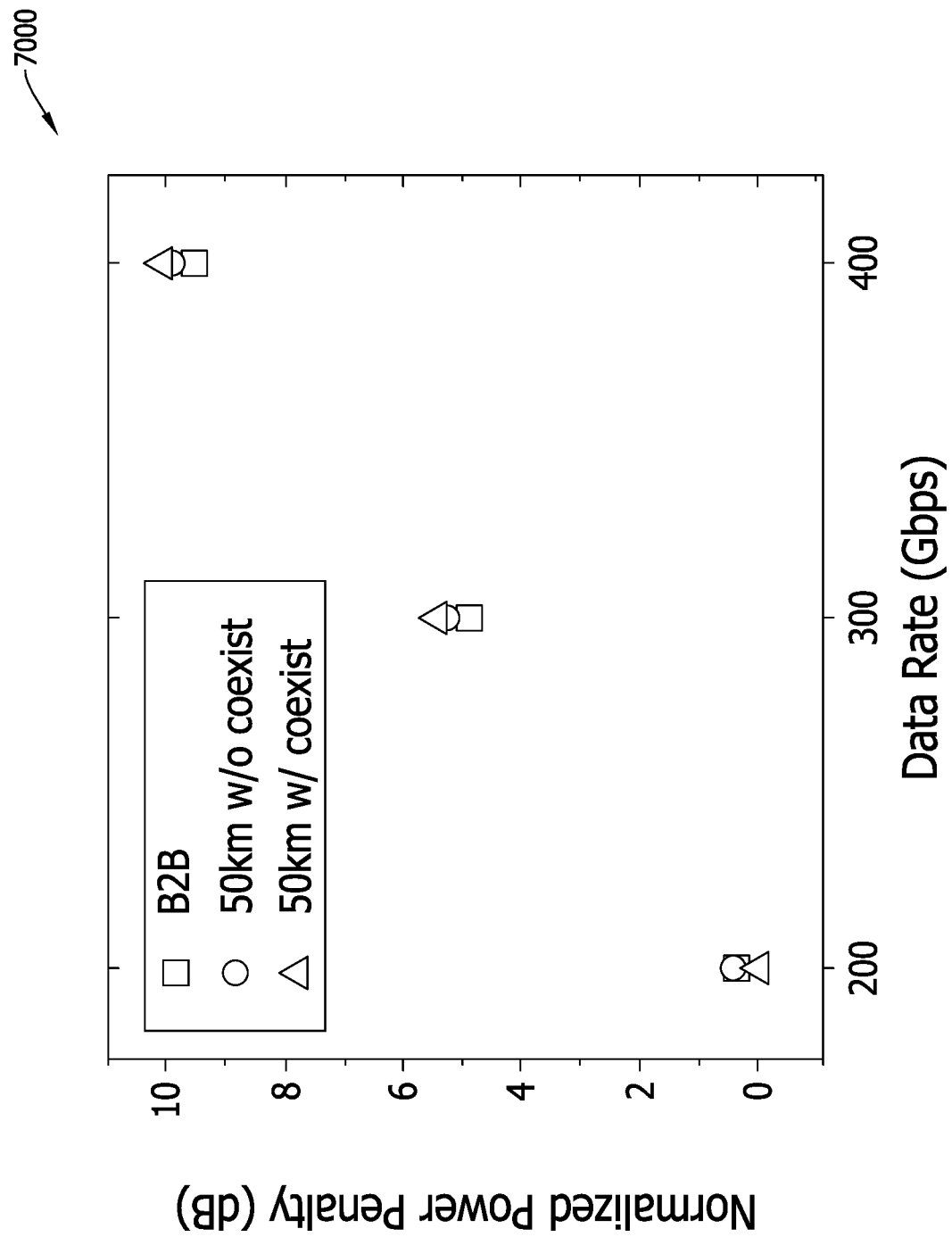

FIG. 70 is a graphical illustration of a comparative plot of normalized power penalty against data rate.

Figure 71:
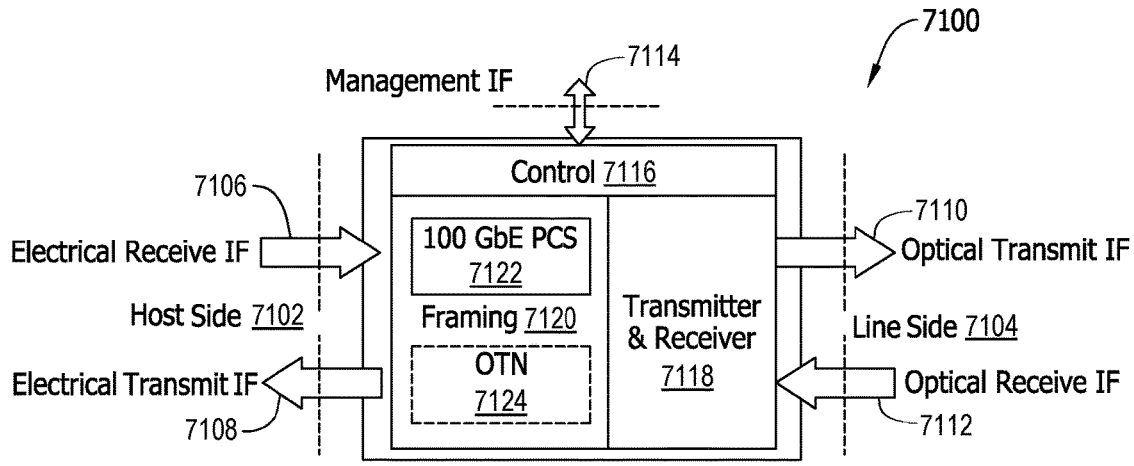

FIG. 71 is a schematic illustration of a transceiver having a dual optical interface structure.

Figure 72:
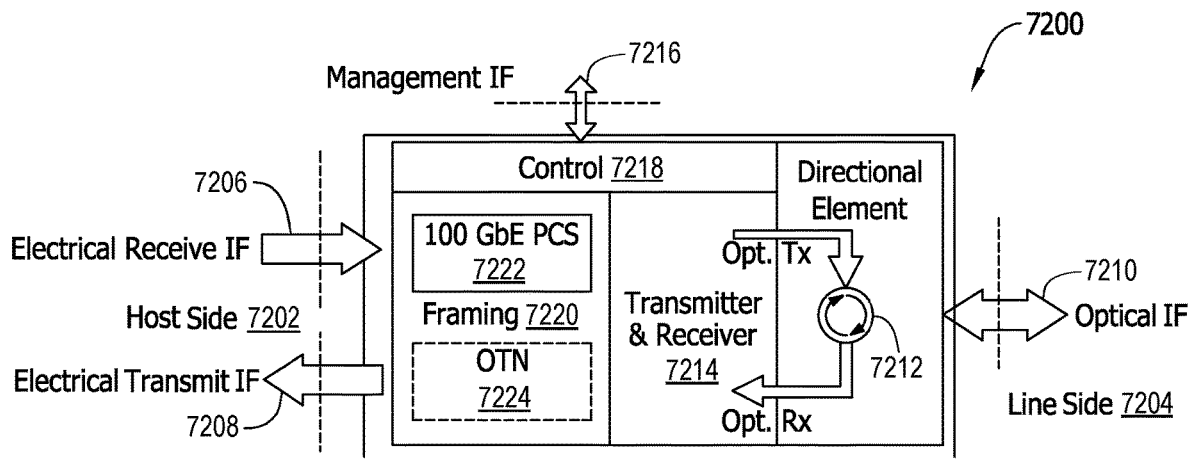

FIG. 72 is a schematic illustration of a transceiver having a single optical interface structure.

Figure 73:
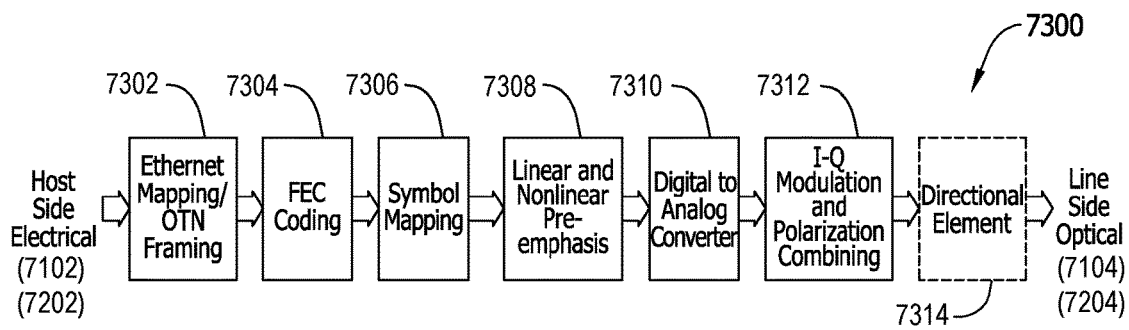

FIG. 73 is a functional schematic illustration of a transmitter.

Figure 74:
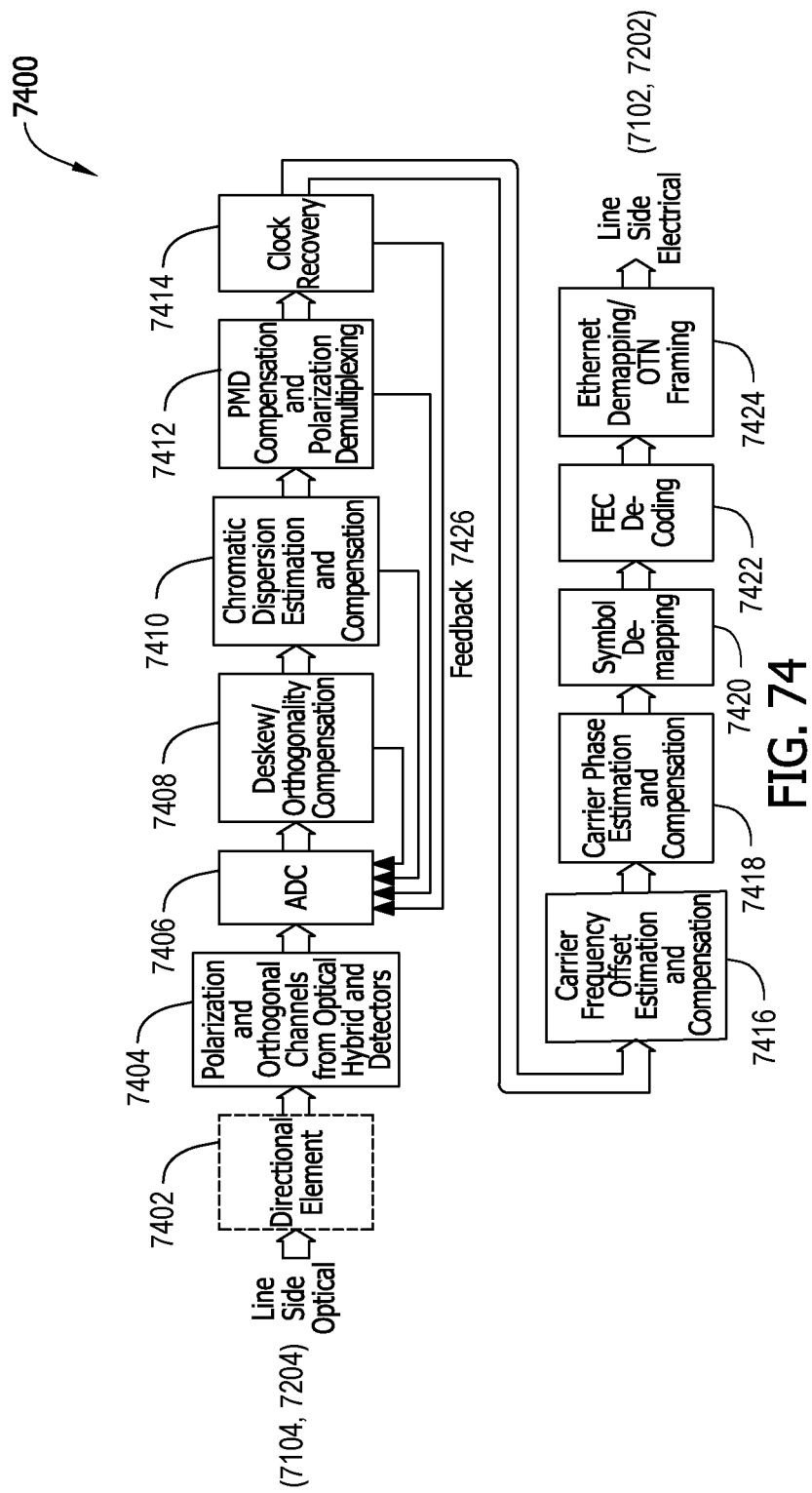

FIG. 74 is a functional schematic illustration of a receiver.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

As used herein, unless specified to the contrary, "modem termination system," or "MTS'" may refer to one or more of a cable modem termination system (CMTS), an optical network terminal (ONT), an optical line terminal (OLT), a network termination unit, a satellite termination unit, and/or other termination devices and systems. Similarly, "modem" may refer to one or more of a cable modem (CM), an optical network unit (ONU), a digital subscriber line (DSL) unit/modem, a satellite modem, etc.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The embodiments described herein provide innovative systems and methods for full-duplex coherent optics, that is, bidirectional (BiDi) coherent optics networks. The present techniques may further advantageously implement passive optical circulators and a variety of versatile architectural configurations to separate the upstream and downstream signal flows of the BiDi network. According to these embodiments, spectral efficiency is significantly improved in both the downstream and upstream directions. As described further herein, both the downstream and upstream transmissions may utilize the same wavelength and simultaneous transmission over the same fiber, thereby doubling the spectral efficiency of existing coherent transmission systems or networks.

Figure 1:
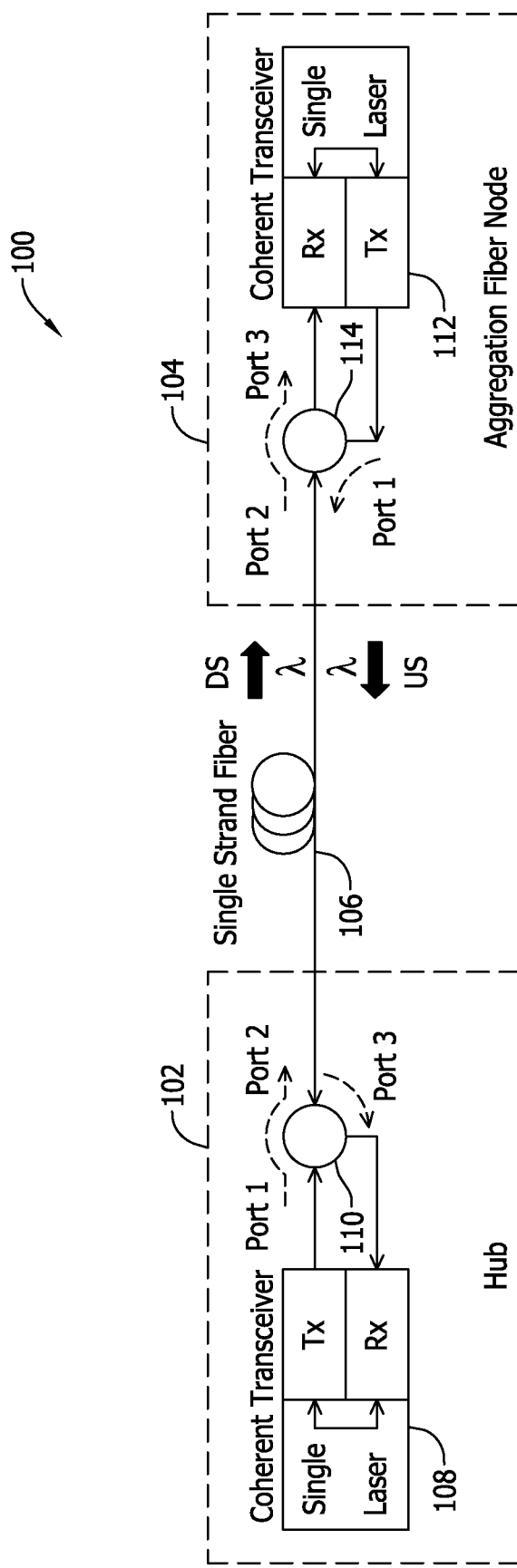
FIG. 1 is a schematic illustration of a coherent optics network architecture.

FIG. 1 is a schematic illustration of a coherent optics network architecture 100. In the example depicted in FIG. 1, architecture 100 represents an aggregation use case for a distributed coherent optics network. Architecture 100 includes a hub 102, a node 104, and a transport medium 106 (e.g., an optical fiber) communicatively coupled therebetween. In an exemplary embodiment, transport medium 106 is a single strand fiber for a coherent optic link. Architecture 100 further includes a hub coherent transceiver 108 and a hub optical circulator 110 (e.g., a three-port optical circulator in the illustrated example) at hub 102. Similarly, architecture 100 includes a node coherent transceiver 112 and a node optical circulator 114.

In an exemplary embodiment, coherent transceivers 108, 112 include a single laser source, a transmitting portion, and a receiving portion, respectively (not separately numbered). In operation, architecture 100 is configured for bidirectional transmission of a wavelength λ in both the downstream (DS) and upstream (US) directions. In particular, architecture 100 represents transmission over a single channel (e.g., 100 G, 200 G, etc.), where both coherent transceivers 108, 112 use their respective single laser sources for both transmitter LO and receiver LO. That is, the wavelength λ is the same for both the downstream and upstream transmission.

Exemplary architectures of coherent hub-to-node networks and systems are described in greater detail in co-pending U.S. Pat. No. 9,912,409, and in U.S. Pat. No. 10,200,123, the disclosures of both which are incorporated by reference herein. Additionally, the person of ordinary skill in the art will understand that architecture 100 is simplified for ease of explanation, does not necessarily illustrate all components that may be implemented within a hub and/or fiber node.

Figure 2:
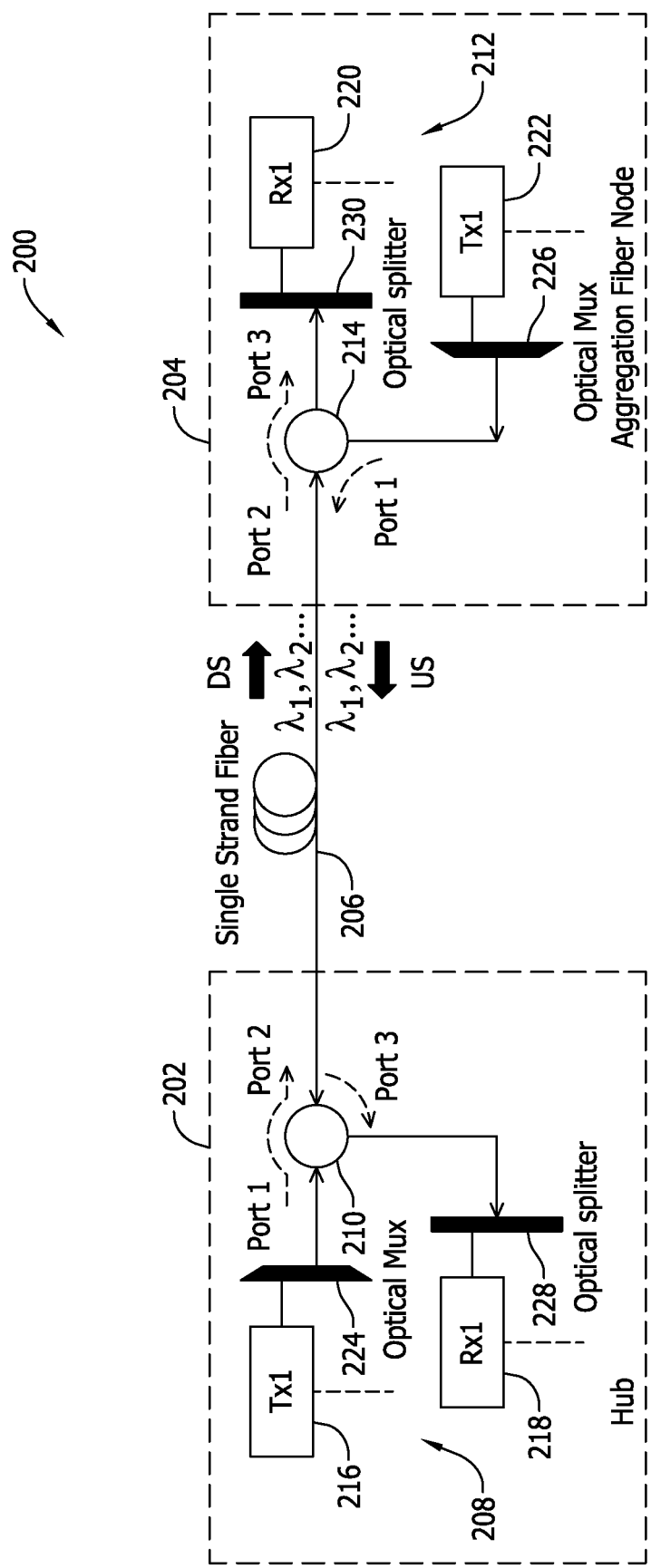
FIG. 2 is a schematic illustration of a coherent optics network architecture.

FIG. 2 is a schematic illustration of a coherent optics network architecture 200. Architecture 200 is similar to architecture 100, FIG. 1, and also represents an example of an aggregation use case. Accordingly, architecture 200 includes a hub 202, a fiber node 204, a transport medium/fiber 206, a hub coherent transceiver 208, a hub optical circulator 210, a node coherent transceiver 212, and a node optical circulator 214. In the example depicted in FIG. 2, hub coherent transceiver 208 includes a hub transmitter 216 and a separate hub receiver 218. Similarly, node coherent transceiver 212 includes a node receiver 220 and a node transmitter 222.

In an exemplary embodiment, architecture 200 is configured to implement transmission over a dense wavelength division multiplexing (DWDM) channel, and further includes a first optical splitter 228 at hub 202 and a second optical splitter 230 at node 204. In an embodiment, architecture 200 further includes a first optical multiplexer 224 at hub 202 and a second optical multiplexer 226 at node 204. In this example, architecture 200 is configured to transmit multiple wavelengths $\lambda_1, \lambda_2, \ldots \lambda_N$ in both directions. In the example depicted in FIG. 2, a demultiplexer is optionally the necessary at coherent receivers 218, 220 where the respective LO serves for signal selectivity. This embodiment may, for example, be particularly advantageous in the case of a limited number of DWDM channels.

Figure 3:
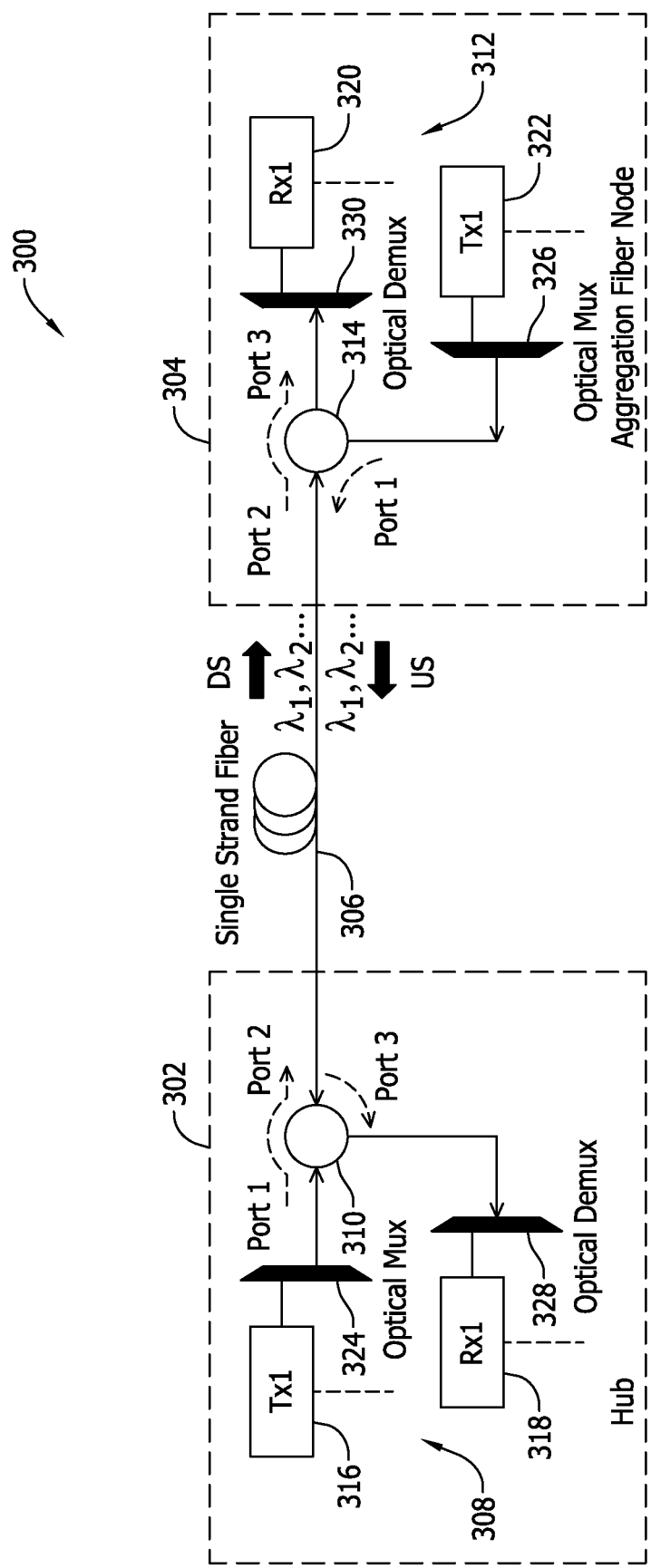
FIG. 3 is a schematic illustration of a coherent optics network architecture.

FIG. 3 is a schematic illustration of a coherent optics network architecture 300. Architecture 300 is similar to architecture 200, FIG. 2, and also represents an example of an aggregation use case and is configured to implement DWDM transmission. Accordingly, architecture 300 includes a hub 302, a fiber node 304, a transport medium/fiber 306, a hub coherent transceiver 308, a hub optical circulator 310, a node coherent transceiver 312, a node optical circulator 314, a hub transmitter 316, a hub receiver 318, a node receiver 320, a node transmitter 322, a first optical multiplexer 324, and a second optical multiplexer 326. Architecture 300 differs though, from architecture 200 in that architecture 300 further includes a first optical demultiplexer 328 at hub 302 and a second optical demultiplexer 330 at node 304. That is, architecture 300 effectively replaces first optical splitter 228 and second optical splitter 230 with first optical demultiplexer 328 and second optical demultiplexer 330, respectively.

Figure 4:
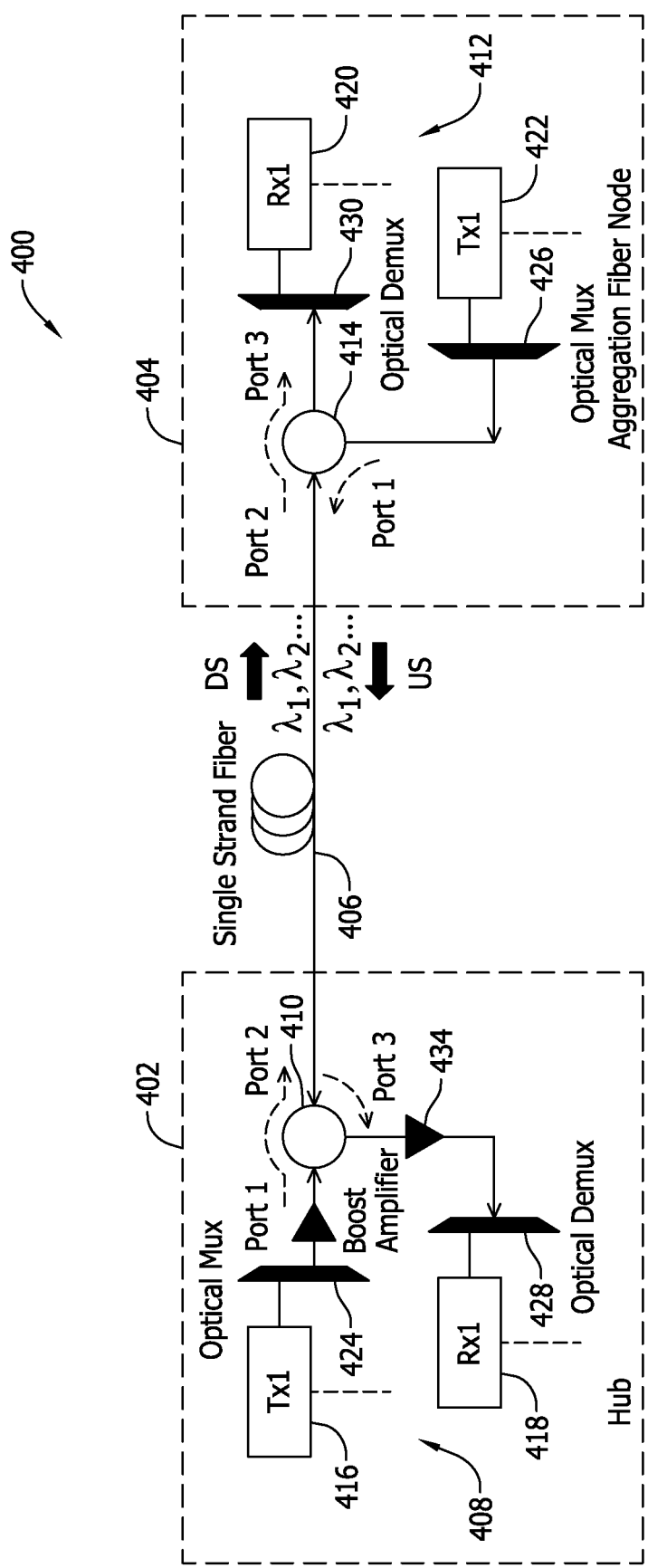
FIG. 4 is a schematic illustration of a coherent optics network architecture.

FIG. 4 is a schematic illustration of a coherent optics network architecture 400. Architecture 400 is similar to architecture 300, FIG. 3, and also represents an example of an aggregation use case for DWDM channels. Accordingly, architecture 400 includes a hub 402, a fiber node 404, a transport medium/fiber 406, a hub coherent transceiver 408, a hub optical circulator 410, a node coherent transceiver 412, a node optical circulator 414, a hub transmitter 416, a hub receiver 418, a node receiver 420, a node transmitter 422, a first optical multiplexer 424, a second optical multiplexer 426, a first optical demultiplexer 428, and a second optical demultiplexer 430. Architecture 400 differs though, from architecture 300 in that architecture 400 further includes a boost amplifier 432 between first optical multiplexer 424 and hub optical circulator 410, and a pre-amplifier 434 between hub optical circulator 410 and first optical demultiplexer 428. In an exemplary embodiment, boost amplifier 432 and pre-amplifier 434 are erbium-doped fiber amplifiers (EDFAs) functioning as optical repeater devices that boost the intensity of optical signals being carried through the fiber optic communications system of architecture 400.

Figure 5:
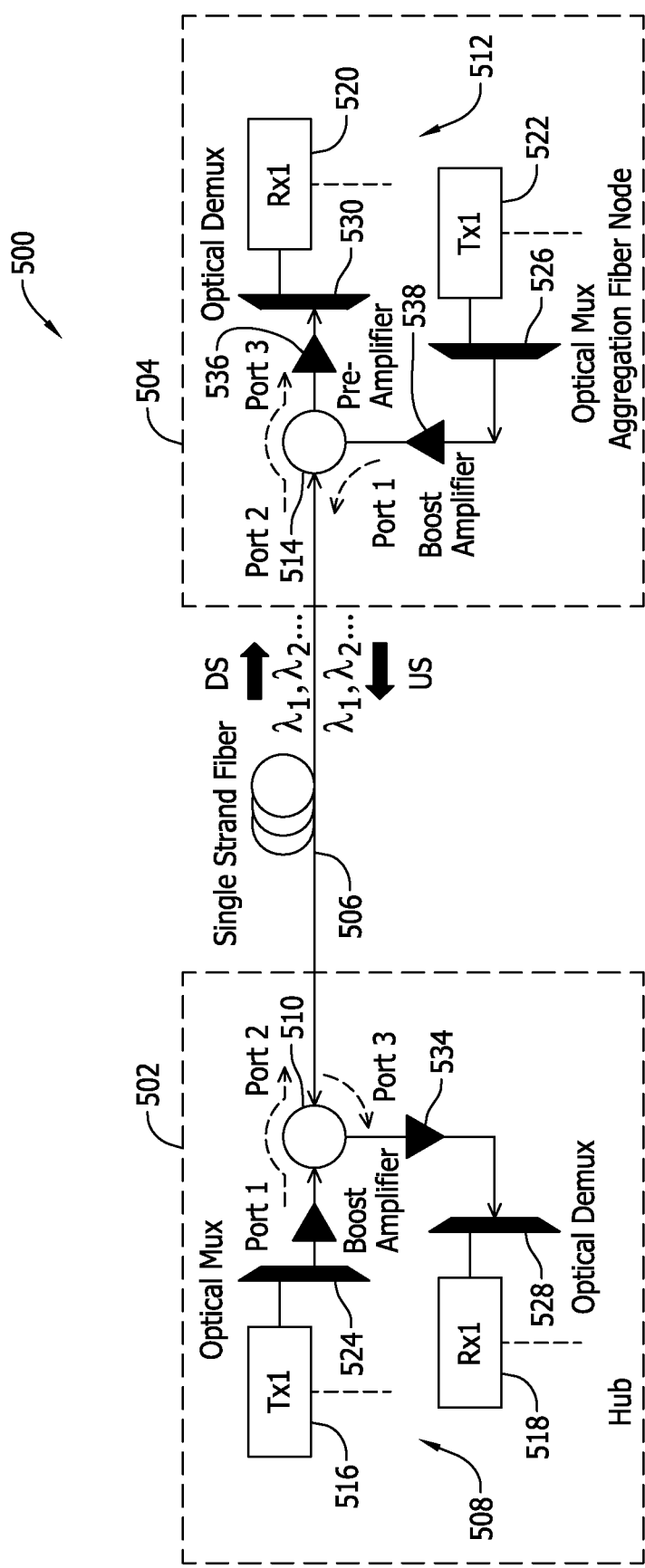
FIG. 5 is a schematic illustration of a coherent optics network architecture.

FIG. 5 is a schematic illustration of a coherent optics network architecture 500. Architecture 500 is similar to architecture 400, FIG. 4, and also represents an example of an aggregation use case for DWDM channels. Accordingly, architecture 500 includes a hub 502, a fiber node 504, a transport medium/fiber 506, a hub coherent transceiver 508, a hub optical circulator 510, a node coherent transceiver 512, a node optical circulator 514, a hub transmitter 516, a hub receiver 518, a node receiver 520, a node transmitter 522, a first optical multiplexer 524, a second optical multiplexer 526, a first optical demultiplexer 528, a second optical demultiplexer 530, a hub boost amplifier 532, and a hub pre-amplifier 534. Architecture 500 differs though, from architecture 400 in that architecture 500 further includes a node pre-amplifier 538 between node optical circulator 514 and second optical demultiplexer 530, and a node boost amplifier 538 between second optical multiplexer 526 and node optical circulator 514. In an exemplary embodiment, node pre-amplifier 536 and node boost amplifier 432 are also EDFAs.

The several architectures described herein were subject to proof of concept, which produced significant preliminary experimental results. In exemplary experimentation, forward error correction (FEC) encoding was employed (e.g., staircase FEC). Some of the FEC results reflect the use of hard decision (HD) FEC (HD-FEC) for case of 100 G with 7% overhead, staircase FEC. In one particular embodiment, approximately a 1 dB power penalty was had for a 7% staircase FEC at 4.5e-3 for both directions in single channel 100 G testing (single channel case).

A difference may then be seen between the upstream and downstream transmissions due to the sensitivity differences of the respective coherent receivers. However, after correction by HD-FEC techniques, no error was found over a 80-km transmission. Nevertheless, the different output powers from the respective coherent transmitters exhibits a noticeable impact on the link receiver sensitivity. Accordingly, for a particular transmission link, it is further desirable to utilize the present techniques to optimize output power to minimize the power penalty, as described further below. The experimental results described herein also consider various parameters of the respective optical circulators as featured below in Table 1.

TABLE 1

| Wavelength Range | | nm | 1525-1610 |
|---|---|---|---|
| Insertion Loss | Port 1 → 2 | dB | 0.73 |
| | Port 2 → 3 | | 0.66 |

TABLE 1-continued

| Wavelength Range | | nm | 1525-1610 |
|---|---|---|---|
| PDL | Port 1 → 2 | dB | 0.05 |
|  | Port 2 → 3 |  | 0.04 |
| Return Loss | Port 1 | dB | 60 |
|  | Port 2 |  | 60 |
|  | Port 3 |  | 60 |
| Isolation at 1570 nm | Port 2 → 1 |  | 52 |
|  | Port 3 → 2 |  | 57 |
| Directivity | Port 1 → 3 |  | 60 |
|  | Port 3 → 1 |  | 55 |
| PMD |  | ps | <0.05 |

Figure 6:
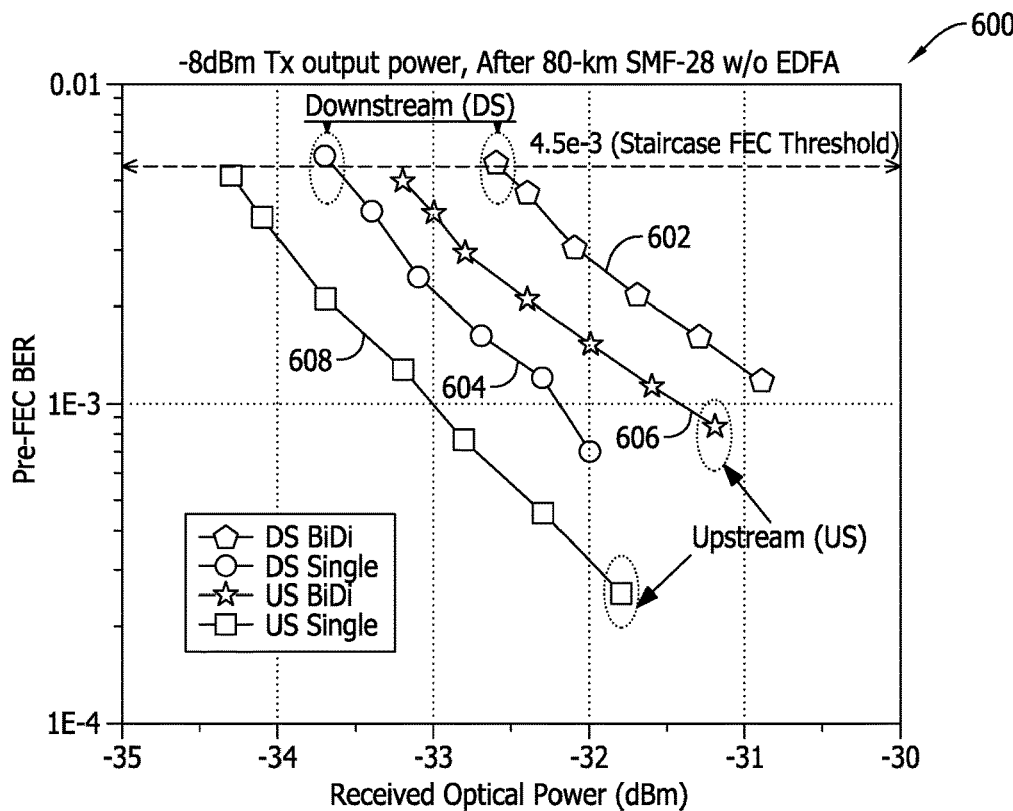
FIG. 6 is graphical illustration of a comparative plot of bit error rate against received optical power.

FIG. 6 is graphical illustration of a comparative plot 600 of bit error rate (BER) against received optical power. In an exemplary embodiment, plot 600 represents the received optical power over an 80-km single mode fiber (SMF), such as an SMF-28, and for a transmitter output power of −8 dBm (without EDFAs, in this example) and a 4.5e-3 staircase FEC threshold. Plot 600 includes a first sub-plot 602 representing a downstream transmission in a bidirectional use case, a second sub-plot 604 representing a downstream transmission in a single direction use case, a third sub-plot 606 representing an upstream transmission in the bidirectional use case, and a fourth sub-plot 608 representing an upstream transmission in the single direction use case. As can be seen from the example depicted in FIG. 6, the received optical power is consistently greater in the bidirectional case, in both the downstream and upstream directions.

Figure 7:
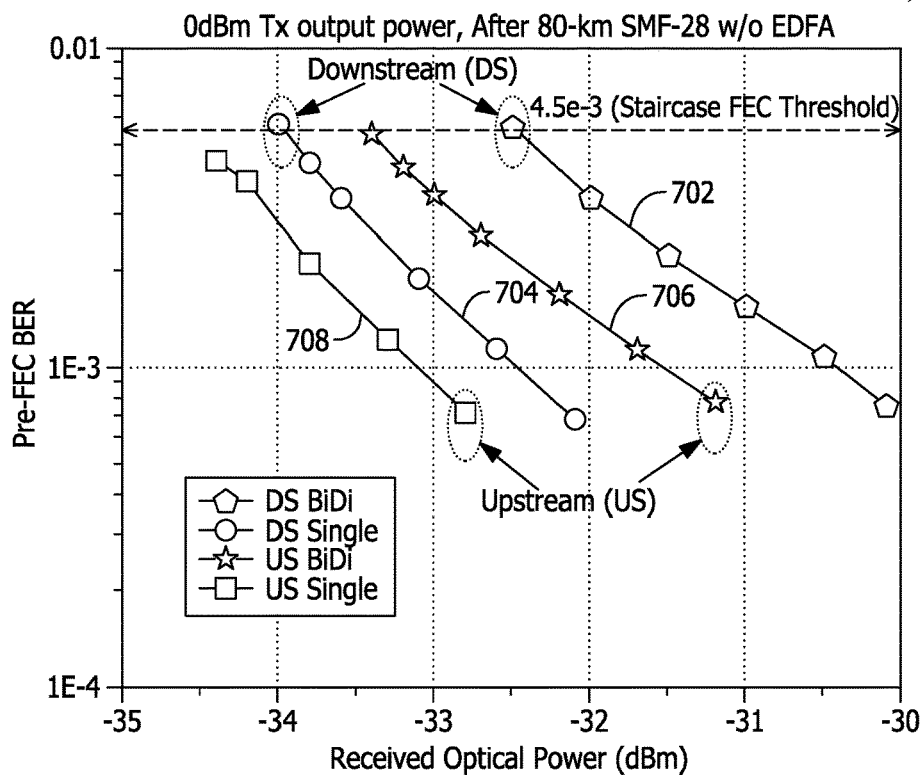
FIG. 7 is graphical illustration of a comparative plot of bit error rate against received optical power.

FIG. 7 is graphical illustration of a comparative plot 700 of BER against received optical power. Plot 700 is similar to plot 600, FIG. 6, in that plot 700 represents the received optical power over an 80-km SMF-28, a 4.5e-3 staircase FEC threshold, and without EDFA. Plot 700 differs from plot 600 though, in that plot 700 represents the experimental results for a transmitter output power of 0 dBm. Plot 700 includes a first sub-plot 702 representing a downstream transmission in the bidirectional use case, a second sub-plot 704 representing a downstream transmission in the single direction use case, a third sub-plot 706 representing an upstream transmission in the bidirectional use case, and a fourth sub-plot 708 representing an upstream transmission in the single direction use case. As can be seen from the example depicted in FIG. 7, the received optical power is again consistently greater in the bidirectional case, in both the downstream and upstream directions.

Figure 8:
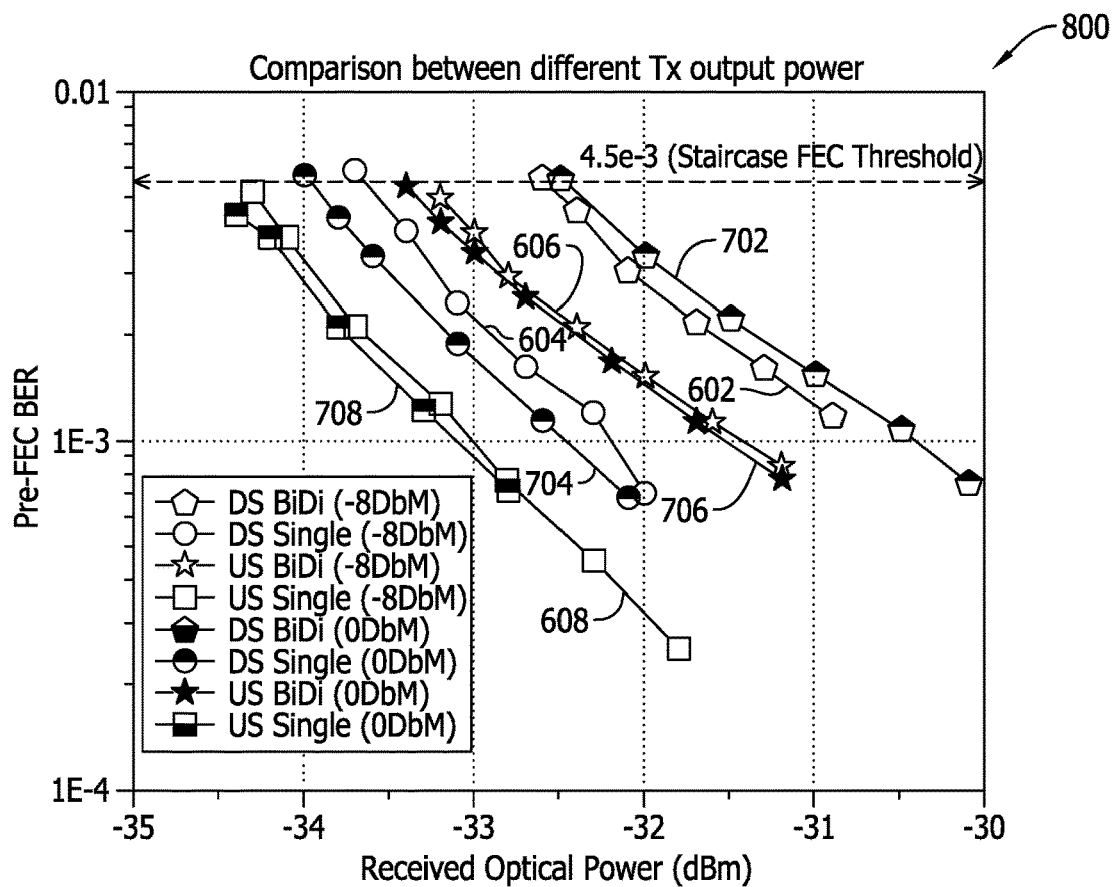
FIG. 8 is graphical illustration of a superposition of the plots depicted in FIGS. 6 and 7.

FIG. 8 is graphical illustration of a superposition 800 of plot 600, FIG. 6, and plot 700, FIG. 7. Superposition 800 illustrates how the received optical power generally tracks with the results of different transmitter output powers, and is generally higher as the transmitter output power increases, except in the bidirectional downstream transmission.

From the preliminary results of the embodiments described immediately above, additional analysis of testing results were obtained several implementations of full duplex coherent optics architectures and systems. Conventional full duplex coherent optics systems are subject to significant impairments, including: (i) Stimulated Brillouin Scattering (SBS); (ii) Rayleigh scattering (continuous reflection); (iii) Multiple-Path/Multipath Interference (MPI), for coherent or incoherent interference, and including double-Rayleigh scattering, local reflections (mechanical splices, fusion, jumper cables, etc.), and/or optical amplifiers; and (iv) Fresnel reflection (discrete reflections), including jumper cables, optical distribution panels, fusion, mechanical splices, etc.

Figure 9:
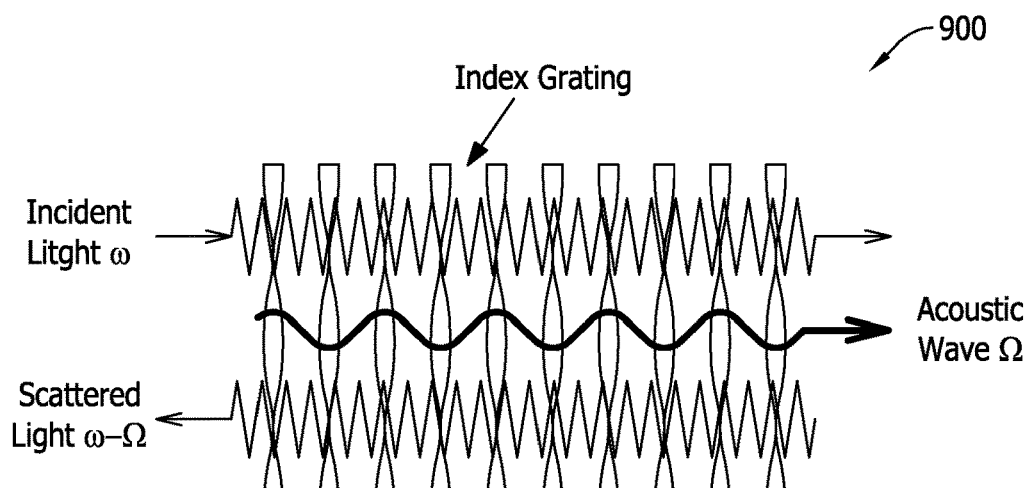
FIG. 9 depicts a stimulated Brillouin scattering effect.

FIG. 9 depicts a SBS effect 900. SBS effect 900 occurs, for example, where variations in the electric field of an incident beam of light (e.g., from a laser) traveling through a transport medium (e.g., an optical fiber), induce acoustic vibrations (i.e., an acoustic wave) in the fiber by electrostriction or radiation pressure. Brillouin scattering (e.g., scattered light) thus occurs, in the direction opposite the incident light beam as a result of the acoustic wave vibrations, as illustrated in FIG. 9. More particularly, SBS effect 900 occurs from the interaction between the light and acoustic waves. The propagating light beam in the fiber generates a propagating acoustic wave that creates a periodic variation of the fiber refractive index. The back-scattered wave, also referred to as a Stokes wave, is downshifted by approximately 11 GHz with respect to the incident light wave frequency. When increasing the launched power of the optical beam, the reflected power will increase linearly as a result of the Rayleigh back-scattering effect in the fiber. Above a given threshold, the reflected power will then increase exponentially due to SBS effect 900.

Figure 10:
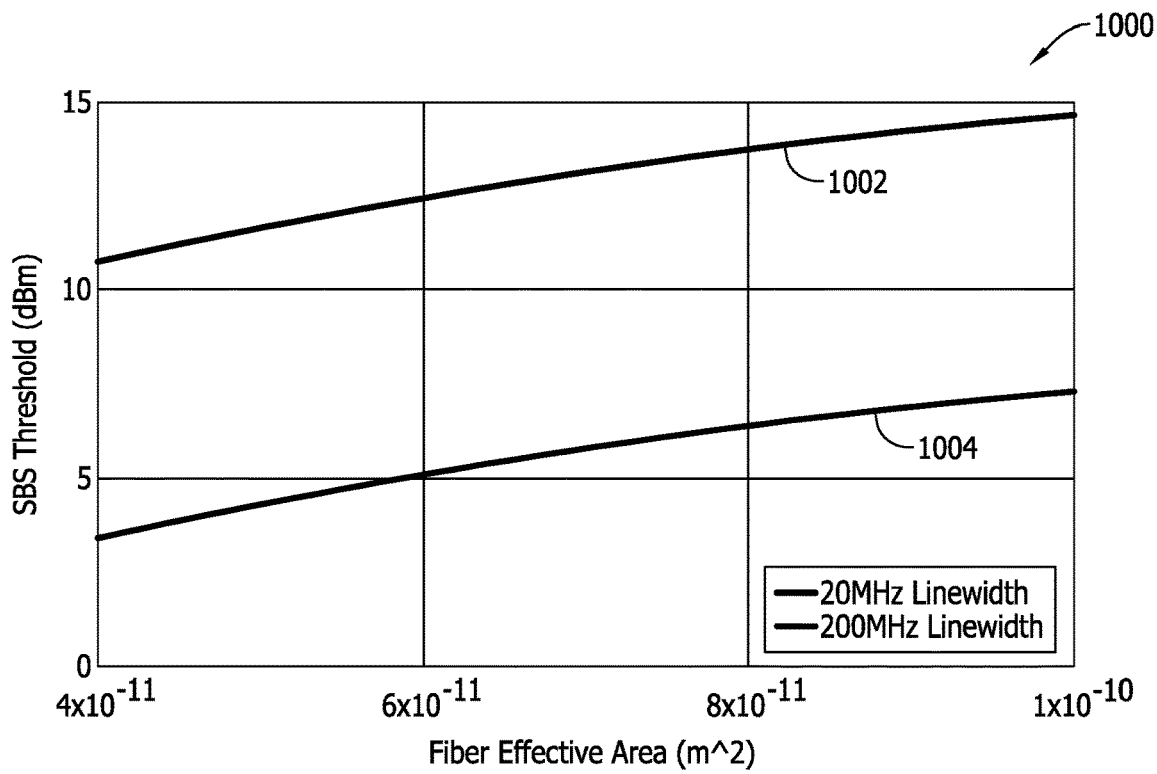
FIG. 10 is graphical illustration of a comparative plot of stimulated Brillouin scattering threshold against fiber effective area.

FIG. 10 is graphical illustration of a comparative plot 1000 of SBS threshold against fiber effective area. Comparative plot 1000 includes a first sub-plot 1002 representing a case of a 200 MHz linewidth, and a second sub-plot 1004 representing a case of a 20 MHz linewidth. As can be seen from the example depicted in FIG. 10, the SBS threshold is considerably greater as the linewidth increases.

In an exemplary embodiment, SBS threshold (Power_th) for an unmodulated continuous wave (CW) may be represented as:

$$\text{Power\_th}(B, g_b, \alpha_{dB}, A_{\text{eff}}, \text{Length}, \Delta v_s, \Delta v_B) :=$$

$$\frac{21 \cdot B \cdot A_{\text{eff}}}{g_b \cdot \frac{1 - e^{-\alpha_{dB} \cdot \frac{\ln(10)}{10} \cdot \text{Length}}}{\alpha_{dB} \cdot \frac{\ln(10)}{10}}} \cdot \left(1 + \frac{\Delta v_s}{\Delta v_B}\right)$$

Where B is a number between 1 and 2 of a polarization state, $A_{\text{eff}}$ is the effective area of fiber, $g_b$ is an SBS gain coefficient, Length is the fiber distance, $\alpha_{dB}$ is a fiber attenuation coefficient, $\Delta v_S$ is a linewidth of signal source, and $\Delta v_B$ is an SBS interaction bandwidth. In the example depicted in FIG. 10, the SBS threshold for the unmodulated CW was Power_th(1, $4*10^{-11}$, 0.0002, $A_{\text{eff}}$, $50*10^3$, $20*10^6$, $20*10^6$).

Figure 11:
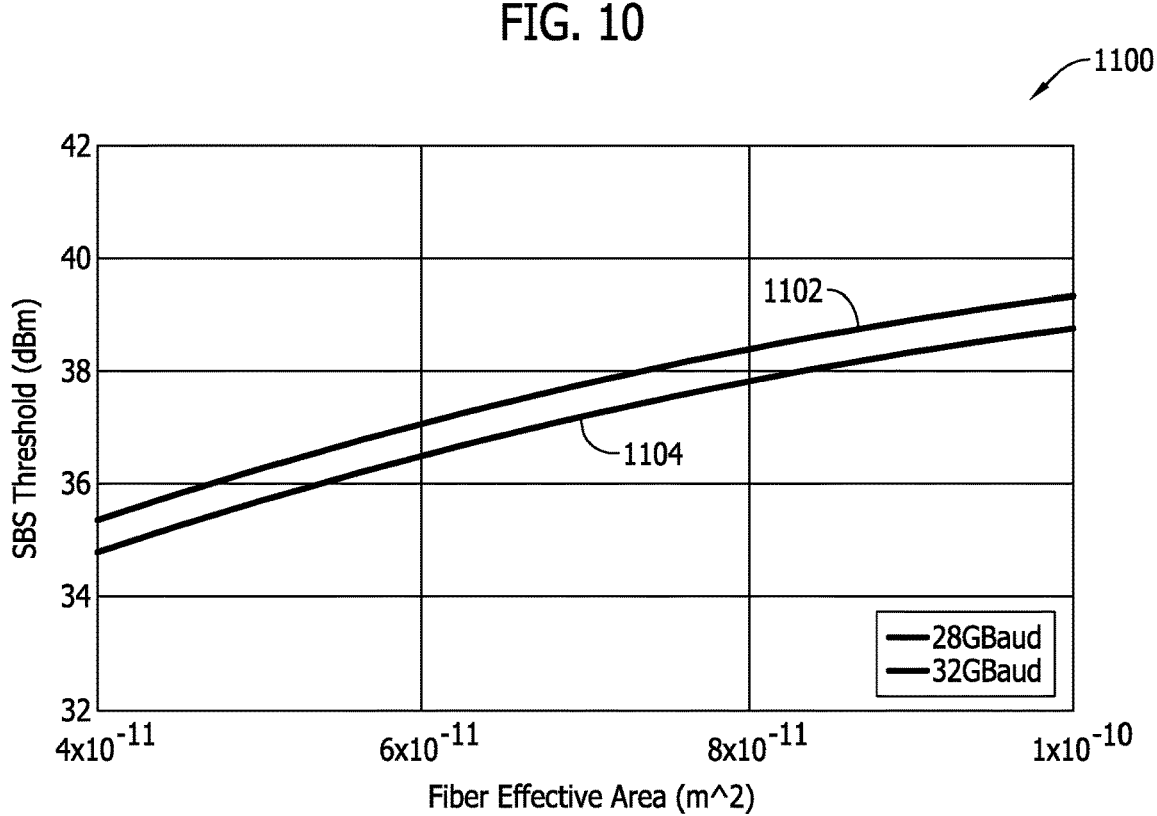
FIG. 11 is graphical illustration of a comparative plot of stimulated Brillouin scattering threshold against fiber effective area.

FIG. 11 is graphical illustration of a comparative plot 1100 of SBS threshold against fiber effective area. Comparative plot 1100 is similar to comparative plot 1000, FIG. 10, except that comparative plot 1100 depicts a comparison of different baud levels, as opposed to different linewidths. More specifically, comparative plot 1100 includes a first sub-plot 1102 representing a 32 GBaud case, and a second sub-plot 1004 representing a 28 GBaud case. As can be seen from comparative plot 1100, the SBS threshold is greater as the baud increases. In the example depicted in FIG. 11, the experimental results were gathered using PM-QPSK signals over a 50-km (19.54-km effective length) transmission, the SBS threshold for the PM-QPSK signals was Power_th(1, 4*10-11, 0.0002, $A_{\text{eff}}$, $50*10^3$, $28*10^9$, $20*10^6$).

Figure 12:
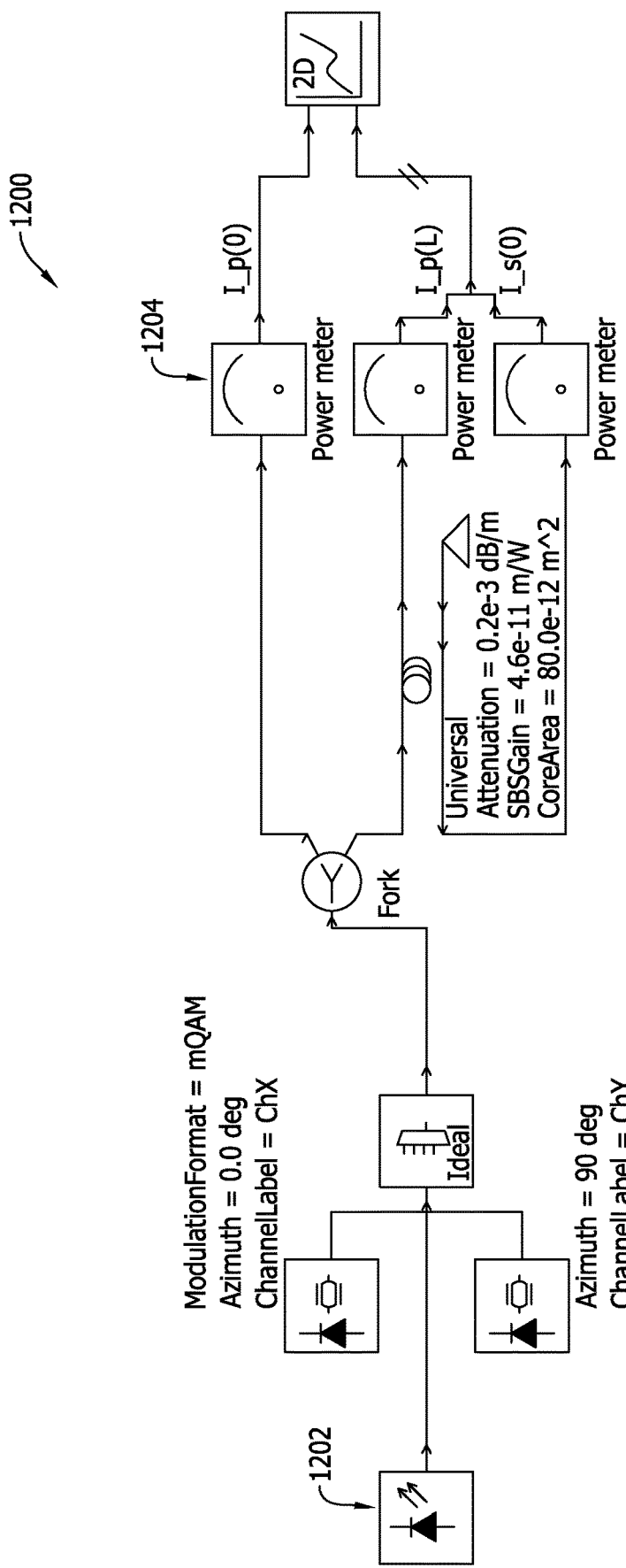
FIG. 12 is a schematic illustration of a coherent optics network test system.

FIG. 12 is a schematic illustration of a coherent optics network test system 1200. Test system 1200 was used to obtain, from an input power source 1202, measured power results 1204, as described further below with respect to FIGS. 13 and 14, for a CW source (e.g., comparative plot 1000, FIG. 10) and a QPSK source (e.g., comparative plot 1100, FIG. 11), respectively.

Figure 13:
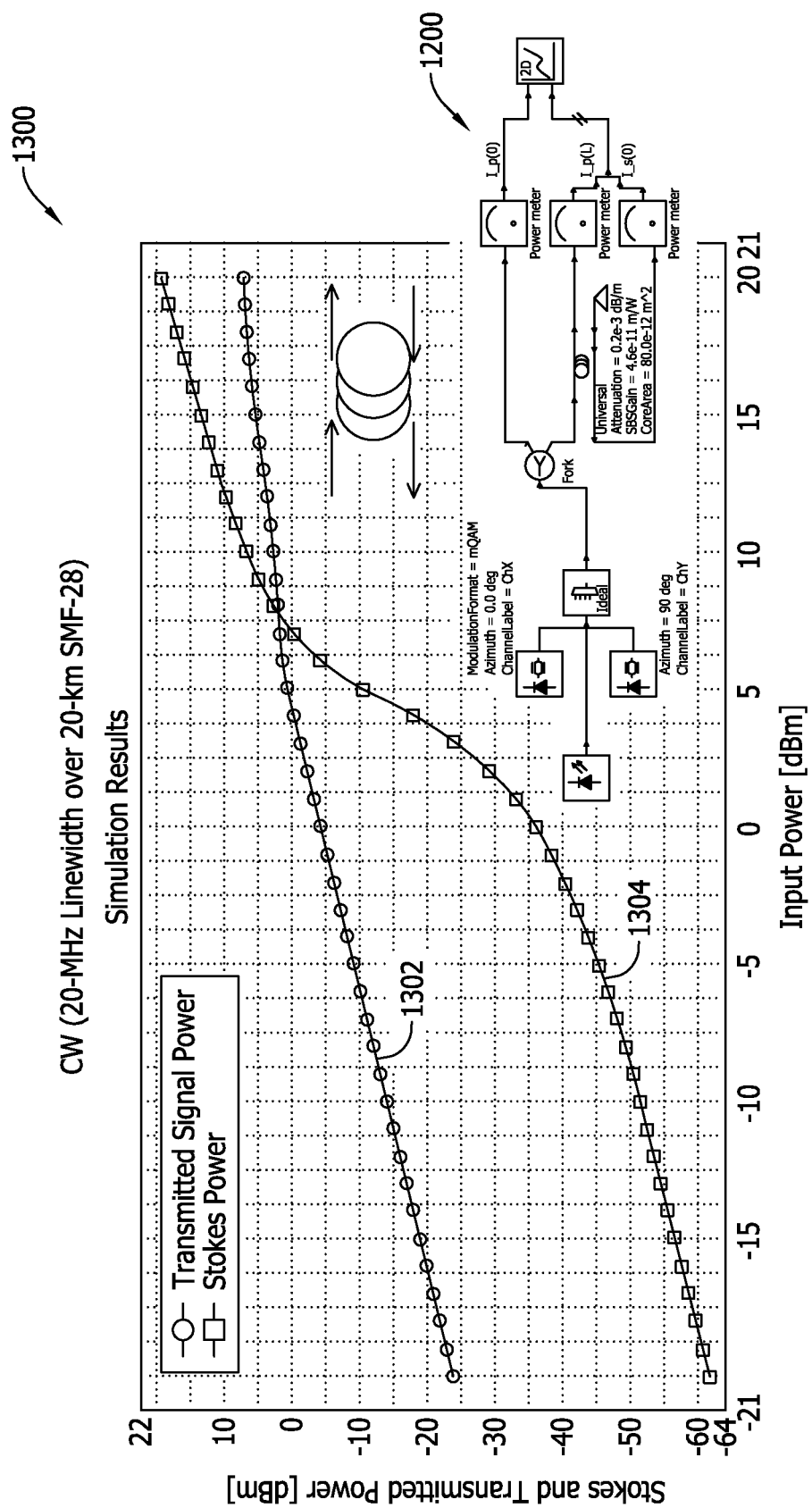
FIG. 13 is graphical illustration of a comparative plot of measured power against input power utilizing the test system depicted in FIG. 12.

FIG. 13 is graphical illustration of a comparative plot 1300 of measured power against input power utilizing test system 1200, FIG. 12, in a simulation. In an exemplary embodiment, the input power is representative of a CW source, and the measured power is for a 20 MHz linewidth over a 20-km SMF-28. In this example, the measured power of comparative plot 1300 includes a first sub-plot 1302 representing the transmitted signal power, and a second sub-plot 1304 representing the Stokes power. As can be seen from the example depicted in FIG. 13, the measured transmitted signal power 1302 is significantly greater than the Stokes power 1304 until the input power reaches approximately 7 dBm, above which the measured Stokes power 1304 exceeds the measured transmitted signal power.

Figure 14:
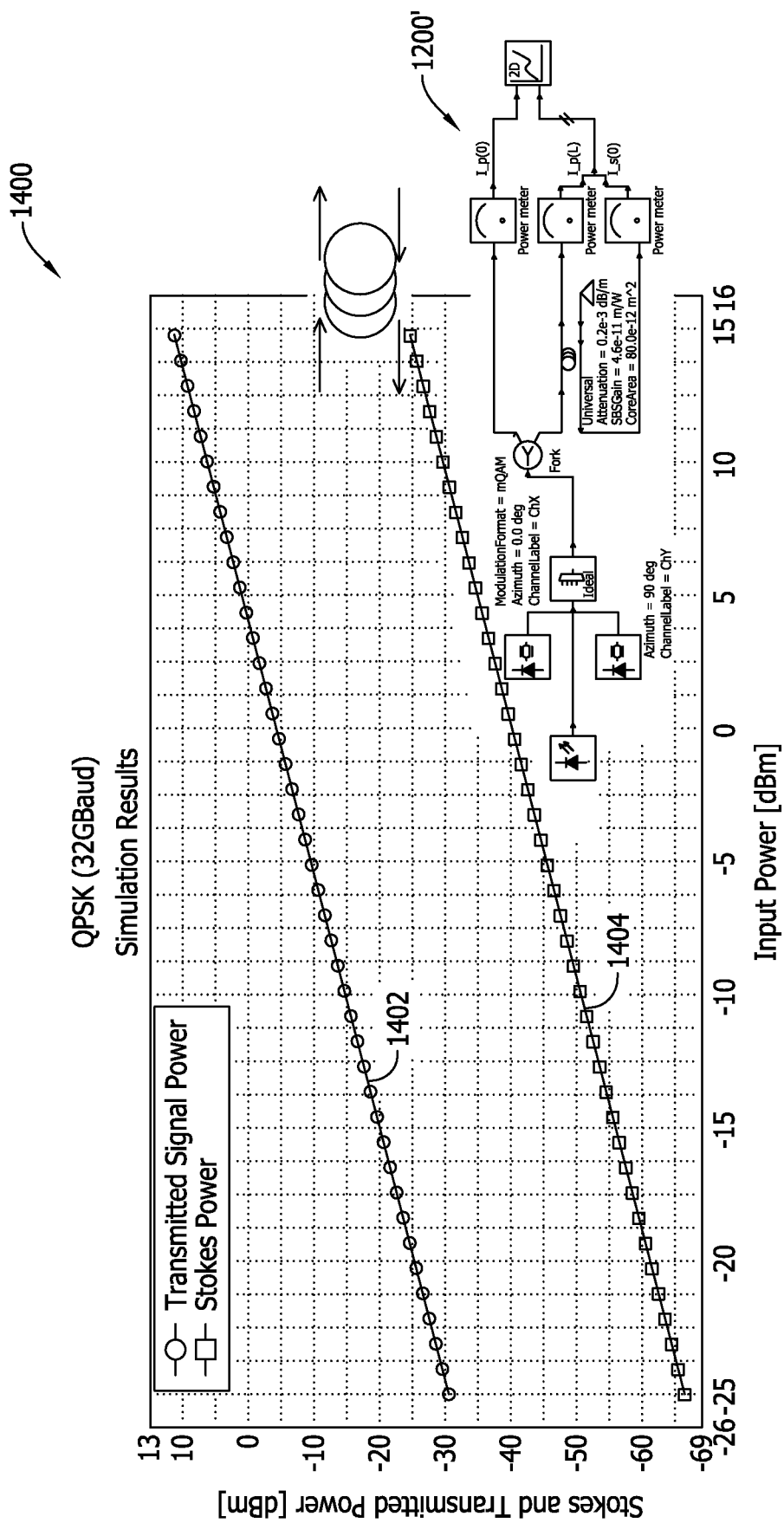
FIG. 14 is graphical illustration of an alternative comparative plot of measured power against input power.

FIG. 14 is graphical illustration of an alternative comparative plot 1400 of measured power against input power. Comparative plot 1400 is similar to comparative plot 1300, FIG. 13, except that comparative plot 1400 demonstrates the result of the simulation for a QPSK (32 GBaud) source utilizing test system 1200, FIG. 12, in alternative simulation. In this example, the measured power of comparative plot 1400 includes a first sub-plot 1402 representing the transmitted signal power, and a second sub-plot 1404 representing the Stokes power. As can be seen from the example depicted in FIG. 14, the measured transmitted signal power 1402 is consistently greater than the Stokes power 1404 across the entire range of input power levels.

Accordingly, in the case of SBS in coherent optic systems, because of the effect of phase-modulated signals on the reduction of optical carrier power, the effective linewidth is proportional to the signal baud rate. Accordingly, the SBS threshold power will significantly increase in a similar manner. However, the SBS was found to be negligible for a launch power less than 7 dBm/channel in the coherent optical systems described above with respect to FIG. 13 (CW source).

Simulations in consideration of Rayleigh scattering impairments are described further below with respect to FIGS. 15-17.

Figure 15:
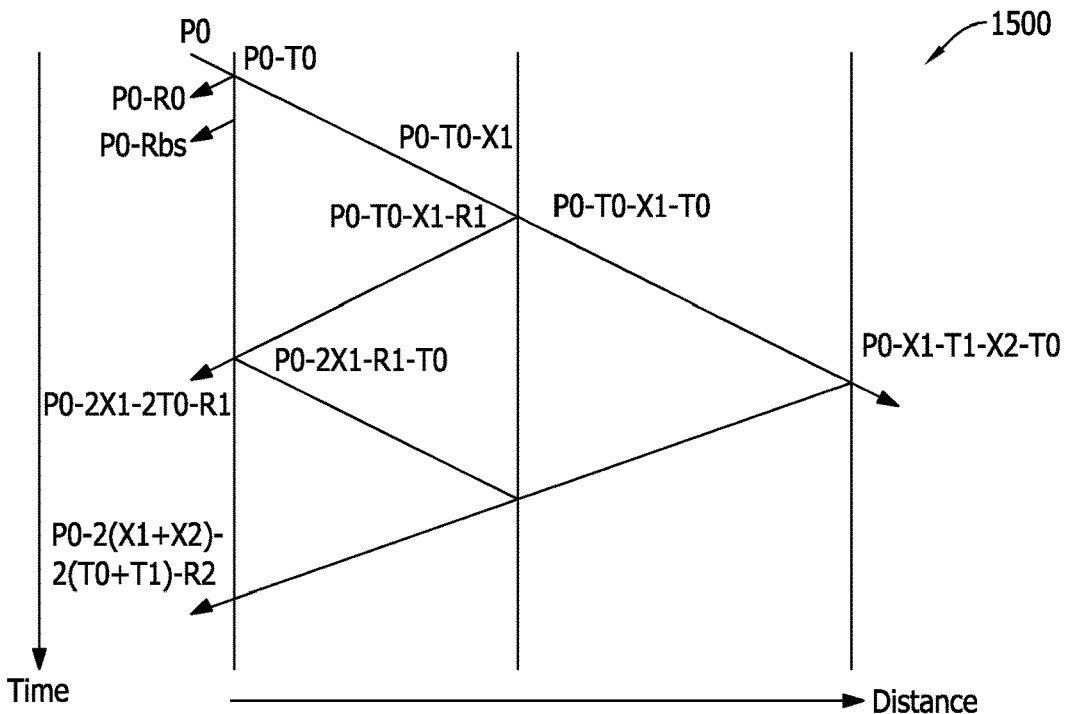
FIG. 15 is a zigzag reflection diagram of Rayleigh scattering.
Figure 16:
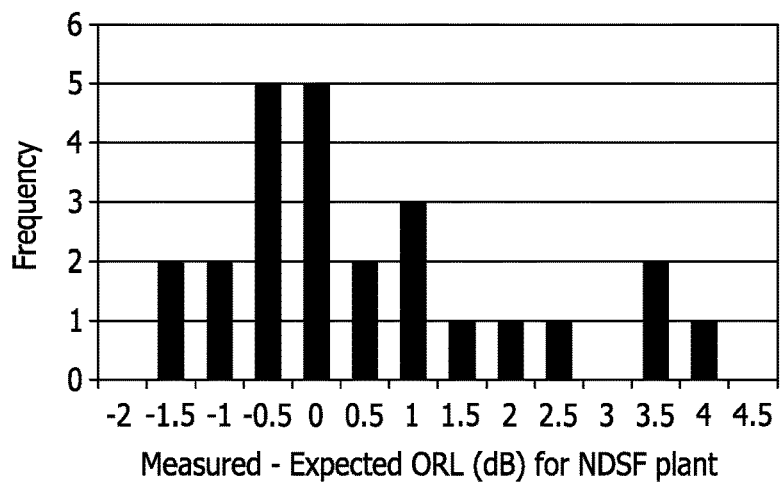
FIG. 16 is a graphical illustration depicting a histogram of frequency over optical return loss for a single mode fiber.

FIG. 15 is a zigzag reflection diagram 1500 of Rayleigh scattering. Reflection diagram 1500 demonstrates the significant of time and distance with respect to the scattering effect. FIG. 16 is a graphical illustration depicting a histogram 1600 of frequency against optical return loss (ORL) for an SMF-28. The example depicted in FIG. 16 illustrates a case of a non-dispersion-shifted fiber (NDSF) SMF-28.

Figure 17:
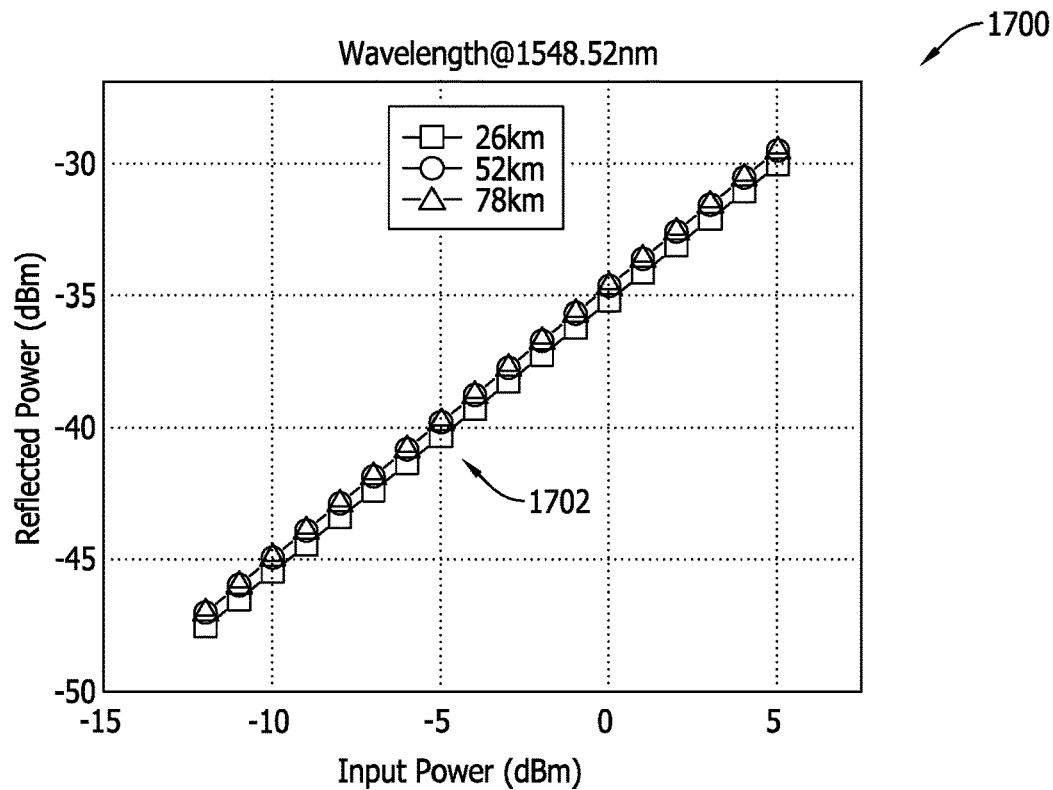
FIG. 17 is a graphical illustration depicting a comparative plot of reflected power against input power.

FIG. 17 is a graphical illustration depicting a comparative plot 1700 of reflected power against input power. Comparative plot 1700 depicts simulated results at a 1548.52 nm wavelength, and includes sub-plots 1702 representative of a 35 dB reflection power measured over different transmission distances of 26-km, 52-km, and 78-km, respectively. As can be seen from the example depicted in FIG. 17, the reflected power tracks fairly linearly with the input power, and is substantially agnostic of the various changes to the transmission distances.

Figure 18:
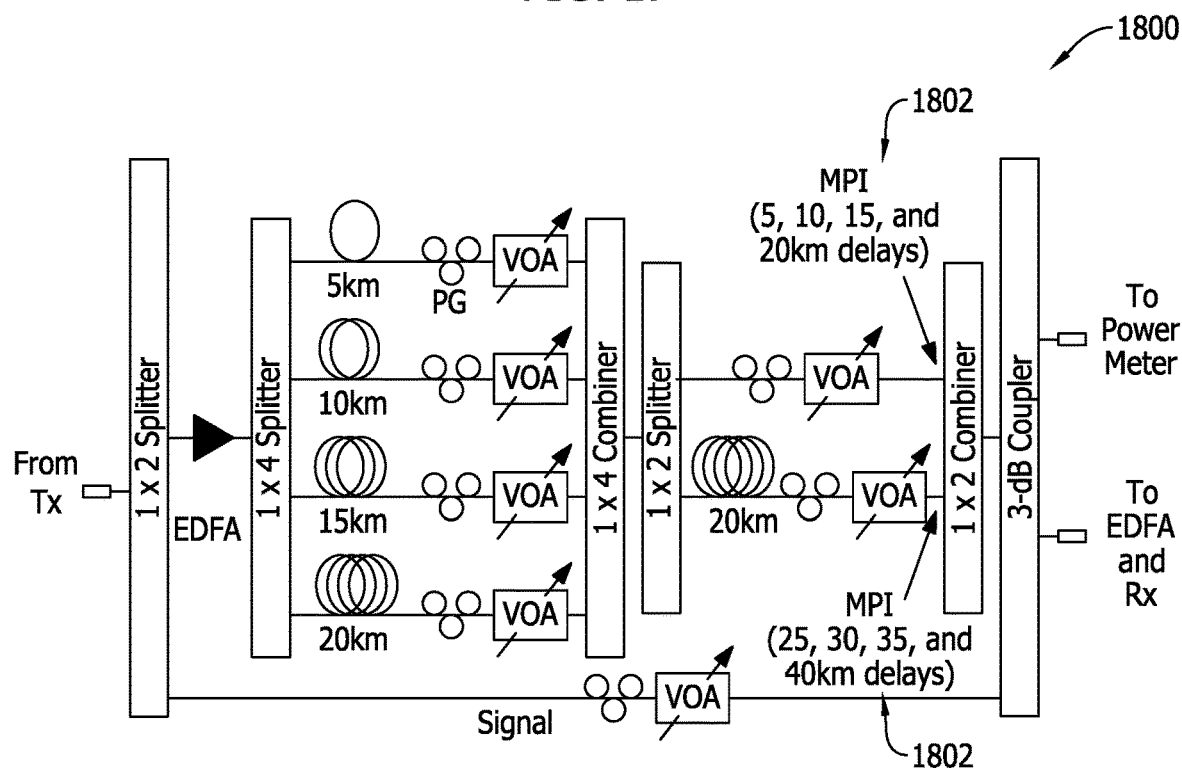
FIG. 18 is a schematic illustration of a multipath interference source system.

FIG. 18 is a schematic illustration of an MPI source system 1800. In the embodiment depicted in FIG. 18, system 1800 is utilized to produce MPI interference 1802 over eight separate paths (i.e., 5-km, 10-km, 15-km, 20-km, 25-km, 30-km, 35-km, and 40-km delays, in this example). In an exemplary embodiment, system 1800 implements a plurality of variable optical attenuators (VOAs).

Figure 19:
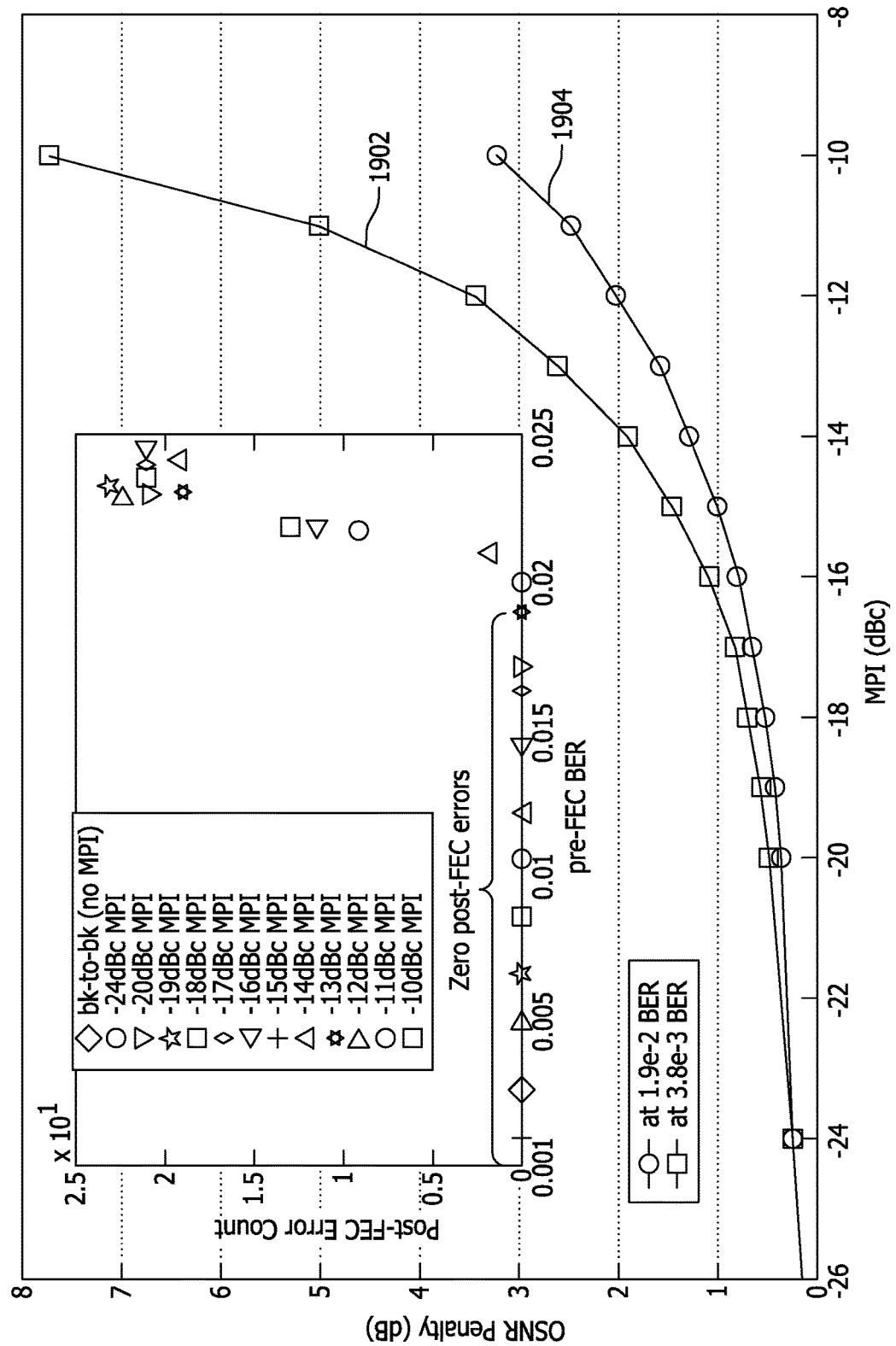
FIG. 19 is graphical illustration depicting a comparative plot of optical signal-to-noise ratio penalty as a function of multipath interference.

FIG. 19 is graphical illustration depicting a comparative plot 1900 of optical signal-to-noise ratio (OSNR) penalty as a function of MPI (e.g., FIG. 18). In this example, comparative plot 1900 includes a first sub-plot 1902 representative of a 3.8e-3 BER, and a second sub-plot 1904 representative of a 1.9e-3 BER. As can be seen from the example depicted in FIG. 19, the OSNR penalty increases exponentially as a function of MPI, and that this effect is significantly greater as the BER increases. Nevertheless, sub-plot 1902 demonstrates that, at 3.8e-3 BER, approximately 1 dB of OSNR penalty can be observed for −16 dBc of MPI, which indicates a significantly high tolerance to MPI. In the example depicted in FIG. 19, the results were obtained in consideration of the post-FEC error count against the pre-FEC BER, which included a substantial range having zero post-FEC errors.

Figure 20:
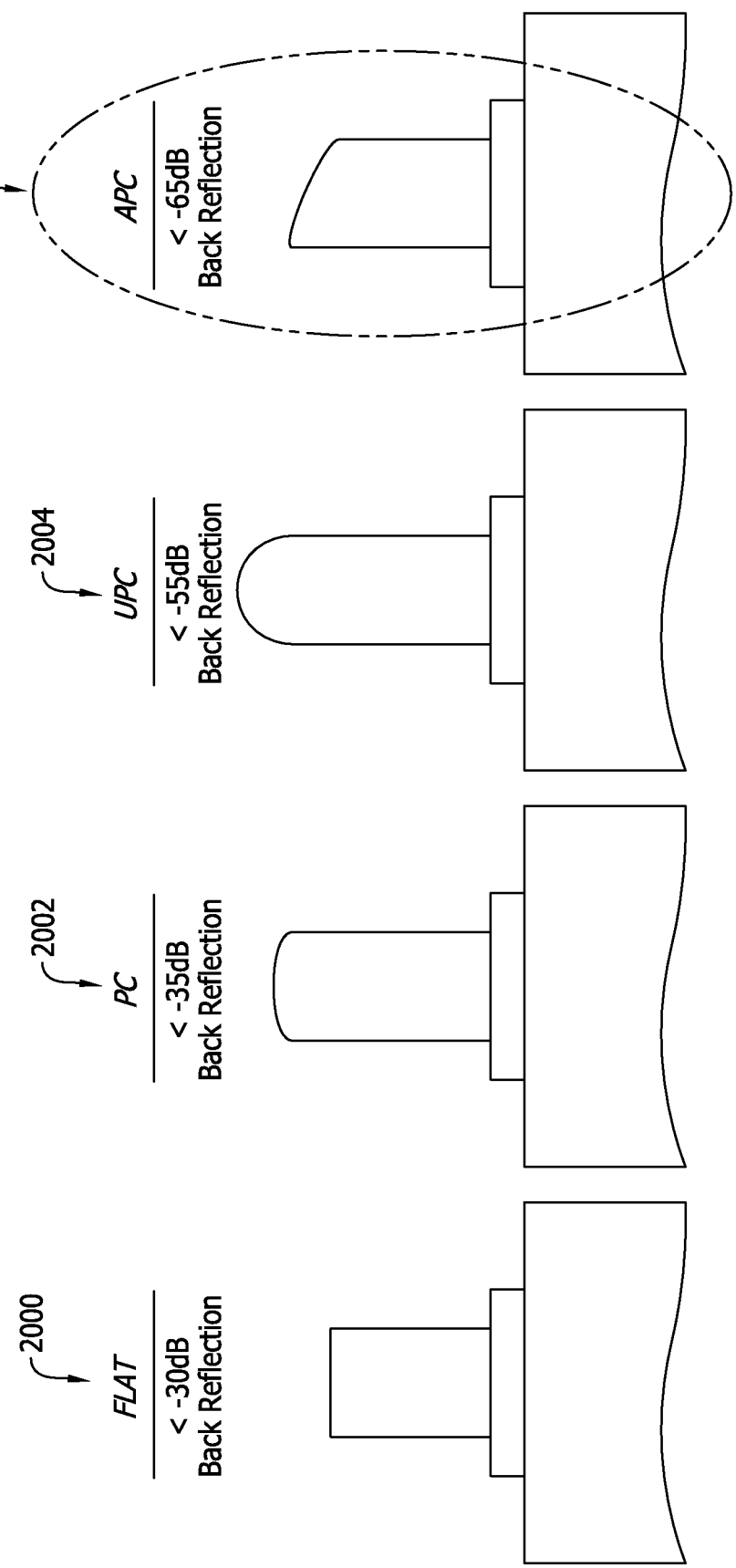
FIG. 20 depicts alternative fiber connector structures.

FIG. 20 depicts alternative fiber connector structures 2000, 2002, 2004, 2006 having different respective ferrule end finishes to reduce reflectance/loss. More specifically, structure 2000 represents a flat fiber optic end finish (e.g., less than −30 dB back reflection), structure 2002 represents a physical contact (PC) fiber optic end finish (e.g., less than −35 dB back reflection), structure 2004 represents an ultra physical contact (UPC) fiber optic end finish (e.g., less than −55 dB back reflection), and structure 2006 represents an angled physical contact (APC) optical end finish (e.g., less than −65 dB back reflection). APC structure 2006 is often found in existing hybrid fiber coaxial (HFC) networks, whereas UPC structure 2004 is often considered for networks having a relatively small number of digital links.

The following embodiments describe additional systems and methods for experimental analysis and lab testing for further proof of concept from the experimental results obtained thereby. More particularly, the embodiments depicted in FIGS. 21-27 generally correspond with the several hub-to-fiber node architectures depicted in FIGS. 1-5, described above, but are addressed more generally to the full duplex paradigm of bidirectionality, which may be more significantly agnostic of which direction is considered "downstream" versus "upstream."

Figure 21:
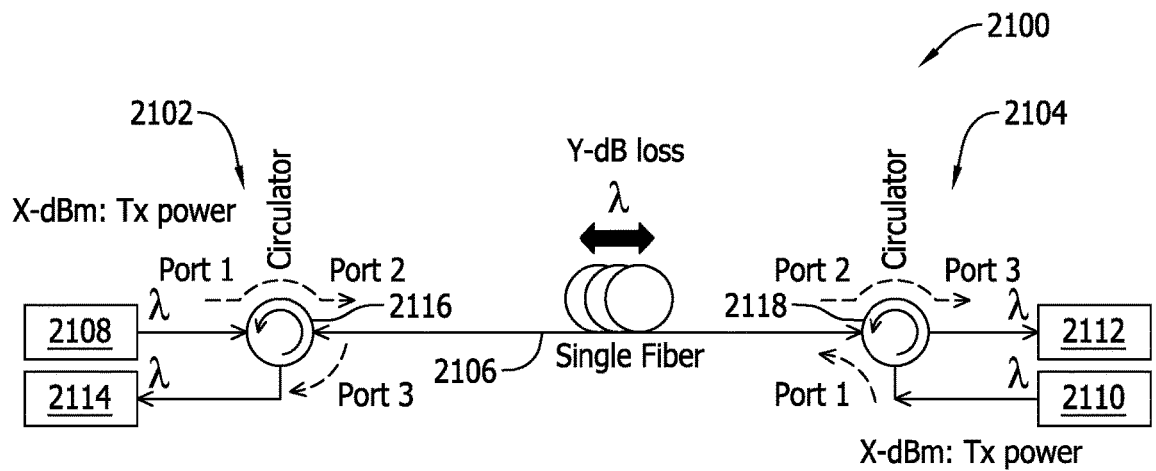
FIG. 21 is a schematic illustration of a coherent optics network architecture.

FIG. 21 is a schematic illustration of a coherent optics network architecture 2100. In an exemplary embodiment, architecture 2100 includes a first coherent transceiver 2102 in operable communication with a second coherent transceiver 2104 over an SMF 2106. First coherent transceiver 2102 includes a first transmitter portion 2108 and second coherent transceiver 2104 includes a second transmitter portion 2110. Similarly, second coherent transceiver 2104 includes a first receiver portion 2112, and first coherent transceiver 2102 includes a second receiver portion 2114. First transmitter portion 2110 and second receiver portion 2114 communicate with fiber 2106 through a first optical circulator 2116, and first receiver portion 2112 and second transmitter portion 2110 communicate with fiber 2106 through a second optical circulator 2118.

In exemplary operation of architecture 2100, first and second transmitter portions 2108, 2110 both transmit at X-dBm of transmit power, and fiber 2106 is subject to Y-dB loss. Accordingly, architecture 2100 should function such that values for X−Y≥−30 dBm (e.g., the receiver sensitivity), and that values for [(X−Y)−(X−35)]≥15.4 dB (e.g., the OSNR, however, larger OSNR values are contemplated due to only 0.1 nm noise power included in this example). Further to this example, the loss Y should be such that Y(loss)≤19.6 dB.

Figure 22:
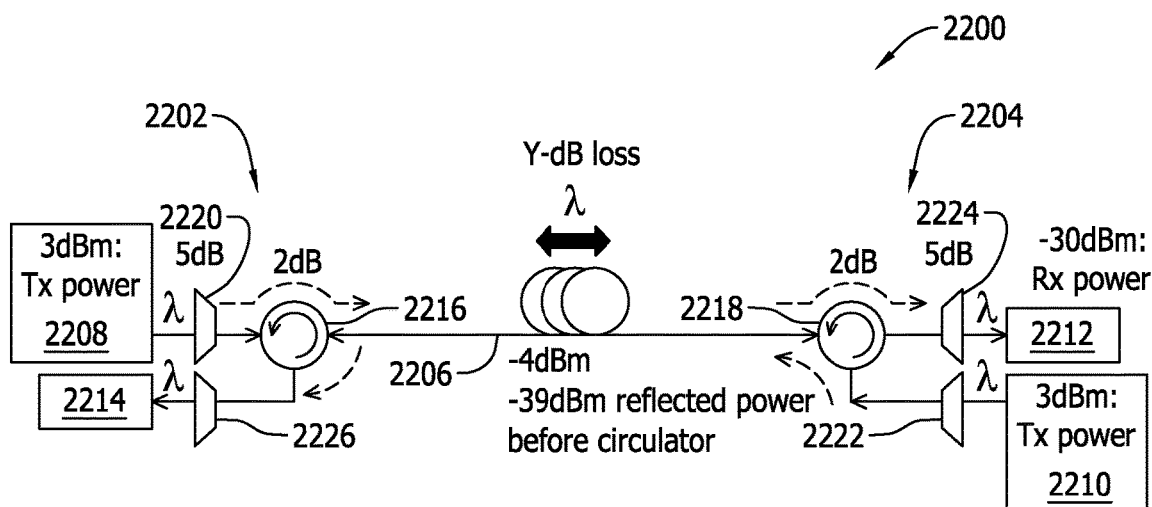
FIG. 22 is a schematic illustration of a coherent optics network architecture.

FIG. 22 is a schematic illustration of a coherent optics network architecture 2200. Architecture 2200 is similar to architecture 2100, FIG. 21, and similarly includes a first coherent transceiver 2202, a second coherent transceiver 2204, an SMF 2206, a first transmitter portion 2208, a second transmitter portion 2210, a first receiver portion 2212, a second receiver portion 2214, a first optical circulator 2216, and a second optical circulator 2218. Architecture 2200 differs from architecture 2100 though, in that architecture 2200 further includes a first optical multiplexer 2220 at first transceiver 2202 and a second optical multiplexer 2222 at second transceiver 2204, and also a first optical demultiplexer 2224 at second transceiver 2204 and a second optical demultiplexer 2226 at first transceiver 2202. This dual-multiplexer/demultiplexer configuration operates similarly to architecture 300, FIG. 3.

In the example depicted in FIG. 22, first and second transmitter portions 2208, 2210 operate at 3 (e.g., X) dBm of transmit power, and the sensitivity of first receiver portion 2212 is −30 dBm received power. According to the calculations described above, the total loss Y will be (X−receiver sensitivity), which is [3−(−30)], or 33 dB. Further in this example, loss at each optical circulator 2216, 2218 is 2 dB, and loss at the multiplexers/demultiplexers is 5 dB each. Accordingly, the fiber loss may then be calculated as [33−(5+2)*2], or 19 dB. The reflected power before second optical circulator 2218 is [−33−(5+2)], or −39 dB, and the reflected power at receiver portion 2212 will be [−39−(2+5)], or −46 dBm. From these values, the OSNR is found from [−30−(−46)], or 16 dB.

Figure 23:
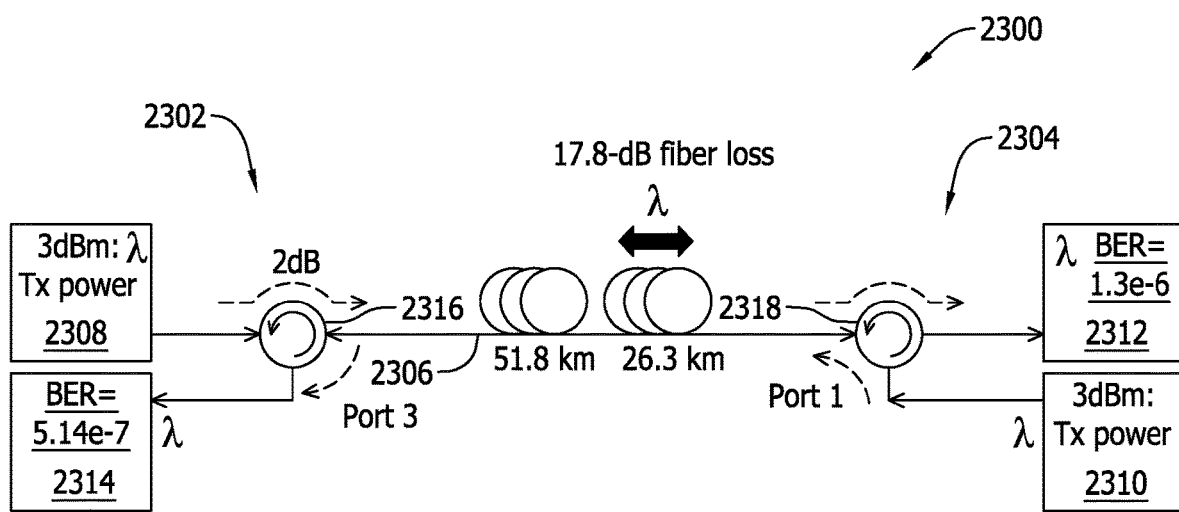
FIG. 23 is a schematic illustration of a coherent optics network architecture.

FIG. 23 is a schematic illustration of a coherent optics network architecture 2300. Architecture 2300 is also similar to architecture 2100, FIG. 21, and similarly includes a first coherent transceiver 2302, a second coherent transceiver 2304, an SMF 2306, a first transmitter portion 2308, a second transmitter portion 2310, a first receiver portion 2312, a second receiver portion 2314, a first optical circulator 2316, and a second optical circulator 2318, with both first and second transmitter portions 2308, 2310 operating at 3 dBm of transmit power. In the example depicted in FIG. 23 fiber 2306 includes a 51.8-km portion and a 26.3-km portion, and exhibits a 17.8 dB fiber loss (i.e., approximately 18 dB total common link loss). Accordingly, in this embodiment, first receiver portion 2312 has a BER of 1.3e-6, and second receiver portion 2314 has a BER of 5.14e-7.

Figure 24:
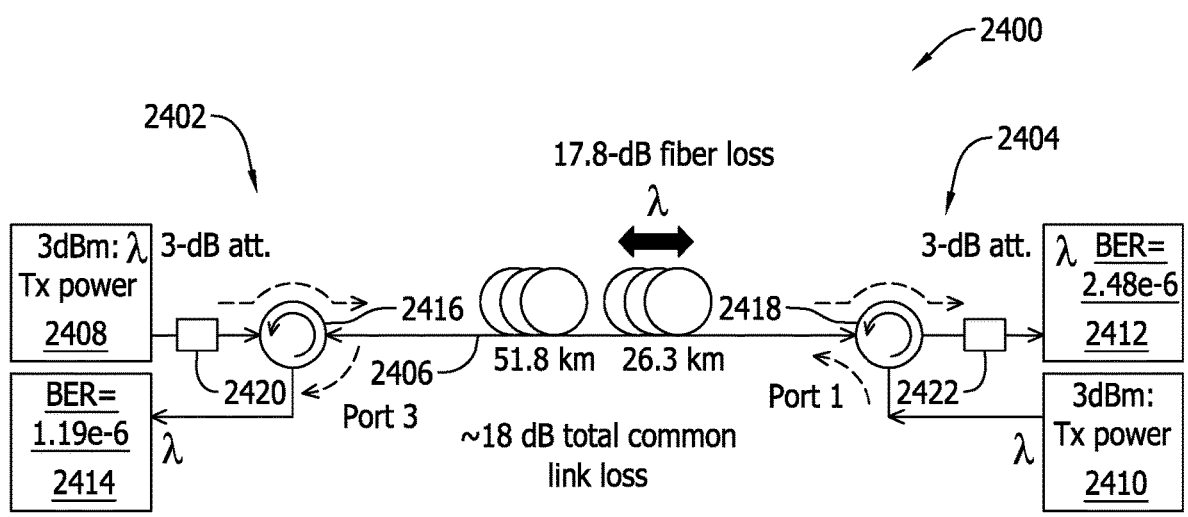
FIG. 24 is a schematic illustration of a coherent optics network architecture.

FIG. 24 is a schematic illustration of a coherent optics network architecture 2400. Architecture 2400 is also similar to architecture 2300, FIG. 23, and similarly includes a first coherent transceiver 2402, a second coherent transceiver 2404, an SMF 2406 (17.8 dB fiber loss, in this example also), a first transmitter portion 2408, a second transmitter portion 2410, a first receiver portion 2412, a second receiver portion 2414, a first optical circulator 2416, and a second optical circulator 2418, with both first and second transmitter portions 2408, 2410 operating at 3 dBm of transmit power and at approximately 18 dB total common link loss. Architecture 2400 differs from architecture 2300 though, in that architecture 2400 further includes a first attenuator 2420 between first transmitter portion 2408 and first optical circulator 2416, and a second attenuator 2422 between second optical circulator 2418 and first receiver portion 2412, with each attenuator 2420, 2422 having 3 dB of attenuation. Accordingly, in this embodiment, first receiver portion 2412 has a BER of 2.48e-6, and second receiver portion 2414 has a BER of 1.19e-6.

Figure 25:
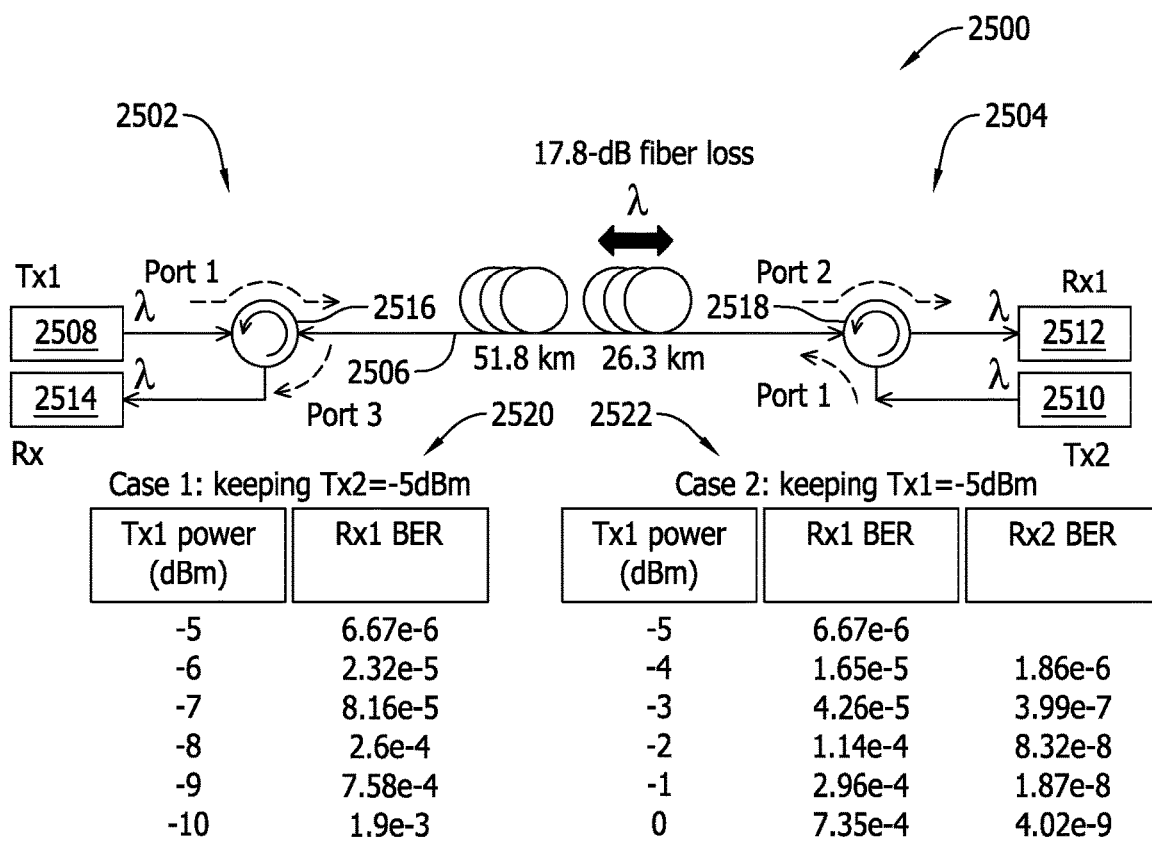
FIG. 25 is a schematic illustration of a coherent optics network architecture.

FIG. 25 is a schematic illustration of a coherent optics network architecture 2500. Architecture 2500 is also similar to architecture 2300, FIG. 23, and similarly includes a first coherent transceiver 2502, a second coherent transceiver 2504, an SMF 2506 (17.8 dB fiber loss, in this example also), a first transmitter portion 2508, a second transmitter portion 2510, a first receiver portion 2512, a second receiver portion 2514, a first optical circulator 2516, and a second optical circulator 2518. Different from architecture 2400 though, in the example depicted in FIG. 25, first and second transmitter portions 2508, 2510 are configured to operate at various transmit power levels.

More particularly, architecture 2500 operates according to a first case, where the transmit power of first transmitting portion 2508 varies from −5 dBm through −10 dBm, while the transmit power of second transmitting portion 2510 remains constant at −5 dBm. Accordingly, the BER values at first receiver portion 2512 correspondingly change, as reflected in table 2520. Similarly, architecture 2500 operates according to a second case, where the transmit power of second transmitting portion 2510 varies from 0 dBm through −5 dBm, while the transmit power of first transmitting portion 2508 remains constant at −5 dBm. Accordingly, the BER values at second receiver portion 2514 correspondingly change, as reflected in table 2522.

Figure 26:
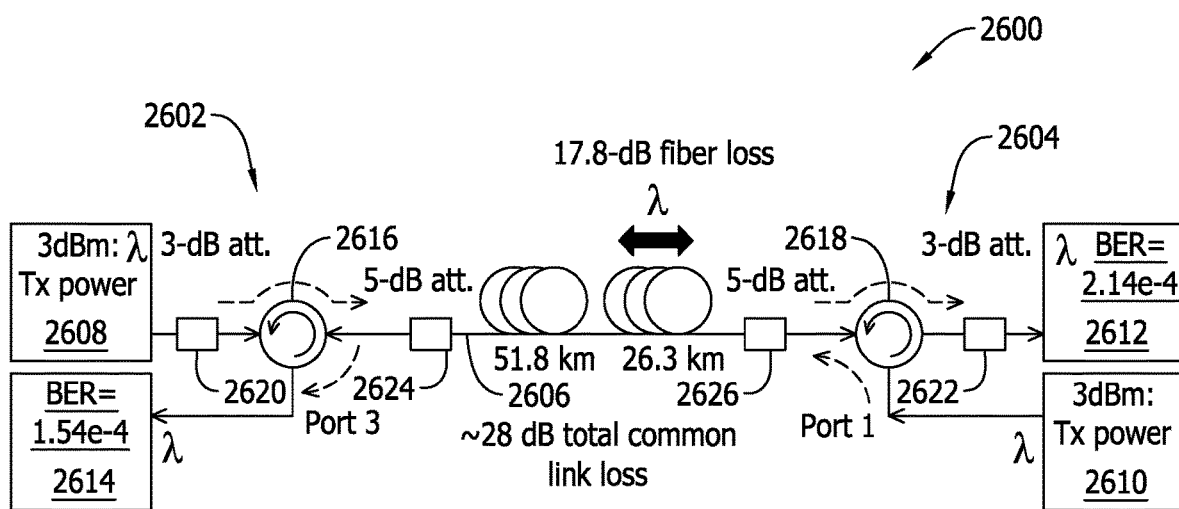
FIG. 26 is a schematic illustration of a coherent optics network architecture.

FIG. 26 is a schematic illustration of a coherent optics network architecture 2600. Architecture 2600 is similar to architecture 2400, FIG. 24, and similarly includes a first coherent transceiver 2602, a second coherent transceiver 2604, an SMF 2606 (17.8 dB fiber loss, in this example also), a first transmitter portion 2608, a second transmitter portion 2610, a first receiver portion 2612, a second receiver portion 2614, a first optical circulator 2616, a second optical circulator 2618, a first attenuator 2620 (3 dB), and a second attenuator 2622 (3 dB), with both first and second transmitter portions 2608, 2610 operating at 3 dBm of transmit power. Architecture 2600 differs from architecture 2400 though, in that architecture 2600 further includes, between first and second optical circulators 2416, 2418, third and fourth attenuators 2624, 2422, each having 5 dB of attenuation, thereby resulting in approximately 28 dB of total common link loss (i.e., 18 dB+(5 dB)*2), and a BER of 2.14e-4 at first receiver portion 2612 and a BER of 1.549e-4 at second receiver portion 2614.

Figure 27:
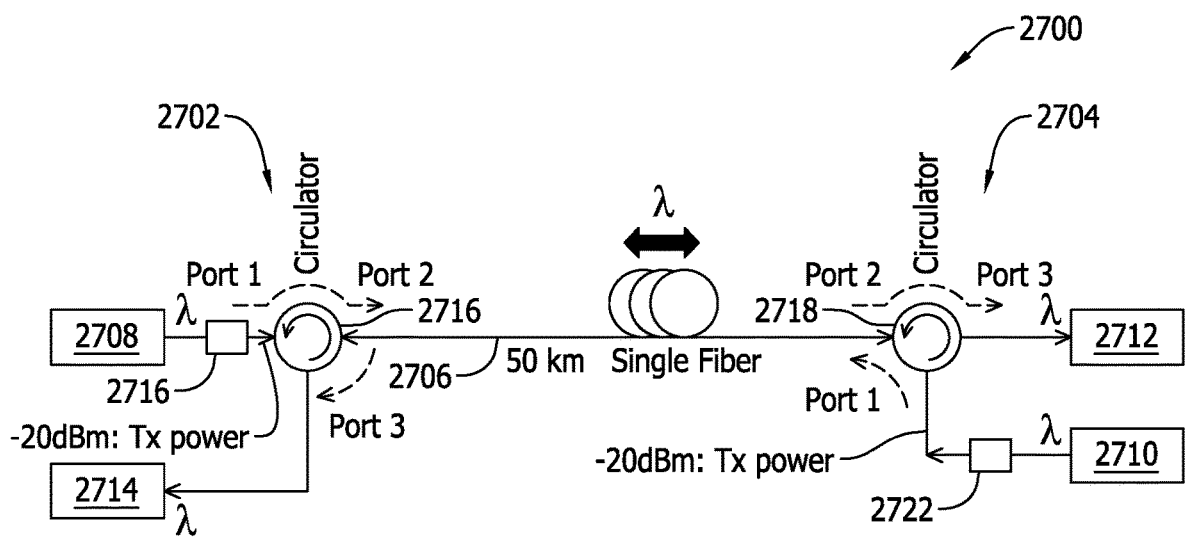
FIG. 27 is a schematic illustration of a coherent optics network architecture.

FIG. 27 is a schematic illustration of a coherent optics network architecture 2700. Architecture 2700 is also similar to architecture 2400, FIG. 24, and similarly includes a first coherent transceiver 2702, a second coherent transceiver 2704, an SMF 2706 (50-km single fiber, in this example), a first transmitter portion 2708, a second transmitter portion 2710, a first receiver portion 2712, a second receiver portion 2714, a first optical circulator 2716, a second optical circulator 2718, and a first attenuator 2720 between first transmitter portion 2708 and first optical circulator 2716. Architecture 2700 differs from architecture 2400 though, in that architecture 2700 further includes a second attenuator 2722 between second optical circulator 2718 and second transmitter portion 2710. Accordingly, in this example, each attenuator 2720, 2722 results in −20 dBm transmit power seen at the respective optical circulator.

The architectural embodiments described above are depicted with respect to single channel operation, for ease of explanation. In an exemplary spectrum plot of single channel operation is described further below with respect to FIG. 28. The person of ordinary skill in the art, however, will understand how the present systems and methods may be applied with respect to WDM operations as well. Some exemplary results of WDM operation, in accordance with the present embodiments, are described further below with respect to FIGS. 29-35.

Figure 28:
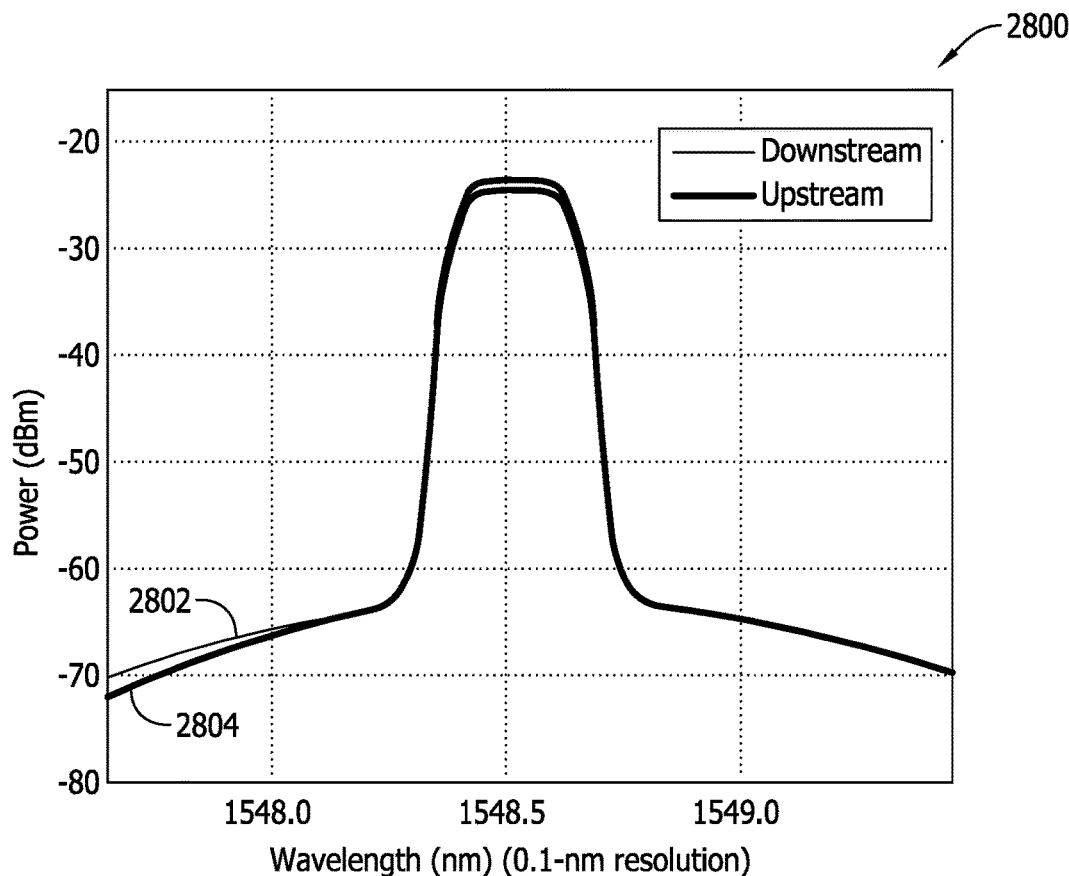
FIG. 28 is a graphical illustration of a comparative optical spectrum plot for a single channel.

FIG. 28 is a graphical illustration depicting a comparative optical spectrum plot 2800 for a single channel. Comparative optical spectrum plot 2800 is representative of power over wavelength for a single channel operation (at 0.1-nm resolution, in this example), and includes a first sub-plot 2802 illustrating the downstream optical spectrum of the single channel, and a second sub-plot 2804 illustrating the upstream optical spectrum of the single channel. As can be seen from the example depicted in FIG. 28, upstream optical spectrum 2804 tracks fairly closely with downstream optical spectrum 2802, with downstream optical spectrum 2802 being slightly greater about a central wavelength (1548.52 nm, in the illustrated example).

Figure 29:
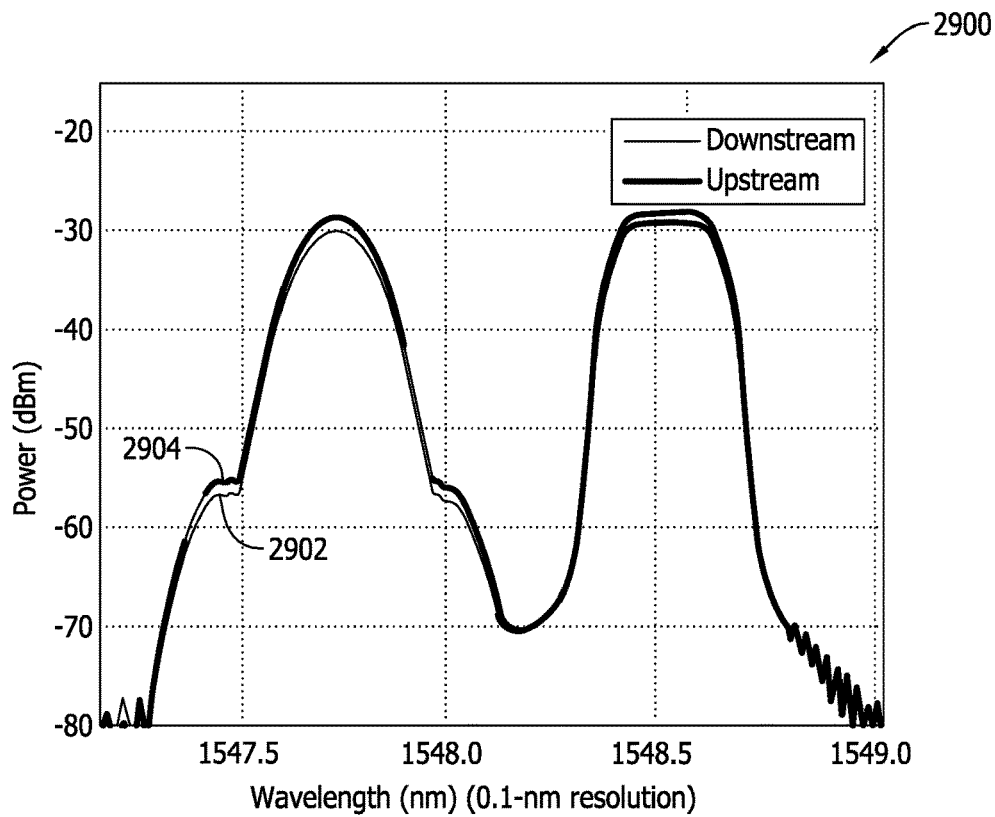
FIG. 29 is a graphical illustration of a comparative optical spectrum plot for a wavelength division multiplexing channel.

FIG. 29 is a graphical illustration depicting a comparative optical spectrum plot 2900 for a WDM channel. Comparative optical spectrum plot 2900 is representative of power over wavelength for a two-wavelength WDM channel operation (e.g., again at 0.1-nm resolution), and includes a first sub-plot 2902 illustrating the downstream optical spectrum of the WDM channel, and a second sub-plot 2904 illustrating the upstream optical spectrum of the WDM channel. As can be seen from the example depicted in FIG. 29, upstream optical spectrum 2904 tracks fairly closely with downstream optical spectrum 2902, however, in this case, downstream optical spectrum 2902 has slightly lower power about the central peak wavelengths of the WDM channel (1547.57 nm and 1548.52 nm, in the illustrated example).

Figure 30:
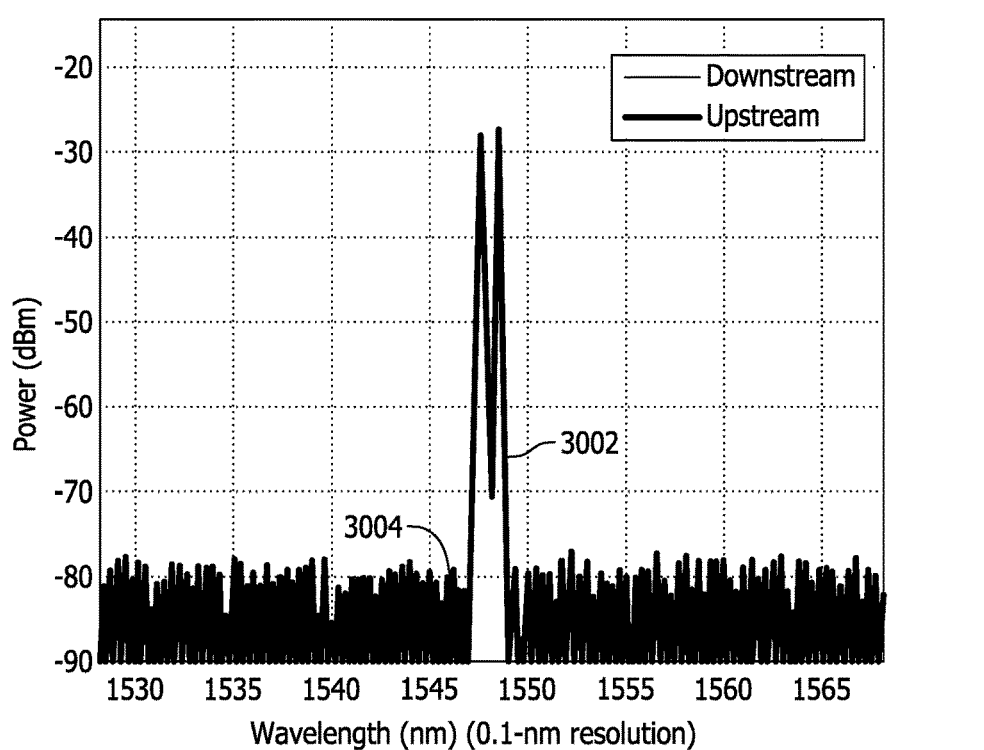
FIG. 30 is a graphical illustration of a comparative optical spectrum plot for a C-Band channel.

FIG. 30 is a graphical illustration depicting a comparative optical spectrum plot 3000 for a C-Band channel. Comparative optical spectrum plot 3000 is representative of power over wavelength for a C-Band channel operation (e.g., again at 0.1-nm resolution), and includes a first sub-plot 3002 illustrating the downstream optical spectrum of the C-Band channel, and a second sub-plot 3004 illustrating the upstream optical spectrum of the C-Band channel. As can be seen from the example depicted in FIG. 30, upstream optical spectrum 3004 tracks fairly closely with downstream optical spectrum 3002 about the central peak wavelengths of the C-Band channel (e.g., 1547.57 nm and 1548.52 nm, in the illustrated example), but upstream optical spectrum 3004 exhibits a considerably higher noise floor outside of the peak wavelengths. The backscattering noise power is described further below with respect to FIGS. 31-35.

Figure 31:
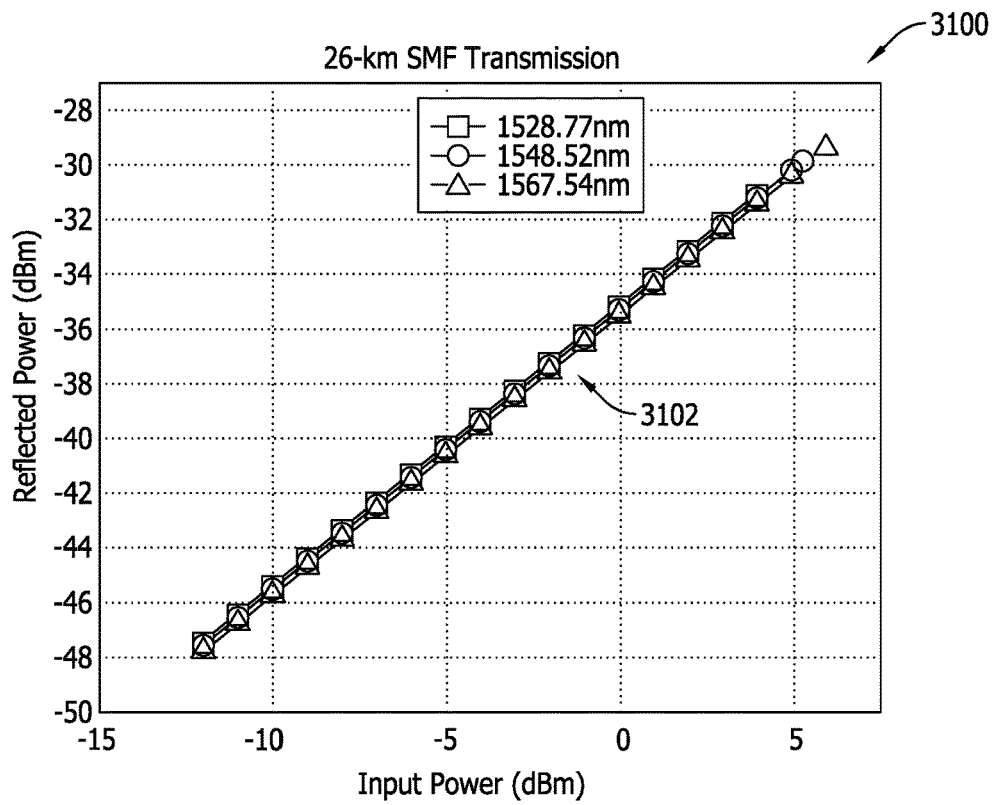
FIG. 31 is a graphical illustration depicting a comparative plot of reflected power against input power.

FIG. 31 is a graphical illustration depicting a comparative plot 3100 of reflected power against input power. Comparative plot 3100 depicts simulated results at a 26-km SMF transmission, and includes sub-plots 3102 representative of the reflection power (e.g., −35 dBm at 0 dBm input power) measured over different wavelengths of 1528.77 nm, 1548.52 nm, and 1567.54 nm, respectively. As can be seen from the example depicted in FIG. 31, the reflected power tracks fairly linearly with the input power, and is substantially agnostic of the various changes to the wavelength.

Figure 32:
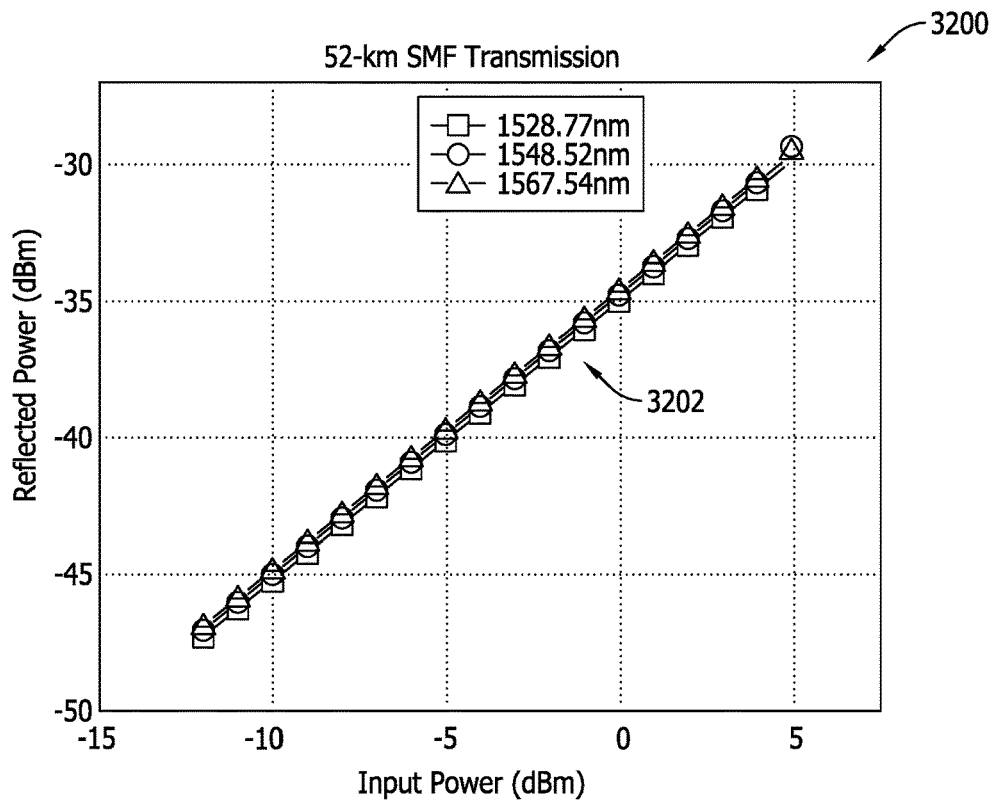
FIG. 32 is a graphical illustration depicting a comparative plot of reflected power against input power.

FIG. 32 is a graphical illustration depicting a comparative plot 3200 of reflected power against input power. Comparative plot 3200 is similar to comparative plot 3100, FIG. 31, however, comparative plot 3200 depicts simulated results at a 52-km SMF transmission, and includes sub-plots 3202 representative of the reflection power (e.g., again −35 dBm at 0 dBm input power) measured over the different wavelengths of 1528.77 nm, 1548.52 nm, and 1567.54 nm, respectively. As can be seen from the example depicted in FIG. 32, the reflected power tracks again fairly linearly with the input power at this larger transmission distance, and remains substantially agnostic of the various changes to the wavelength.

Figure 33:
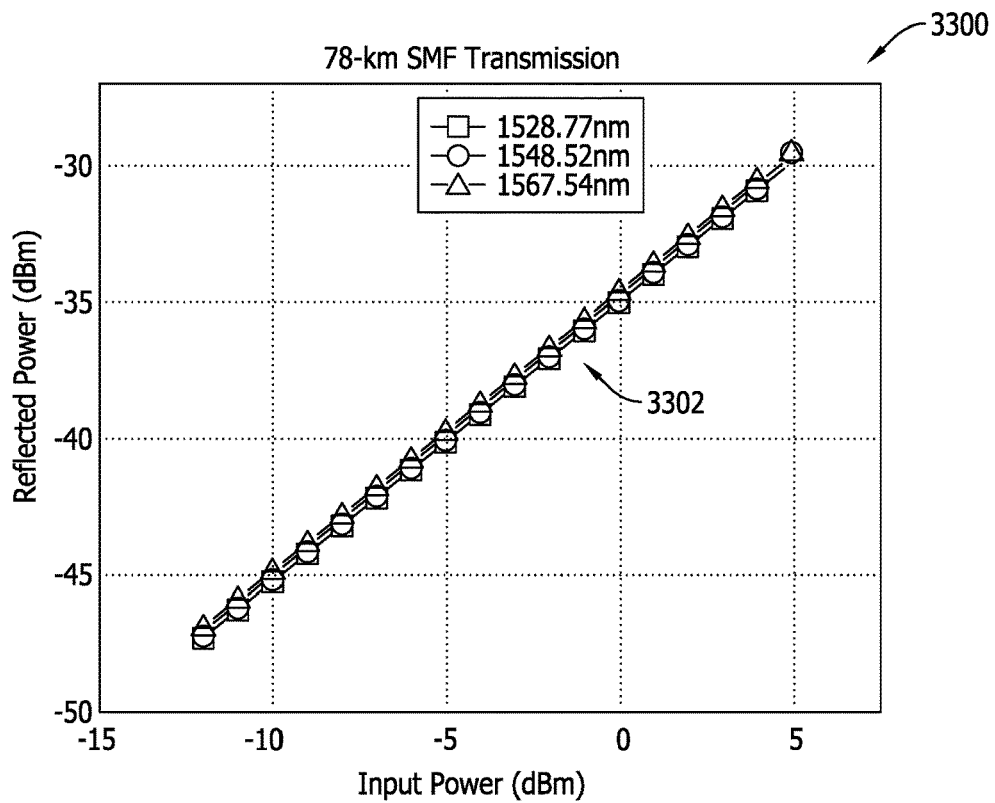
FIG. 33 is a graphical illustration depicting a comparative plot of reflected power against input power.

FIG. 33 is a graphical illustration depicting a comparative plot 3300 of reflected power against input power. Comparative plot 3300 is similar to comparative plot 3100, FIG. 31, however, comparative plot 3300 depicts simulated results at a 78-km SMF transmission, and includes sub-plots 3302 representative of the reflection power (e.g., again −35 dBm at 0 dBm input power) measured over the different wavelengths of 1528.77 nm, 1548.52 nm, and 1567.54 nm, respectively. As can be seen from the example depicted in FIG. 33 as well, the reflected power still tracks fairly linearly with the input power at even larger transmission distances, and continues to remain substantially agnostic of the various changes to the wavelength.

Figure 34:
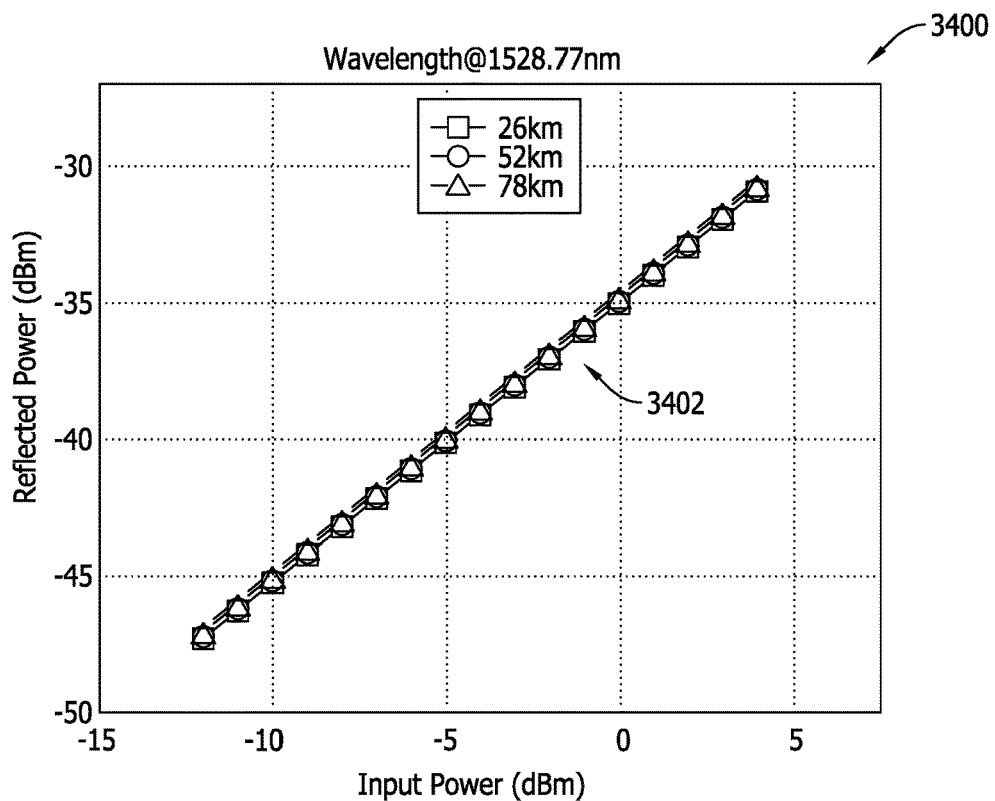
FIG. 34 is a graphical illustration depicting a comparative plot of reflected power against input power.

FIG. 34 is a graphical illustration depicting a comparative plot 3400 of reflected power against input power. Comparative plot 3400 depicts simulated results at the 1528.77 nm wavelength, and includes sub-plots 3402 representative of the −35 dBm reflection power (i.e., at 0 dBm input power) measured over the different transmission distances of 26-km, 52-km, and 78-km, respectively. As can be seen from the example depicted in FIG. 34, the reflected power tracks fairly linearly with the input power, and is substantially agnostic of the various changes to the transmission distances at this wavelength.

Figure 35:
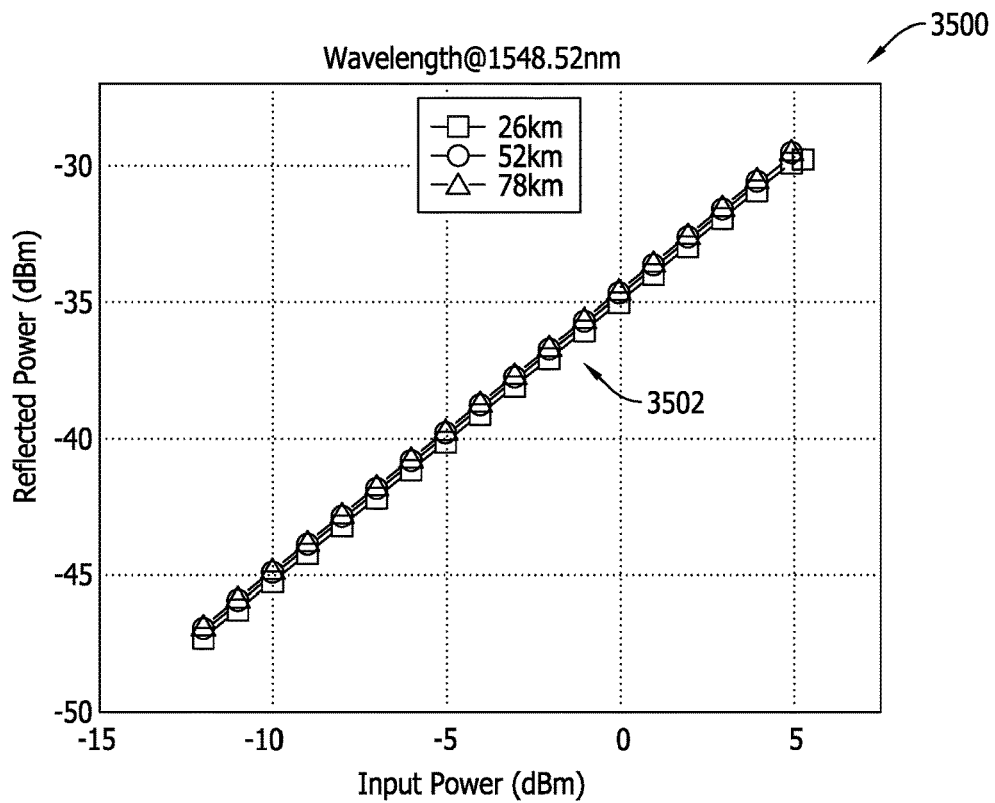
FIG. 35 is a graphical illustration depicting a comparative plot of reflected power against input power.

FIG. 35 is a graphical illustration depicting a comparative plot 3500 of reflected power against input power. Comparative plot 3500 depicts simulated results at the 1548.52 nm wavelength, and includes sub-plots 3502 representative of the −35 dBm reflection power (i.e., at 0 dBm input power) measured over the different transmission distances of 26-km, 52-km, and 78-km, respectively. As can be seen from the example depicted in FIG. 35, the reflected power continues to remain fairly linear with respect to the input power, and is also fairly agnostic of the various changes to the transmission distances at this wavelength. However, a slight separation between the respective subplots 3502 can now be seen at the greater transmission distances.

Figure 36:
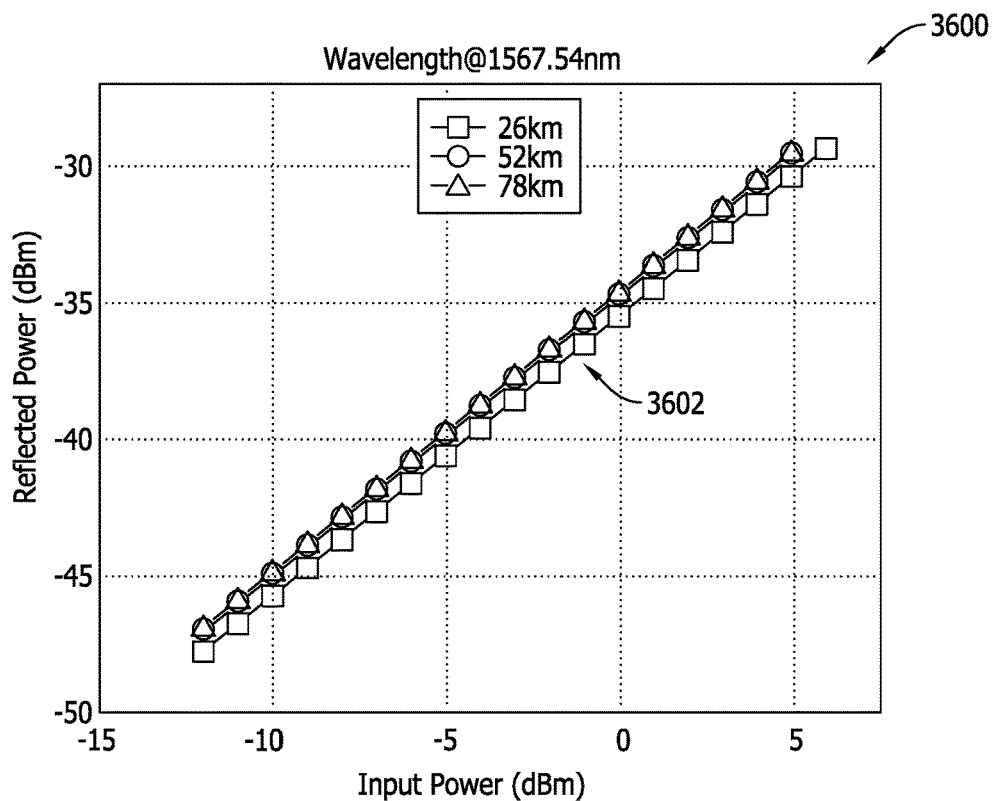
FIG. 36 is a graphical illustration depicting a comparative plot of reflected power against input power.

FIG. 36 is a graphical illustration depicting a comparative plot 3600 of reflected power against input power. Comparative plot 3600 depicts simulated results at the 1567.54 nm wavelength, and includes sub-plots 3602 representative of the −35 dBm reflection power (i.e., at 0 dBm input power) measured over the different transmission distances of 26-km, 52-km, and 78-km, respectively. As can be seen from the example depicted in FIG. 36, the reflected power it is still substantially linear with respect to the input power, and is also somewhat agnostic of the various changes to the transmission distances at this higher wavelength. However, at this higher wavelength, the small separation between the respective subplots 3502 may nevertheless be seen more readily as the transmission distance increases.

Full-Duplex Coherent Passive Optical Networks

The embodiments described herein advantageously enable a number of unique architectures that provide for efficient implementation with a coherent passive optical network (PON). For example, coherent PON architectures for implementing the present techniques may include symmetrical and/or asymmetrical modulation schemes for downstream and upstream communications. In exemplary embodiments of the present systems and methods, up-conversion and down-conversion may be performed in the digital domain to mitigate the effects of Rayleigh Backscattering (RB) crosstalk noise (described above) for different reach and splitting ratio scenarios.

Conventional PON-based fiber-to-the-home (FTTH) networks are presently expected to deliver more capacity and bandwidth per user by increasing the bit rate at the OLT and ONU optical transceivers in order to satisfy the continuously growing traffic growth on these networks. However, although the relatively primitive signaling scheme used in these conventional access networks enables the use of low-cost equipment, the conventional signaling scheme ultimately significantly diminishes the bandwidth that is available to the end-users.

Coherent communication systems offer significantly improved power-efficiency and bandwidth-efficiency in comparison with the more primitive optical access networks. Coherent communication technology is theoretically able to feasibly transform the conventional access networks and enable ubiquitous new services and applications with uncontended, multi-gigabits-per-user broadband connections. Nevertheless, the more advanced technology of coherent communication systems is not readily capable of simply substituting for existing portions of conventional optical access networks, such as in a "plug and play" manner. Implementation of coherent technology into optical access networks requires significant modifications for the integration therewith to become economically viable.

Accordingly, in some exemplary embodiments described herein, in order to minimize system costs, a single laser source may be implemented at the transmitter side, or hub, to share for both the coherent transmitter and the coherent receiver at the ONU. In such embodiments, a unique wavelength may be provided for the downstream and upstream transmissions, respectively. In other embodiments, coherent technology may be uniquely integrated with some conventional technology schemes, such that some overlap between the downstream and upstream transmissions may occur. According to the present embodiments, coherent PONs are capable of realizing full duplex coherent optics in point-to-multipoint (P2MP) configurations, and achieving realistic and efficient bidirectional (BiDi) connections.

Figure 37:
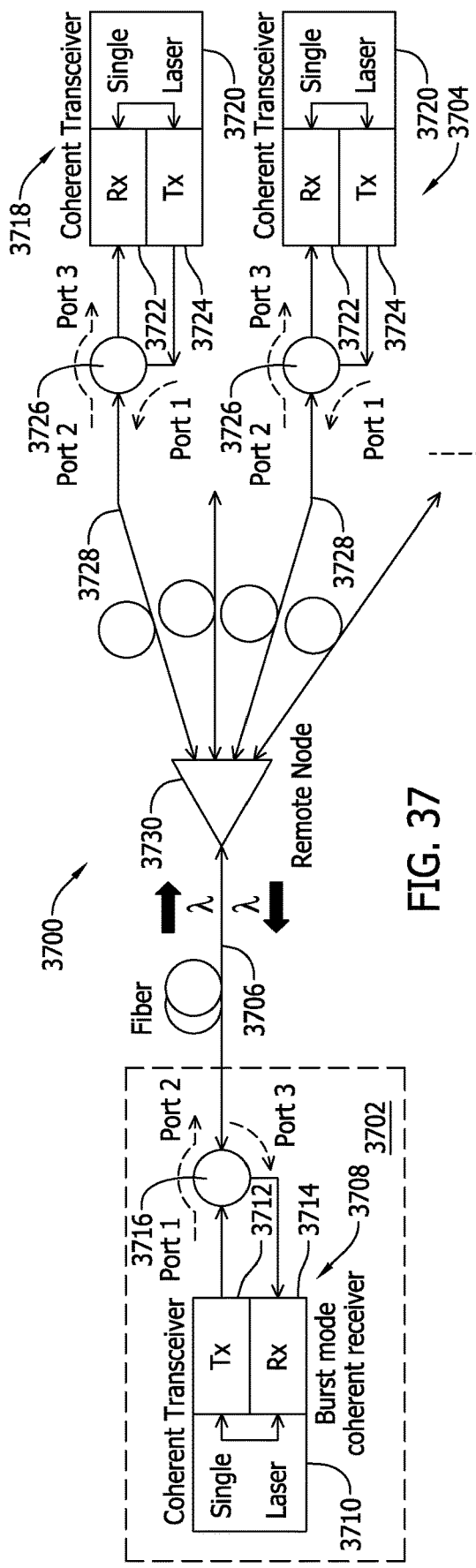
FIG. 37 is a schematic illustration of a coherent optics network architecture.

FIG. 37 is a schematic illustration of a coherent optics network architecture 3700. Architecture 3700 is similar to architecture 100, FIG. 1, in general operation, and includes a transmitter end 3702, a receiver end 3704, and a transport medium/fiber 3706. Transmitter end 3702 may represent a hub, and includes a downstream coherent transceiver 3708. In an exemplary embodiment, downstream coherent transceiver 3708 includes one or more of a downstream laser 3710, a downstream coherent transmitter 3712, and a downstream coherent receiver 3714. Downstream coherent receiver 3714 is depicted, in this example, as a burst mode coherent receiver. In an embodiment, transmitter end 3702 further includes a three-port downstream optical circulator 3716.

Receiver end 3704 includes a plurality of upstream coherent transceivers 3718. Each of upstream coherent transceivers 3718 may represent a node or an end user, and includes one or more of an upstream laser 3720, an upstream coherent receiver 3722, and an upstream coherent transmitter 3724. In an embodiment, receiver end 3704 further includes a three-port upstream optical circulator 3726 for each coherent transceiver 3718. Each of upstream coherent transceivers 3718 communicates over at least one short fiber 3728, and are combined onto transport medium 3706 by a combiner 3730.

In an exemplary embodiment, architecture 3700 is configured to implement both downstream and upstream coherent transmission and reception for a PON configuration. In this example, architecture 3700 is configured to transmit wavelength λ from a burst mode coherent receiver in the upstream direction, and broadcast and select in the downstream direction.

Figure 38:
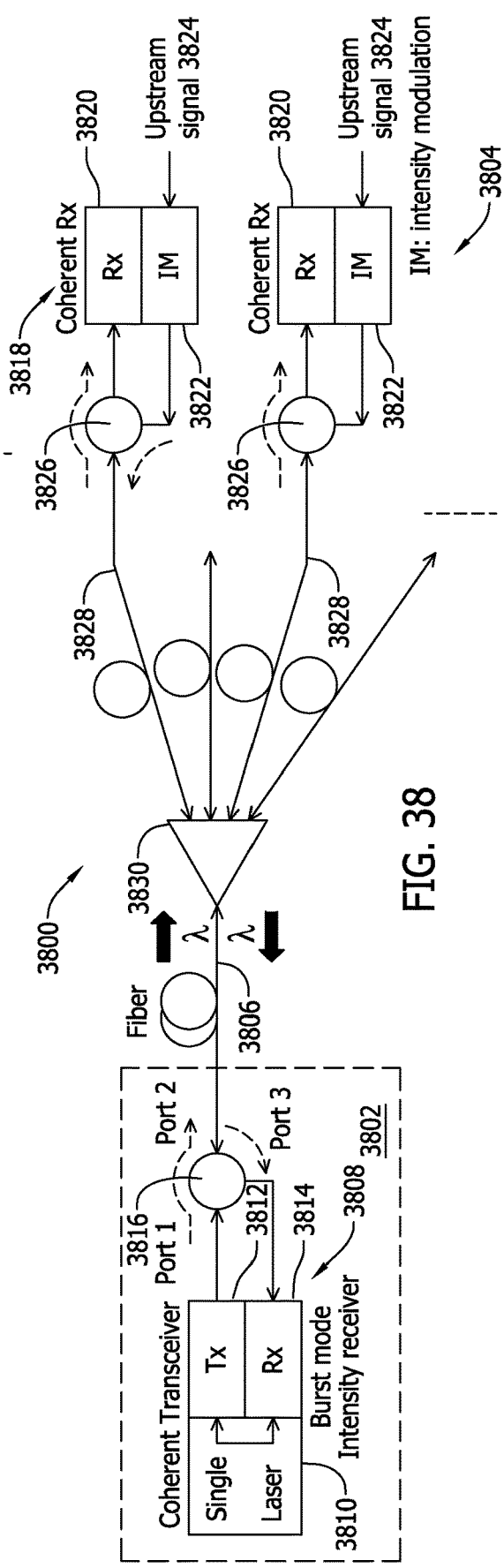
FIG. 38 is a schematic illustration of a coherent optics network architecture.

FIG. 38 is a schematic illustration of a coherent optics network architecture 3800. Architecture 3800 is generally similar, in overall function and several structural elements, to architecture 3700, FIG. 3700. In the exemplary embodiment, architecture 3800 thus similarly includes a transmitter end 3802, a receiver end 3804, and a transport medium/fiber 3806. Elements designated by the same label as elements in other drawings may be considered to have similar function and structure. Architecture 3800 differs though, from architecture 3700 in that, whereas architecture 3700 is configured to implement both downstream and upstream coherent transmission and reception Accordingly, transmitter end 3802 may also represent a hub, and include a downstream coherent transceiver 3808. In the exemplary embodiment depicted in FIG. 38, downstream coherent transceiver 3808 includes one or more of a downstream laser 3810, a downstream coherent transmitter 3812, and a downstream receiver 3814. In this example, downstream receiver 3814 is a burst mode intensity receiver. In an embodiment, transmitter end 3802 further includes a three-port downstream optical circulator 3816.

Receiver end 3804 includes a plurality of upstream coherent transceivers 3818. Each of upstream coherent transceivers 3818 includes an upstream coherent receiver 3820 configured to receive the coherent transmission from downstream coherent transmitter 3812, and an upstream intensity modulation transmitter 3822 configured to receive and modulate an upstream signal 3824 for transmission to downstream burst mode intensity receiver 3814. In an embodiment, receiver end 3804 further includes a three-port upstream optical circulator 3826 for each coherent transceiver 3818. Each of upstream coherent transceivers 3818 communicates over at least one short fiber 3828, and are combined onto transport medium 3806 by a combiner 3830.

In an exemplary embodiment, architecture 3800 is configured to implement an asymmetrical modulation scheme for wavelength λ, using coherent transmission and reception for downstream communications, and amplitude/intensity modulation and direct detection for upstream communications. In some embodiments, architecture 3800 is configured to implement, direct detection by external modulation. In other embodiments, direct detection is implemented by use of a reflective semiconductor optical amplifier (RSOA) configured to combine amplification and modulation functionality within a single device. Exemplary ONU structures for enabling such direct detection implementations are described further below with respect to FIGS. 39-41.

Figure 39:
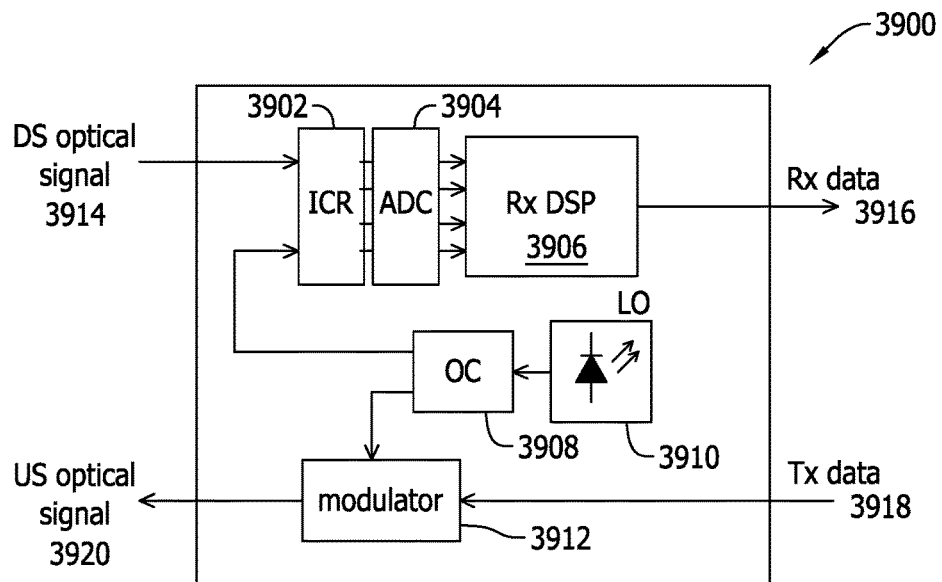
FIG. 39 is a schematic illustration of an exemplary optical network unit.

FIG. 39 is a schematic illustration of an exemplary ONU 3900. In an exemplary embodiment, ONU 3900 is configured to implement external modulation and/or an external modulation scheme for upstream communications (e.g., at the receiver end of a communication network architecture). As depicted in FIG. 39, ONU 3900 includes one or more of an integrated coherent receiver (ICR) 3902, an analog-to-digital converter (ADC) 3904, a receiver digital signal processor (DSP) 3906, an optical coupler 3908, a local oscillator 3910, and a modulator 3912.

In exemplary operation, ONU 3900 is configured to receive a downstream optical signal 3914 (e.g., from a downstream transmitter at a hub) at ICR 3902, which is then converted by ADC 3904, processed by receiver DSP 3906, and then output as reception data 3916. In an exemplary embodiment, ICR 3902 is also configured to receive, through communication with optical coupler 3908, a local oscillator signal from local oscillator 3910. In further exemplary operation, modulator 3912 is configured to receive transmission data 3918, modulate transmission data 3918 with the local oscillator signal from local oscillator 3910 (i.e., also through communication with optical coupler 3908), and output an upstream optical signal 3920.

Figure 40:
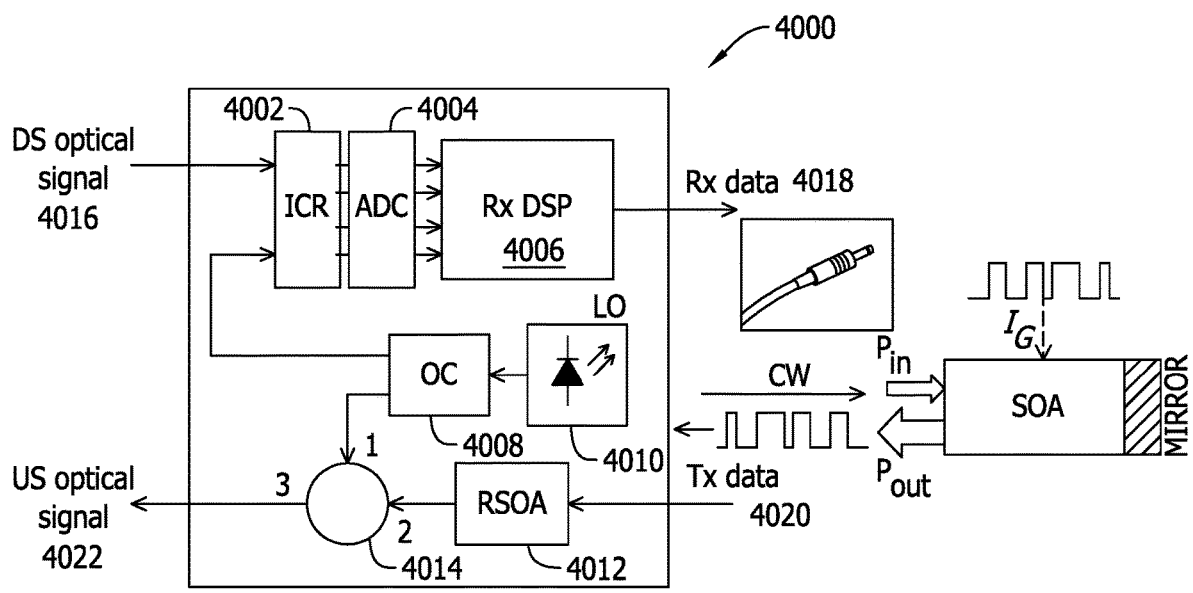
FIG. 40 is a schematic illustration of an exemplary optical network unit.

FIG. 40 is a schematic illustration of an exemplary ONU 4000. In an exemplary embodiment, ONU 4000 is similar to ONU 3900, FIG. 39, in many structural and functional aspects. ONU 4000 though, differs from ONU 3900 in that ONU 4000 is configured to implement RSOA modulation and/or an RSOA modulation scheme for upstream communications.

As depicted in FIG. 40, ONU 4000 similarly includes one or more of an ICR 4002, an ADC 4004, a receiver DSP 4006, an optical coupler 4008, and a local oscillator 4010. Different from ONU 3900, instead of a modulator (e.g., modulator 3912, FIG. 39), ONU 4000 implements an RSOA 4012 and an optical circulator 4014 (a three-port optical circulator, in this example).

In exemplary operation, ONU 4000 is similarly configured to such ICR 4002 is configured to receive both a downstream optical signal 4016 and the local oscillator signal from local oscillator 4010. These signals are then converted by ADC 4004, processed by receiver DSP 4006, and output as reception data 4018. In further exemplary operation, ONU 4000 may also be configured such that RSOA 4012 is configured to receive transmission data 4020, and then amplify transmission data 4020 for combination, at optical circulator 4014, with the local oscillator signal from local oscillator 4010 (i.e., through communication with optical coupler 4008), and output an upstream optical signal 4022.

The exemplary configuration of ONU 4000 may, for example, be of particular advantageous use in implementations where a relatively larger power budget is desired/required (e.g., for longer distance transmissions). In comparison with an external modulator (e.g., ONU 3900), ONU 4000 may provide a lower cost option that reduces the relative LO power requirements.

Figure 41:
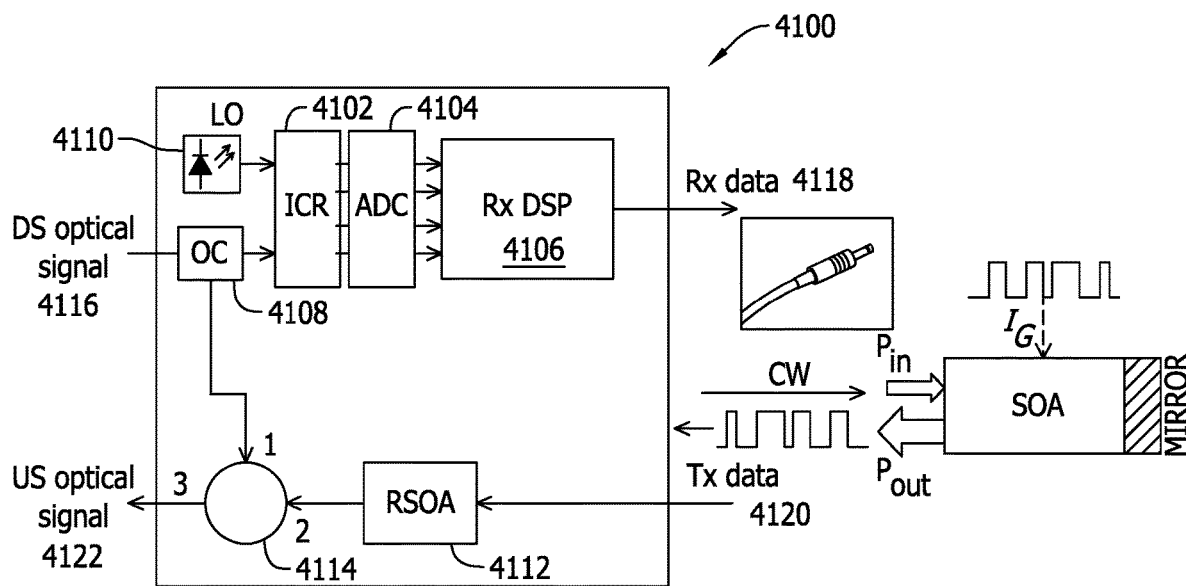
FIG. 41 is a schematic illustration of an exemplary optical network unit.

FIG. 41 is a schematic illustration of an exemplary ONU 4100. In an exemplary embodiment, ONU 4100 is similar to ONU 4000, FIG. 40, in many structural and functional aspects, but provides an alternative operational configuration for implementing RSOA modulation and/or an RSOA modulation scheme for upstream communications. That is, as depicted in FIG. 41, ONU 4100 similarly includes one or more of an ICR 4102, an ADC 4104, a receiver DSP 4106, an optical coupler 4108, a local oscillator 4110, an RSOA 4112, and an optical circulator 4114.

In exemplary operation, ONU 4100 is configured to such ICR 4002 is configured to receive both a downstream optical signal 4116 (through optical coupler 4108) and the local oscillator signal directly from local oscillator 4110. These signals are then converted by ADC 4104, processed by receiver DSP 4106, and output as reception data 4118. In further exemplary operation, ONU 4100 is also configured such that RSOA 4112 receives transmission data 4120, and then amplifies transmission data 4120 for combination, at optical circulator 4114, with downstream optical signal 4116 (i.e., through communication with optical coupler 4008, in this alternative configuration), and output an upstream optical signal 4022.

The exemplary configuration of ONU 4100 may realize similar benefits to those achieved according to ONU 4000, with respect to longer distance transmissions relative LO power requirements. ONU 4100 may realize still further advantages with respect to implementations where it is desirable to combine downstream and upstream optical signals, and particularly with respect to full duplex communications.

The foregoing embodiments illustrate and describe some particular schemes for implementing up/down-conversion in the digital domain to mitigate Rayleigh Backscattering in full duplex coherent optical systems. These embodiments are provided though, by way of example, and not in a limiting sense. That is, the person of ordinary skill in the art will appreciate that the architectures described herein are not limited to only the coherent signal generation and reception techniques described above. The present systems and methods may be advantageously implemented where different coherent signal generation and reception techniques and architectures are provided. One such alternative conversion architecture is described below with respect to FIG. 42.

Figure 42:
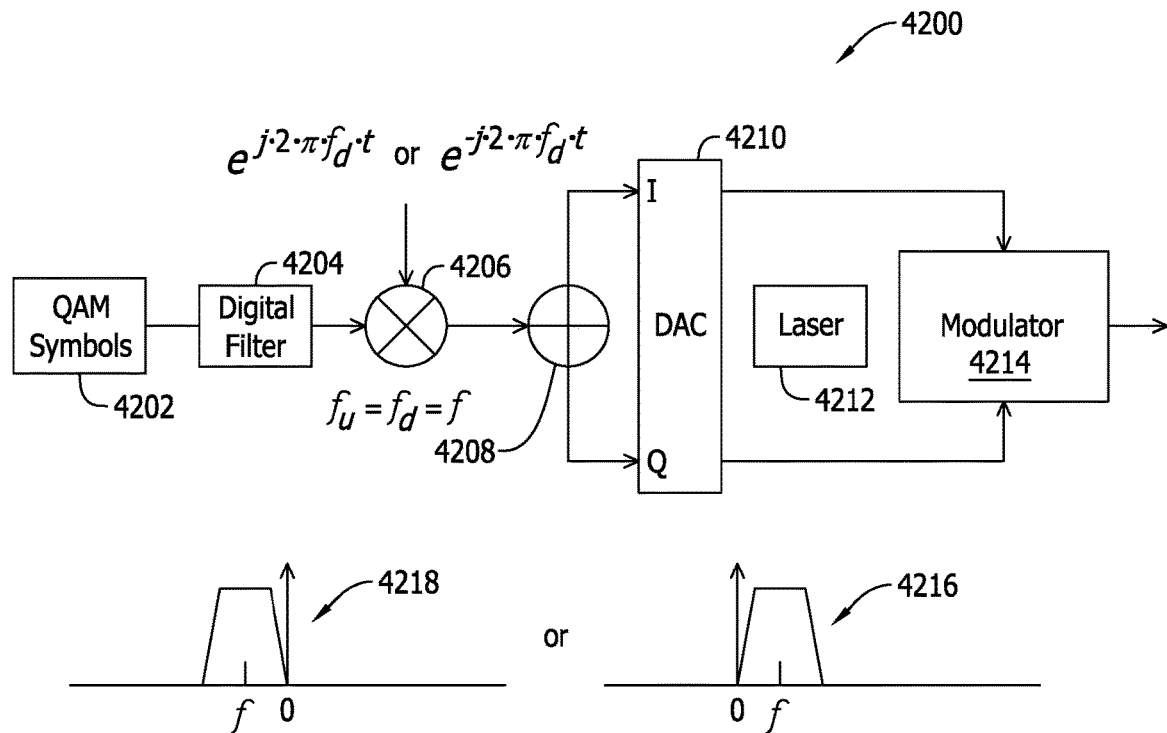
FIG. 42 is a schematic illustration of an exemplary optical conversion architecture.

FIG. 42 is a schematic illustration of an exemplary optical conversion architecture 4200. Optical conversion architecture 4200 may be advantageously useful for either or both of digital up-conversion and digital down-conversion. In an exemplary embodiment, architecture 4200 is configured for conversion and complex path mixing (or splitting), and may be implemented with one or more of the embodiments described herein.

In the exemplary embodiment, architecture 4200 receives input signal 4202. Input signal 4202 may represent, for example, a plurality of QAM symbols. Architecture 4200 further includes one or more of a digital filter 4204, a mixer 4206, a summing unit 4208, a digital-to-analog converter (DAC) 4210, a laser 4212, and a modulator 4214. In an embodiment, summing unit 4208 may be a summing amplifier, and DAC 4210 may be configured to convert the I and Q components into separate pathways before the respective components are modulated by modulator 4214.

In exemplary operation, at mixer 4206, the filtered QAM symbols are subject to $e^{-2*rr*f_d*t}$, in the case where conversion architecture 4200 is implemented for the upstream communication signals, or $e^{2*rr*f_u*t}$, in the case where conversion architecture 4200 is implemented for the downstream communication signals. In the exemplary embodiment depicted in FIG. 42, architecture 4200 may thus operate considering the downstream frequency $f_d$ (indicated, for example, as plot 4216) as being the same as the upstream frequency $f_u$ (indicated, for example, as plot 4218), or $f=f_d=f_u$.

Figure 43:
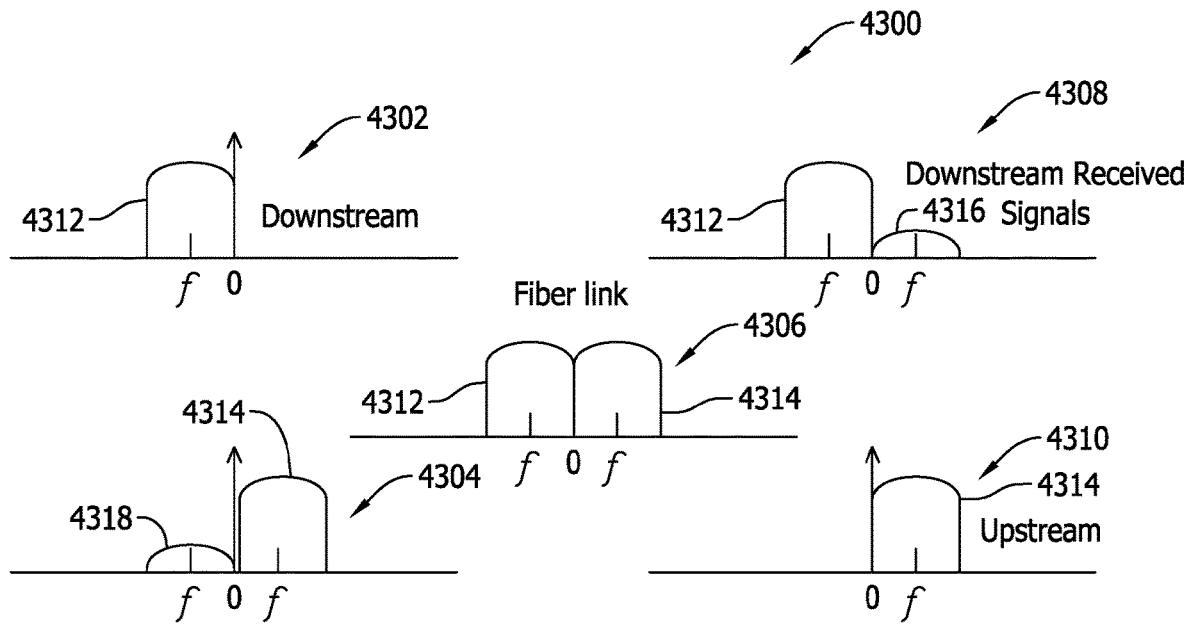
FIG. 43 is a graphical illustration depicting relative signal distributions for the architecture depicted in FIG. 37.

FIG. 43 is a graphical illustration 4300 depicting relative signal distributions 4302, 4304, 4306, 4308, 4310 for architecture 3700, FIG. 37. In an exemplary embodiment, signal distribution 4302 represents a spectral plot seen at a downstream coherent transmitter (e.g., downstream coherent transmitter 3712), signal distribution 4304 represents a spectral plot seen at an upstream coherent transmitter (e.g., upstream coherent transmitter 3724), signal distribution 4306 represents a spectral plot seen over a fiber link (e.g., transport medium 3706), signal distribution 4308 represents a spectral plot seen at an upstream coherent receiver (e.g., upstream coherent receiver 3722), and signal distribution 4310 represents a spectral plot seen at an downstream coherent receiver (e.g., downstream coherent receiver 3714).

In exemplary operation, signal distribution 4302 represents a substantially "pure" downstream transmission signal 4312 from the downstream coherent transmitter, and signal distribution 4304 represents a substantially pure upstream transmission signal 4314 from the upstream coherent transmitter. In the exemplary embodiment, both of transmission signals 4312, 4314 represent coherent optical signals centered around a frequency f, but where the respective upstream and downstream center frequencies are effectively frequency negatives of one another about a zero point on the frequency spectrum (e.g., f and "−f," such as through operation of mixer 4206, FIG. 42). Thus, at the fiber link, signal distribution 4306 depicts a relatively "clean" combination of both pure transmission signals 4312, 4314.

Nevertheless, as indicated by signal distributions 4308, 4310, the spectral distribution recovered at the respective upstream and downstream receivers is subject to a bleed over effect of the combined transmission signals 4312, 4314 on the fiber link. More particularly, although signal distribution 4308 indicates that the downstream coherent receiver receives downstream transmission signal 4312 substantially intact, the downstream coherent receiver also receives a downstream bleed over signal 4316 of upstream transmission signal 4314. That is, downstream bleed over signal 4316 has a frequency distribution that substantially corresponds to a frequency distribution of upstream transmission signal 4314, but at a significantly reduced amplitude.

Similarly, as indicated by a signal distribution 4310, the upstream coherent receiver receives upstream transmission signal 4314 substantially intact, but also an upstream bleed over signal 4318 that substantially corresponds to the frequency distribution of downstream transmission signal 4312, but a significantly lower amplitude. According to the exemplary systems and methods described herein, a full duplex communication architecture is advantageously able to transmit and receive the respective upstream and downstream coherent optical signals simultaneously over the same fiber link, but without substantial interference to one coherent transmission from the other. By effectively separating the downstream signal from the upstream signal (e.g., by operation of exemplary up-conversion and down-conversion techniques), the bleed over signal portions may be substantially ignored at the respective receiver.

Exemplary systems and methods of mitigating bleed over effects in full duplex communication networks are described in greater detail in co-pending U.S. patent application Ser. No. 16/177,428, filed Nov. 1, 2018, the disclosure of which is incorporated by reference herein. Additionally, the person of ordinary skill in the art will understand that the present embodiments are applicable to full duplex coherent communications with and without the bleed over effect, and that the embodiments herein are simplified for ease of explanation, and do not necessarily illustrate all components that may be implemented at the transmitter portion or the receiver portion, or within a hub or a fiber node.

Figure 44:
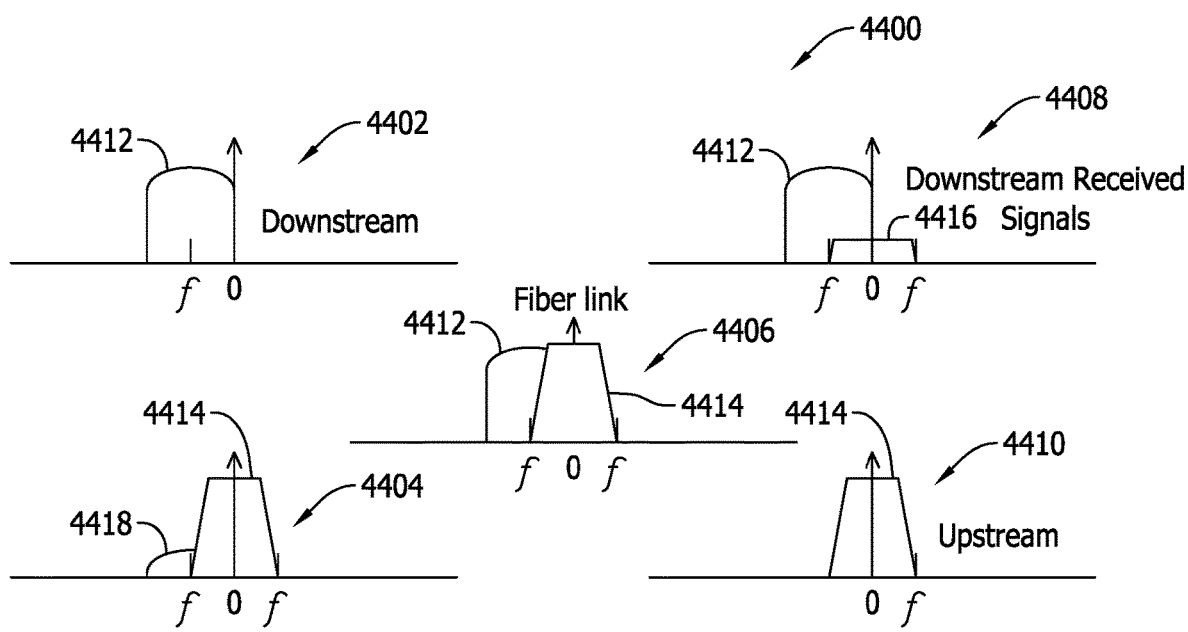
FIG. 44 is a graphical illustration depicting relative signal distributions for the architecture depicted in FIG. 38.

FIG. 44 is a graphical illustration 4400 depicting relative signal distributions 4402, 4404, 4406, 4408, 4410 for architecture 3800, FIG. 38. Graphical illustration 4400 is therefore similar to graphical illustration 4300, FIG. 43, except that illustration 4400 depicts a case where coherent optical transmission is one-way, namely, in the downstream direction (e.g., by downstream coherent transmitter 3812). Transmission in the upstream direction is according to intensity modulation (e.g., by upstream intensity modulation transmitter 3822), in this example.

In an exemplary embodiment, signal distribution 4402 represents a spectral plot seen at the downstream coherent transmitter, signal distribution 4404 represents a spectral plot seen at the upstream intensity modulation transmitter, signal distribution 4406 represents a spectral plot seen over a fiber link (e.g., transport medium 3806), signal distribution 4308 represents a spectral plot seen at an upstream coherent receiver (e.g., upstream coherent receiver 3820), and signal distribution 4310 represents a spectral plot seen at an downstream receiver (e.g., downstream burst mode intensity receiver 3814).

In exemplary operation, signal distribution 4402 represents a substantially pure downstream transmission signal 4412 from the downstream coherent transmitter, and signal distribution 4404 represents a substantially pure upstream transmission signal 4414 from the upstream intensity modulation transmitter. In the exemplary embodiment, downstream transmission signal 4412 represents a coherent optical signal centered around a frequency f, and upstream transmission signal 4414 represents an intensity modulated optical signal centered around the zero point on the frequency spectrum, with a bandwidth between the frequency f and its respective negative. At the fiber link, signal distribution 4406 depicts a combination of transmission signals 4412, 4414, which are simultaneously transmitted in this example.

As indicated by signal distributions 4408, 4410, the recovered spectral distribution at the respective upstream and downstream receivers in this embodiment is also subject to a bleed over effect of the combined transmission signals 4412, 4414 on the fiber link. That is, in signal distribution 4408, the downstream coherent receiver receives downstream transmission signal 4412 substantially intact, but also receives a downstream bleed over signal 4416 of upstream transmission signal 4414 (i.e., substantially the same frequency distribution but lower amplitude). Similarly, in signal distribution 4410, the upstream intensity modulated receiver is shown to receive upstream transmission signal 4414 substantially intact, but also an upstream bleed over signal 4418 substantially corresponding to the frequency distribution of downstream transmission signal 4412, but at a lower amplitude.

The systems and methods described herein are therefore advantageously capable of resolving the deficiencies of conventional coherent transceiver systems that produce significant crosstalk. As described with respect to the embodiments herein, this crosstalk problem is substantially mitigated or essentially eliminated according to the present techniques. According to the innovative embodiments illustrated and described herein, an operator is able to realize significantly improved spectral efficiency (e.g., at least double) of existing fibers, whether for single channel or WDM channel operation, and without requiring significant regard to the transmission distance of the fiber(s), or to the particular wavelength(s) transmitted over the channel(s).

Full Duplex Coherent Optics—Single Fiber Connection

Recent studies indicate that approximately 20 percent of conventional cable access networks use single-fiber transmission topologies, similar to the embodiments described above, in which both downstream and upstream transmission to fiber nodes occurs on the same single strand of fiber. Because of the increasing trend to maximize capacity on each fiber strand, having dedicated fibers for each direction of transmission is becoming less desirable, and it is estimated that the percentage of single-fiber bidirectional access topologies will increase accordingly.

Therefore, to control the cost and fully utilize the existing infrastructure, the present systems and methods provide improved techniques for bidirectional transmission over a single fiber, utilizing coherent signals and technologies to better support single-fiber topologies and to facilitate redundancy of optical links.

Figure 45:
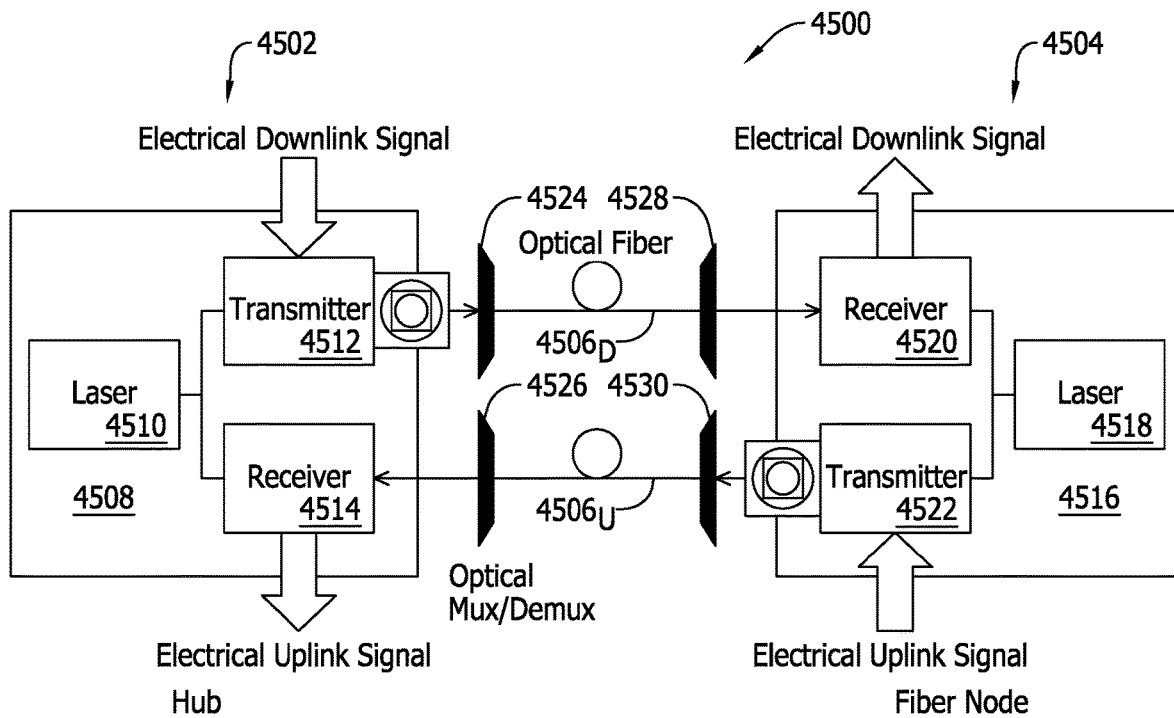
FIG. 45 is a schematic illustration of a coherent optics network architecture.

FIG. 45 is a schematic illustration of a coherent optics network architecture 4500. Architecture 4500 is similar in some respects to architecture 100, FIG. 1, and includes a hub 4502, a fiber node 4504, and an optical transport medium 4506 (e.g., an optical fiber) communicatively coupled therebetween. Architecture 4500 differs from architecture 100 though, in that optical transport medium 4506 includes a dedicated downlink fiber $4506_D$ separate from a dedicated uplink fiber $4506_U$. Thus, architecture 4500 may be representative of a standard conventional topology for implementing bidirectional transmission in the optical domain with a single laser. That is, conventional coherent optical bidirectional communication networks require two separate optical fibers.

In this example, architecture 4500 further includes at least one hub transceiver 4508 having a hub laser source 4510, a hub transmitter 4512 configured to convert an electrical downlink signal into an optical downlink signal on downlink fiber $4506_D$, and a hub receiver 4514. Architecture 4500 also includes at least one node transceiver 4516 having a node laser source 4518, a node receiver 4520 configured to receive the optical downlink signal and recover the electrical downlink signal, and a node transmitter 4522 configured to convert an electrical uplink signal into an optical uplink signal for transmission to hub receiver 4514 over uplink fiber $4506_U$.

Architecture 4500 may further include a first hub optical multiplexer 4524 for multiplexing the optical downlink signal from hub transmitter 4512 with optical downlink signals from other hub transmitters (not shown in FIG. 45), and a second hub optical multiplexer 4526 for demultiplexing aggregated optical uplink signals sent from node transmitter 4522 and other node transmitters (not shown in FIG. 45). Architecture 4500 may similarly include a first node optical multiplexer 4528 for demultiplexing the optical downlink signal to node receiver 4520, and a second node optical multiplexer 4530 for multiplexing the optical uplink signal from node transmitter 4522 with optical uplink signals from other node transmitters.

In operation of this dual-fiber embodiment, both of transceivers 4508, 4516 perform at least two functional roles: (1) the optical signal source for the respective transmitter 4512, 4522; and (2) the reference local oscillator signal in the respective receiver 4514, 4520. In this configuration, because the same wavelength from the same laser is used (i.e., laser 4510 and laser 4518 may operate at the same frequency, wavelength, modulation, etc., or be locked together), a second fiber is required to separate the uplink optical signals from the downlink optical signals.

Some conventional approaches avoid this dual-fiber approach through use of a single fiber for both the optical uplink and downlink, but with the optical uplink and downlink transmitted at different frequencies or wavelengths from one another, similar to HFC networks architectures described further above. This approach has conventionally required at least two lasers, disposed at respective opposing transceivers, and operating at different wavelengths to accomplish frequency/wavelength multiplexing. A single-fiber/two laser approach is described further below with respect to FIG. 46.

Figure 46:
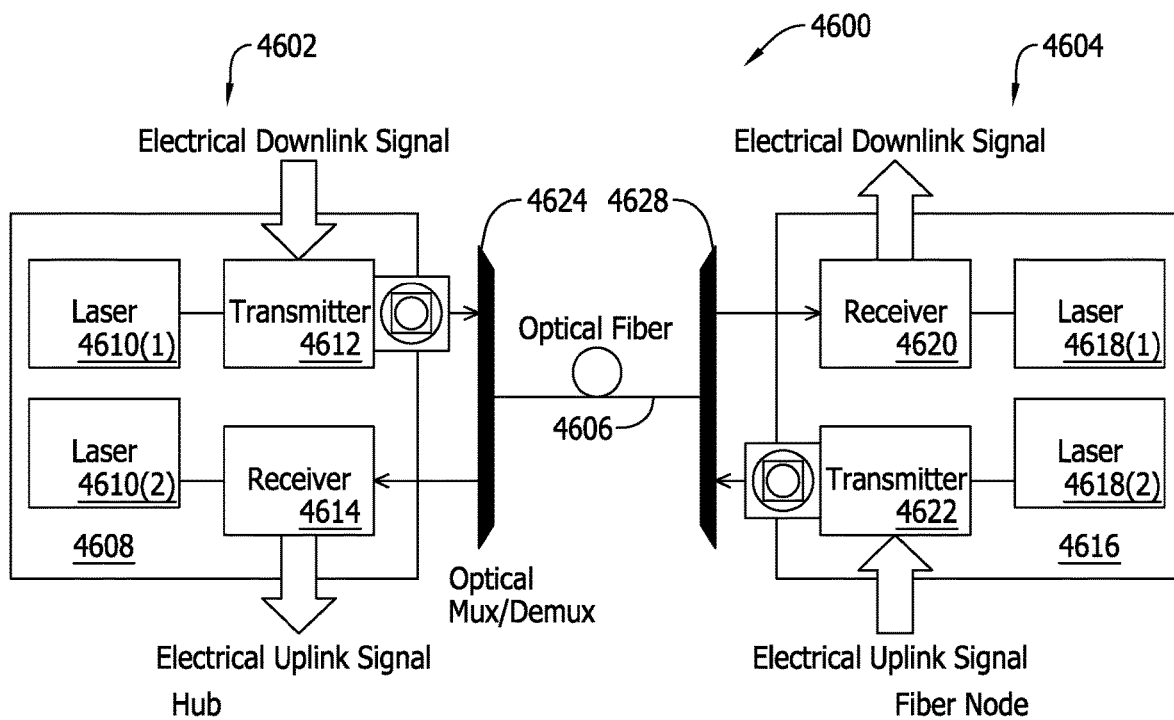
FIG. 46 is a schematic illustration of a coherent optics network architecture.

FIG. 46 is a schematic illustration of a coherent optics network architecture 4600. Architecture 4600 is similar to architecture 4500, FIG. 45, and includes a hub 4602, a fiber node 4604, an optical transport medium 4606 (e.g., a single optical fiber, in this example) communicatively coupled therebetween, a hub transceiver 4608 having a first hub laser source 4610(1), a second hub laser source 4610(2), a hub transmitter 4612, and a hub receiver 4614, a node transceiver 4616 having a first node laser source 4618(1), a second node laser source 4618(2), a node receiver 4620, and a node transmitter 4622, a hub optical multiplexer 4624, and a node optical multiplexer 4626.

Architecture 4600 differs from architecture 4500 though, not only by the use of a single optical fiber instead of two, but also by the use of two lasers instead of one. In this configuration, the respective first laser source 4610(1), 4618(1) at transceivers 4608, 4616 may operate at a different frequency than the respective second laser source 4610(2), 4618(2) of that transceiver, but at the same frequency (or wavelength) as the first laser source of the other transceiver. In this configuration, optical multiplexers 4624, 4626 may be used to multiplex the different frequencies together at one end for optical transport, and demultiplex the multiplexed frequencies at the other end, e.g., following a wavelength management and allocation strategy for combining the different wavelengths over the same fiber.

Conventionally, this single-fiber/two laser approach has been helpful for increasing the signal capacity of a single fiber strand, but this approach has also been undesirably costly, not only in the monetary price of adding a second laser at each transceiver, but also from the significant increases to the power consumption, operational complexity, and transceiver footprint of a communication system according to architecture 4600.

The embodiments herein overcome these conventional challenges through the implementation of innovative coherent optics architectures and techniques for the efficient use thereof. In an exemplary embodiment, a full duplex bidirectional coherent optics approach is achieved through leveraging two optical circulators on each end of a single fiber in an innovative configuration. In this unique configuration, the optical circulator is a passive, low-cost element (i.e., particularly in comparison with a second laser or a second fiber line installation), but nevertheless a directional device that functions analogously to a traffic roundabout for automobiles. That is, the optical circulator serves to re-route the optical path of incoming signals to different output directions.

The full duplex coherent optics embodiments described further herein realize the benefits of both conventional approaches described immediately above, but while also avoiding the costs and technical challenges associated with both approaches. More particularly, the full duplex coherent optics approaches herein advantageously achieve bidirectional transmission over a single fiber, but without requiring two lasers at the transceivers. The present full duplex coherent optics systems and methods realize bidirectional transmission using a single laser over a single-fiber connection in a coherent detection communication system. An exemplary full duplex coherent optics topology is described further below with respect to FIG. 47.

Figure 47:
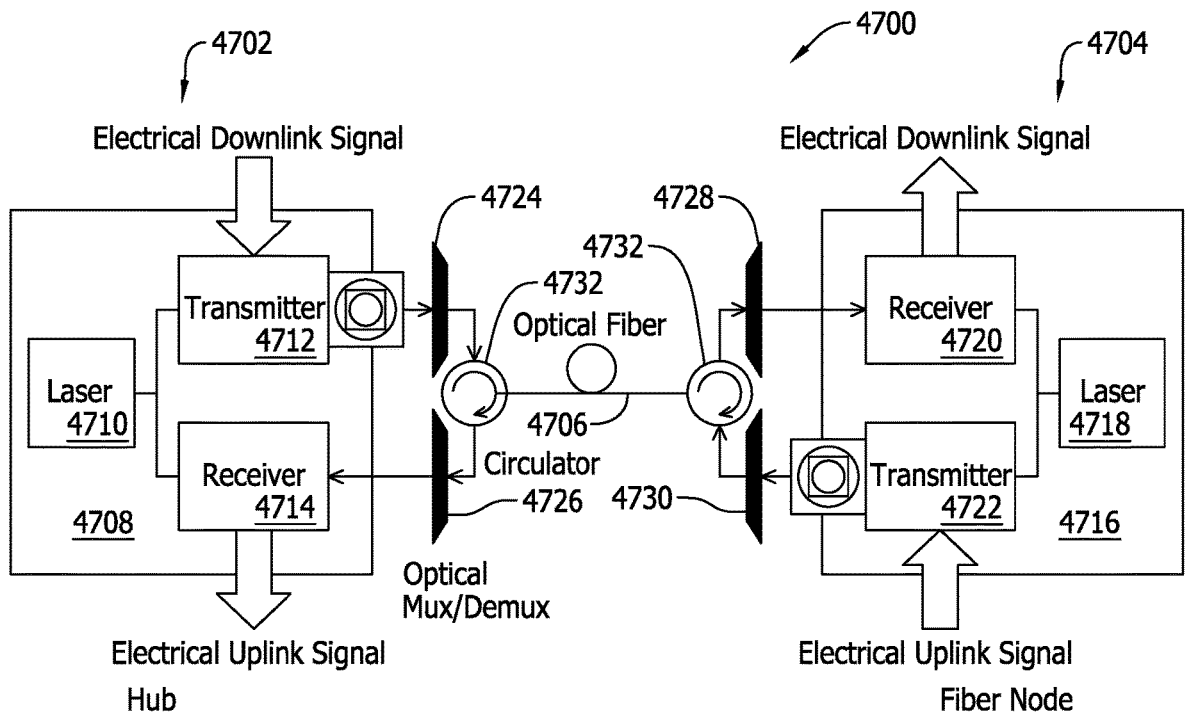
FIG. 47 is a schematic illustration of a coherent optics network architecture.

FIG. 47 is a schematic illustration of a coherent optics network architecture 4700. Architecture 4700 is similar to architecture 4500, FIG. 45, and includes a hub 4702, a fiber node 4704, an optical transport medium 4706 (e.g., a single optical fiber) communicatively coupled therebetween, a hub transceiver 4708 having a hub laser source 4710, a hub transmitter 4712, and a hub receiver 4714, a node transceiver 4716 having a node laser source 4718, a node receiver 4720, and a node transmitter 4722, a first hub optical multiplexer 4724, a second hub optical multiplexer 4726, a first node optical multiplexer 4728, and a second node optical multiplexer 4730.

Architecture 4700 differs from architecture 4500 in that architecture 4700 further includes a hub optical circulator 4732 disposed between hub 4702 and optical transport medium 4706, and which operably couples first hub optical multiplexer 4724 and second hub optical multiplexer 4726 with optical transport medium 4706. Architecture 4700 further includes a node optical circulator 4734 disposed between node 4704 and optical transport medium 4706, and which operably couples first node optical multiplexer 4728 and second node optical multiplexer 4730 with optical transport medium 4706.

Embodiments following the unique configuration of architecture 4700 are uniquely suited to improving the reach of the cable network paradigm, which has conventionally focused on access environments having limited transmission distances. That is, unlike the backbone and metropolitan coherent optical network paradigms, the access network paradigm does not conventionally employ multiple directional optical amplifiers in cascade. As described above though, optical communication systems for coherent signal detection see higher OSNR sensitivity and higher tolerance to impairments from spontaneous Rayleigh backscattering (e.g., continuous reflection) and Fresnel reflection (e.g., discrete reflections) when compared with conventional intensity-modulated communication systems.

Furthermore, and as also described above, most existing conventional analog optics networks employ APCs to mitigate return loss from MPI, fusion or mechanical splices from jumper cables or optical distribution panels. Additionally, the threshold of the SBS nonlinear effect is significantly suppressed due to the phase-modulated signals reducing the optical carrier power and increasing the effective linewidth. Thus through effective implementation of this innovative dimension of direction-division multiplexing (DDM) in the optical domain, systems and methods according to the present embodiments are enabled to use essentially any coherent wavelength twice, i.e., once in each direction, thereby doubling the system capacity of each fiber. Furthermore, these full-duplex techniques are not wavelength-selective, i.e., the present embodiments are of particular value for both short and long wavelengths. The test results described herein still further demonstrate effective coverage for not only the entire C-Band, but effectively the entire fiber spectrum, in accordance with the different optical sources implemented within the system or network.

FIG. 48 is a schematic illustration of a coherent optics network architecture 4800. In an exemplary embodiment, architecture 4800 represents a real-world testing implementation of the principles described above, and is similar to architecture 2100, FIG. 21. That is, architecture 4800 includes a first coherent transceiver 4802, a second coherent transceiver 4804, an optical fiber 4806, a first transmitter 4808 at first coherent transceiver 4802, a second transmitter 4810 at second coherent transceiver 4804, a first receiver 4812 at first coherent transceiver 4802, a second receiver 4814 at second coherent transceiver 4804, a first optical circulator 4816, and a second optical circulator 4818.

In exemplary operation, architecture 4800 further included a variable attenuator 4820 on the receiver side with respect to each transmission direction of architecture 4800. More specifically, in the examples depicted in FIG. 48, the disposition of variable attenuator 4820 at first receiver 4812 is labeled as architecture 4800, and the disposition of variable attenuator 4820 at second receiver 4814 is labeled as architecture 4800'. In this manner, the real-world implementation of architecture 4800/4800' measured, for test lengths of both 50 km and 80 km, the power penalty of the system with, and without, full duplex operation. According to this testing implementation, the power of both the received signal(s) and the returned impairment(s) were attenuated, and the penalty arose from the Rayleigh backscattering and Fresnel reflection along the entire link of architecture 4800. The testing results are described further below with respect to FIGS. 49A-B.

FIGS. 49A-B are graphical illustrations of comparative plots 4900, 4902, respectively, of bit error rate against received power for architecture 4800, FIG. 48. In a real-world testing implementation, plot 4900 represents the received power over an 50-km single fiber (SMF), and plot 4902 represents the received power over an 80-km single fiber (SMF). For both of plots 4900, 4902 the reflected power is measured as −34.7 dBm as the output power of the respective transmitter, TX1 or TX2, is set to 0 dBm. As can be seen in the example depicted in FIG. 49A, when compared with full duplex operation having single direction operation, an approximately 0.5 dB power penalty was observed for a fiber length of 50 km, and in the example depicted in FIG. 49A, an approximately 1 dB power penalty was observed for a fiber length of 80 km.

FIG. 50 is a schematic illustration of a coherent optics network architecture 5000. In an exemplary embodiment, architecture 5000 represents an alternative real-world testing implementation similar to architecture 4800, FIG. 48, and includes a first coherent transceiver 5002, a second coherent transceiver 5004, an optical fiber 5006, a first transmitter 5008 at first coherent transceiver 5002, a second transmitter 5010 at second coherent transceiver 5004, a first receiver 5012 at first coherent transceiver 5002, and a second receiver 5014 at second coherent transceiver 5004. Different though, from architecture 4800, architecture 5000 represents a three-circulator topology, in contrast with the two-circulator topology of architecture 4800.

More specifically, architecture 5000 further includes a first optical circulator 5016, a second optical circulator 5018, and a third optical circulator 5020, as well as an optical splitter 5022 disposed between first transmitter 5008 and first and second optical circulators 5016, 5018, and an optical coupler 5024 disposed between first and second optical circulators 5016, 5018, between first and third optical circulators 5016, 5020, and between second and third optical circulators, 5018, 5020. In this test example, architecture 5000 additionally included a variable attenuator (VA) 5026 at second transmitter 5010, and a variable backreflector (VB) 5028 at first optical circulator 5016.

In operation of testing architecture 5000, variable backreflector 5028 served to measure the respective robustness of coherent signals at different return loss levels. That is, in contrast to the fixed reflection impairment testing setup of architecture 4800, architecture 5000 implemented variable backreflector 5028 to purposely control the reflected power to the desired signal detection. As described further below with respect to FIGS. 51A-B, a polarization controller (PC) 5030 was disposed between first optical circulator 5016 and optical coupler 5024. According to this configuration of architecture 5000, full duplex operation was effectively achieved by: (i) controlling the received power (i.e., the transmitted power-link loss) to be larger than the power sensitivity requirements of architecture 5000; and (ii) maintaining the OSNR (i.e., from reflection power) to be better than the OSNR sensitivity requirements of architecture 5000. The testing results are described further below with respect to FIGS. 51A-B.

FIG. 51A is graphical illustration of a comparative plot 5100 of bit error rate against received power for architecture 5000, FIG. 50. FIG. 51B is graphical illustration of a comparative plot of required received power against reflected power for architecture 5000. More specifically, plot 5100 depicts BER vs. power curves 5104 that were measured under different reflected power levels for 100 G PM-QPSK signals, and plot 5102 depicts comparative power levels for the 80-km transmission case. In this implementation, the reflected power (e.g., FIG. 51B) was measured before first receiver 5012 (RX1), with the transmitter output power having been set to 0 dBm.

Further to this testing implementation, polarization controller 5030 was inserted in the testing setup (implementation of architecture 5000) to emulate a worst case scenario for polarization alignment. As can be seen from plot 5102, the required receive power increases, in a nearly linear fashion, as the reflected power increases. More particularly, in the 80-km transmission case illustrated in FIG. 51B, at region 5106 of plot 5102, where the reflected power is at a −34.8 dBm value (i.e., approximately the value described above with respect to the test results depicted in FIGS. 49A-B), to maintain the required OSNR level of architecture 5000, the required received power is approximately −26 dBm. It may be noted that, for this implementation, no error floor is observable, even with reflected power arriving at −24 dBm.

FIG. 52 is a schematic illustration of a coherent optics network architecture 5200. Architecture 5200 represents a testing implementation similar to architecture 4800, FIG. 48, and includes a first coherent transceiver 5202, a second coherent transceiver 5204, an optical fiber 5206, a first transmitter 5208 at first coherent transceiver 5202, a second transmitter 5210 at second coherent transceiver 5204, a first receiver 5212 at first coherent transceiver 5202, a second receiver 5214 at second coherent transceiver 5204, a first optical circulator 5216, a second optical circulator 5218, and a variable attenuator 5220. Different though, from architecture 4800, architecture 5200 locates variable attenuator 5220 on the transmitter side with respect to each transmission direction (i.e., labeled architecture 5200 at first receiver 5212, and 5200' at second receiver 5214). Similar to architecture 4800 though, architecture 5200 was also implemented for test lengths of both 50 km and 80 km, and the testing results are described further below with respect to FIGS. 53A-C.

FIGS. 53A-C are graphical illustrations of comparative plots 5300, 5302, 5304 of BER against received power for architectures 5200, 5202, FIG. 52. More particularly, similar to plots 4900, FIG. 49, plots 5300, 5302, 5304 demonstrate the BER performance of full duplex operation where the reflected power was measured as −34.8 dBm (i.e., at receivers 5012, 5014). Plots 5300, 5302, 5304 thus demonstrate the performance characteristics in the case where the reflected power is maintained at a relatively steady level, and the power of the desired signal (i.e., from transmitters 5008, 5010) is attenuated.

FIG. 54 is a schematic illustration of a coherent optics network architecture test subsystem 5400. Subsystem 5400 is similar to portions of architecture 5000, FIG. 50, and refers to substantially equivalent components thereof by similar labels. More particularly, subsystem 5400 includes a hub coherent transmitter 5402 (e.g., TX1) and a node coherent receiver 5404 (e.g., RX2) in operable communication with one another over an optical fiber 5406. In an embodiment, at least one EDFA 5408 is disposed along optical fiber 5406. Subsystem 5400 further includes an optical splitter 5410 and an optical coupler 5412 in operable communication with optical splitter 5410 over a first transmission branch 5414 and a second transmission branch 5416. In this example, subsystem 5400 further includes a first variable attenuator 5418 disposed between optical splitter 5410 and optical coupler 5412 along first transmission branch 5414, and a second variable attenuator 5420 and a PC 5422 disposed between optical splitter 5410 and optical coupler 5412 along second transmission branch 5416.

In operation of subsystem 5400, reflected power was measured along optical fiber 5406 at a stage 5424 after optical coupler 5412, that is, between optical coupler 5412 and node receiver 5404, and second variable attenuator 5420 is disposed after optical splitter 5410, but effectively disabled emulate coherent interference between the hub transmitter 5402 and node receiver 5404. Testing results of subsystem 5400 are described further below with respect to FIGS. 55 and 56.

FIG. 55 is graphical illustration of a comparative plot 5500 of bit error rate against received power for architecture 5400, FIG. 54. More specifically, plot 5500 depicts BER vs. power curves 5502 that were measured under conditions where the power level of hub transmitter 5402 was zero dBm, and where the emulated reflection was attenuated, by first variable attenuator 5418, by increasing values of 5, 10, 15, 20, and 25 dB. Similar to the example depicted in FIG. 54, inclusion of PC 5422 enables collection of valuable information regarding the worst polarization case.

FIG. 56 is graphical illustration of a comparative plot 5600 of required power against reflected power for architecture 5400, FIG. 54.

More specifically, plot 5600 depicts comparative power levels within the required optical power at node receiver 5406 has a value of 4.5E-3. Similar to the embodiment depicted in FIG. 51B, the required power level exhibits a relationship to the reflected power that is somewhat linear.

FIG. 57 is a schematic illustration of a coherent optics network architecture 5700. Architecture 5700 represents a fiber-pair approach similar to architecture 4600, FIG. 46, and includes a hub 5702, a fiber node 5704, and an optical transport medium 5706 (i.e., a dedicated downlink optical fiber $5706_D$, and a dedicated uplink optical fiber $5706_U$, in this example) communicatively coupled therebetween. Different though, from architecture 4600, hub 5702 further includes a hub transceiver 5708 having a hub laser source 5710, a hub coherent modulator 5712 (i.e., in the place of a transmitter), and a hub coherent detector 5714 (i.e., in the place of a receiver). Similarly, node 5704 includes a node transceiver 5716 having a node laser source 5718, a node coherent detector 5720, and a node coherent modulator 5722. Architecture 5700 further includes a hub optical multiplexer 5724, and a node optical multiplexer 5726. In operation, architecture 5700 functions in a manner substantially similar to the operation of architecture 4600, except that architecture 5700 implements more coherent-detection-specific components than described above with respect to the more conventional transmitter/receiver pair implementations.

FIG. 58 is a schematic illustration of a coherent optics network architecture 5800. Architecture 5800 is similar to architecture 5700, FIG. 57, and includes a hub 5802, a fiber node 5804, an optical transport medium 5806 (i.e., a single fiber, in this example) communicatively coupled therebetween, a hub transceiver 5808 having a hub laser source 5810, a hub coherent modulator 5812 in communication with hub laser source 5810, and a hub coherent detector 5814. Similarly, node 5804 includes a node transceiver 5816 having a node laser source 5818, a node coherent detector 5820, and a node coherent modulator 5822. Architecture 5800 further includes a hub optical multiplexer 5824, and a node optical multiplexer 5826.

However, different from architecture 5700, within architecture 5800, fiber node 5804 further includes a node local oscillator 5828 in operable communication with node coherent detector 5820, and hub 5802 further includes a hub local oscillator 5830 in operable communication with hub coherent detector 5814. In operation, architecture 5800 functions in a manner similar to the operation of the several architectures described above, except that architecture 5800 is configured to modulate two separate wavelengths, i.e., $\lambda_{down}$ and $\lambda_{up}$, on single fiber 5806. That is, according to this innovative configuration of coherent detection techniques, implementation of local oscillators 5828, 5830 enable the modulation of two separate wavelengths in a single-fiber approach, but without requiring an additional laser, which is considerably more expensive than local oscillator, at each transceiver.

FIG. 59 is a schematic illustration of a coherent optics network architecture 5900. Architecture 5900 is similar to architecture 5800, FIG. 58, and includes a hub 5902, a fiber node 5904, an optical transport medium 5906 (i.e., a single fiber, in this example) communicatively coupled therebetween, a hub transceiver 5908 having a hub laser source 5910, a hub coherent modulator 5912 in communication with hub laser source 5910, and a hub coherent detector 5914. Similarly, node 5904 includes a node transceiver 5916 having a node laser source 5918, a node coherent detector 5920, and a node coherent modulator 5922. Architecture 5800 further includes a hub optical multiplexer 5924, a node optical multiplexer 5926, and a node local oscillator 5928 in operable communication with node coherent detector 5920.

However, different from architecture 5800, within architecture 5900, instead of a second local oscillator at hub 5902, architecture 5900 instead includes a hub optical circulator 5930 between hub optical multiplexer 5924 and optical transport medium 5906, and a node optical circulator 5932 between optical transport medium 5906 and node optical multiplexer 5926. In operation, architecture 5900 functions in a manner similar to the architectures described above, except that architecture 5900 is configured to modulate a single wavelengths $\lambda$ on single fiber 5906.

FIG. 60 is a schematic illustration of a coherent optics network architecture 6000. Architecture 6000 represents a dual-fiber, single-wavelength on a single-fiber transmission approach similar to the operation of architecture 5700, FIG. 57, and includes a hub 6002, a fiber node 6004, an optical transport medium 6006 (i.e., a downlink optical fiber 6006$_D$, and an uplink optical fiber 6006$_U$, in this example) communicatively coupled therebetween, a hub transceiver 6008 having a hub laser source 6010, a hub coherent modulator 6012, and a hub coherent detector 6014, a node transceiver 6016 having a node laser source 6018, a node coherent detector 6020, and a node coherent modulator 6022. Different though, from architecture 5700, architecture 6000 does not require additional optical multiplexers/demultiplexers between hub 6002 and fiber node 6004.

FIG. 61 is a schematic illustration of a coherent optics network architecture 6100. Architecture 6000 represents a single-wavelength bidirectional system approach similar to the operation of architecture 4700, FIG. 47, and includes a hub 6102, a fiber node 6104, an optical transport medium 6106 (e.g., a single optical fiber) communicatively coupled therebetween, a hub transceiver 6108 having a hub laser source 6110, a hub transmitter 6112, and a hub receiver 6114, a node transceiver 6116 having a node laser source 6118, a node receiver 6120, and a node transmitter 6122, a hub optical multiplexer 6124, a node optical multiplexer 6126, a hub optical circulator 6128, and a node optical circulator 6130. Architecture 6100 differs from architecture 4700 in that, within the topology of architecture 6100, optical circulators 6128, 6130 are disposed before the respective optical multiplexers 6124, 6126. That is, hub optical circulator 6128 is located between hub 6102 and hub optical multiplexer 6124, and node optical circulator 6130 is located between node 6104 and node optical multiplexer 6126.

FIG. 62 is a schematic illustration of a coherent optics network architecture 6200. Architecture 6200 is similar to architecture 300, FIG. 3, and represents an example of a real-world demonstration setup for an aggregation use case implementing DWDM transmission using multiplexers and demultiplexers.

For the actual setup, architecture 6200 included a hub 6202, an aggregation fiber node 6204, a transport medium/fiber 6206, a hub coherent transceiver 6208, a hub optical circulator 6210, a node coherent transceiver 6212, a node optical circulator 6214, a plurality of hub transmitters 6216 (three hub transmitters, in this setup), a plurality of hub receivers 6218 (two hub receivers, in this setup), a plurality of node receivers 6220 (three node receivers, in this setup), a plurality of node transmitters 6222 (two node transmitters, in this setup), a first optical multiplexer 6224 at hub 6202, a second optical multiplexer 6226 at node 6204, a first optical demultiplexer 6228 at hub 6202, and a second optical demultiplexer 6230 at node 6204.

Different from architecture 300, testing architecture 6200 further includes a hub optical modulation analyzer (OMA) 6232 disposed between hub optical circulator 6210 and first optical demultiplexer 6228, and a node OMA 6234 disposed between node optical circulator 6214 and second optical demultiplexer 6230. In the actual setup, transceivers 6208, 6212 utilized Acacia CFP/CFP2-DCO modules and EVBs, NeoPhotonics CFP-DCO module and EVBs, and OMAs 6232, 6234 utilized Keysight N4392A Optical Modulation Analyzers. Not shown, in FIG. 62, but also used in the demonstration setup, are 3 dB optical couplers, optical patch cables, an optical spectrum analyzer (OSA) for tracking and displaying two different directions on the same screen, optical power meters, display monitors for each of the optical spectra, the downstream BER, and the upstream BER, power supplies (e.g., 12V, 30V), and graphical user interfaces (GUIs) for the respective coherent CFP modules.

From this setup, testing architecture 6200 was able to demonstrate 100 G and 200 G data rates, for different modulation formats, implementing 50/100 GHz spacing, and for a number of wavelengths in the downstream direction (e.g., $\lambda_1$, $\lambda_2$, $\lambda_3$) that is different than the number of wavelengths (e.g., $\lambda_1$, $\lambda_2$) in the upstream direction.

FIG. 63 is a schematic illustration of a coherent optics network architecture 6300. Architecture 6300 is similar to architecture 6200, FIG. 62, and represents an example of a real-world demonstration setup for an aggregation DWDM channel use case using multiplexers and demultiplexers. Architecture 6300 differs though, from architecture 6200, in that architecture 6300 was configured to transmit the same number of wavelengths (e.g., $\lambda_1$, $\lambda_2$) in both the upstream and downstream directions.

Architecture 6300 includes a hub 6302, an aggregation fiber node 6304, a transport medium/fiber 6306, a hub coherent transceiver 6308, a hub optical circulator 6310, a node coherent transceiver 6312, a node optical circulator 6314, a plurality of hub transmitters 6316 (two, in this setup), a plurality (e.g., two) of hub receivers 6318, a plurality (e.g., two) of node receivers 6320, a plurality (e.g., two) of node transmitters 6322, a first optical multiplexer 6324 at hub 6302, a second optical multiplexer 6326 at node 6304, a first optical demultiplexer 6328 at hub 6302, a second optical demultiplexer 6330 at node 6304, a hub OMA 6332 disposed between hub optical circulator 6310 and first optical demultiplexer 6328, and a node OMA 6334 disposed between node optical circulator 6314 and second optical demultiplexer 6330. Operational results of architecture 6300 demonstrated that the present innovative principles are useful and advantageous for single-fiber approaches aggregating the upstream and downstream bidirectional wavelengths equally, or unequally.

Coherent Optics for Access Applications and Cable Deployment

The above principles represent significant improvements to conventional communication systems where the coexistence of different signals, and of different signal types, has been particularly challenging. The present full duplex coherent optics solutions overcome these challenges.

Cable access networks, for example, have been recently undergoing significant technological and architectural changes, which have been driven by an ever-increasing residential data service growth rate, as well as an increasing number of services types being supported (e.g., business services, cellular connectivity, etc.). Digital fiber technologies and distributed access architectures for fiber deep strategies have provided an improved infrastructural foundation for cable operators to deliver service quality to end users, but conventional technologies have not been capable of fully utilizing these structural improvements. User demand has been outpacing the structural capacity of the recent infrastructural improvements.

These challenges have been significant in the cable-specific fiber access environment, which includes only a few fibers available for a 500-household serving area. Because the cost of adding more fibers is considerably expensive, the present inventors have thus developed a number of innovative architectural and processing solutions based on coherent optics to significantly expand the capacity of the existing fibers. The present systems and methods thus demonstrate further long-term fiber access connectivity solutions of significant value in the next-generation cable access network paradigm, as well as point-to-point (P2P) coherent optics topologies in particular. The embodiments herein enable a smooth transition from digital coherent long-haul and metro solutions to coherent access network applications, while also enabling the network operators to best leverage existing fiber infrastructures to withstand the exponential growth in capacity and services for residential and business subscribers without significantly increasing the subscriber costs.

Conventional cable operators seeking to deploy coherent optics into their access networks (typically, 10 G networks) have heretofore had only two options: (1) deploy coherent optics on the existing 10 G system; or (2) build a new coherent-only connection. Green field deployments of such coherent systems on fibers have been considered optimal, because such deployments would not require compensation devices, such as dispersion compensation modules (DCMs) and other wavelength channels. However, in practice, for such upgrades to be cost-effective, only one or a few channels may be upgraded in many brown field installations, depending on capacity demand. Therefore, for networks that already implement WDM analog DOCSIS and/or 10 G on-off keying (OOK), the different services would have to coexist with the new coherent system to support a hybrid scenario over the same fiber transmission.

Such hybrid configurations, however, have not been fully implemented due to lack of operator ability to support such hybrid systems for 100 G, and also due to particular concerns, such as cross-phase modulation (XPM) impairments in the fiber nonlinear regime. The embodiments described herein not only offer solutions to these concerns in the field, but also present extensive experimental verifications, under various coexistence scenarios, as proof of concept, while also providing useful operational and deployment guidance for such use cases. The present systems and methods thus provide effective techniques for simultaneous bi-directional transmission over single fiber and single wavelength using full duplex coherent optics, to effectively double the capacity of existing fibers in a coherent optics-based fiber distribution network. The present embodiments further successfully analyze and quantify impairments such as ORL and optical reflections, including all discrete reflections (Fresnel) and continuous reflections (backscatter), such that these impairments may be addressed or mitigated by network operators.

Coherent optics/coherent detection technology provides high receiver sensitivity through coherent amplification by the local oscillator. However, commercial use has been hindered by the additional complexity of active phase and polarization tracking. Additionally, the emergence of the cost-effective EDFA as an optical pre-amplifier reduced the urgency to commercialize coherent detection technology because the EDFAs, together with improved WDM techniques, served to extend the reach and capacity of many networks. Traffic demand, combined with per-bit/per-Hz cost reduction requirements, spectral efficiency increases, and advancements of CMOS processing nodes and DSP, have since served to exhaust the expanded capacity and reach of these extended networks. The coherent optics technology solutions herein avoid these limits.

Commercial coherent optical technology was first introduced in long haul applications to overcome fiber impairments that required complex compensation techniques when using direct detection receivers. The first-generation coherent optical systems were based on single-carrier polarization division multiplexed quadrature phase shift keying (PDM-QPSK) modulation formats, and the achieved spectral efficiency (SE) thereof was 2 bits/s/Hz over conventional 50-GHz optical grids. Commercial coherent technology has thus increased system capacity to approximately 10 Tb/s in a fiber C-band transmission window. Coherent solutions have since further moved from long haul to metro and access networks by leveraging the further developments in CMOS processing, design complexity reductions, and reduced costs for opto-electronic components.

Coherent optics technology and coherent detection communication systems therefore represent a clean progression from this initial long-haul technology development, into coherent optical access networks, and particularly in light of recent developments of application-specific integrated circuit (ASIC) DSP chips and corresponding optical modules. The present inventors contemplate implementation of programmable and comprehensive coherent DSPs into the several embodiments described herein, which DSPs may be capable of processing data rates in the range of 100 G-600 G per single wavelength (or greater), while supporting higher modulation formats such as 32/64 QAM (or greater) and high net coding gain (NCE) FEC. As described herein, additional solutions are provided for reducing the system/network power consumption, thereby enabling operators to meet the size and cost requirements of particular access applications.

The present coherent detection techniques further enable, for access networks, superior receiver sensitivity that allows for extended power budgets, as well as high spectral efficiency for dense WDM (DWDM). Moreover, the use of high-order modulation formats enables efficiently utilizing the spectral resource and benefiting futureproof network upgrades. In the cable access environment, coherent optics allows operators to best leverage the existing fiber infrastructure to deliver vastly increased capacity with even longer distances.

However, coherent technologies in long-haul optical systems have utilized best-in-class (i.e., the most expensive) discrete photonic and electronic components, including the latest DAC/ADC and DSP ASIC based on the most recent CMOS processing nodes. Coherent pluggable modules for metro solutions, on the other hand, have progressed from the CFP to the CFP2 form factor to realize a smaller footprint, lower cost, and lower power dissipation. Nevertheless, this progression in the metro paradigm is still considered over-engineered, too expensive, and too power hungry, to be successfully implemented for interoperability in the access network paradigm. The access network is a very different environment from the long haul and metro environments, and will often require hardened solutions for remote site locations where the temperature is not controlled. Standardization and interoperability are also important considerations in the access network paradigm, but standardization in the optical community has been driven mainly by short-reach metro/aggregation applications, where optical performance is not a differentiator.

The present systems and methods though, enable easy standardization and smooth interoperability in the access network paradigm, and particularly with respect to P2P coherent optics communication systems which enable support to the cable industry for the growing requirements of broadband access, such as, for example, toward Node+0 architectures and related substantial increase in the volume of optical connections to intelligent nodes resulting from this evolution. The present solutions are thus also fully compatible with recent short-reach coherent optical standardizations developed by: (i) the Optical Internetworking Forum (OIF), such as DWDM interfaces in DCI applications with reaches up to 120 km with multi-vendor interoperability; and (ii) IEEE, such as coherent optics for non-amplified applications beyond 10-km distance.

In an exemplary embodiment, the present coherent optics technology solutions may be leveraged in the cable environment as a means of multi-link aggregation, and/or through direct edge-to-edge connectivity to desired endpoint. An exemplary edge-to-edge connectivity environment is described further below with respect to FIG. 64.

FIG. 64 is a schematic illustration of an optical communications network system 6400. In an embodiment, system 6400 includes at least one core network 6402, a hub 6404, a plurality of aggregation nodes 6406, and a plurality of end users 6408 (e.g., high speed wavelength services, remote PHY, remote MAC-PHY, backhauls, remote FTTH backhauls, 4G/5G wireless services, etc.). Aggregation nodes 6406 operably connect with hub 6404 over long (e.g., 20-80 km or greater) fibers 6410, and with end users 6408 over short (e.g., typically less than 3-5 km) fibers 6412. The present inventors therefore contemplate that, in accordance with capacity growth trends, it is likely that the aggregation use cases will initially out-number direct edge-to-edge connectivity use cases. The present aggregation use cases, for example, support any Distributed Access Architecture (DAA), including Remote PHY, Remote MAC-PHY, and Remote optical line terminal (OLT) architectures.

In the aggregation use case, a device host, such as an Optical Distribution Center (ODC) or aggregation node is configured to terminate a downstream P2P coherent optic link originating from the headend or hub, and then output multiple optical or electrical Ethernet interfaces, operating at lower comparative data rates, to connect devices that are either co-located with the ODC, and/or exist within or past a deeper secondary hub in the network. In some embodiments, such aggregation and disaggregation functionality is performed by a router, an Ethernet switch, or a muxponder depending on the relevant DOCSIS protocols, the PON system requirements, the business traffic demand, costs, scalability/flexibility/reliability requirements, or other operational considerations. In the example depicted in FIG. 64, each primary hub 6402 may be configured to support multiple (e.g., approximately 60 or greater) aggregation nodes 6406 for different services.

Commercial services have also been a rapidly growing and high revenue segment in the cable industry. The present coherent technology solutions therefore fully support the growing cable service portfolio for business connectivity, cellular backhaul, and wireless access point connectivity (including 5 G connectivity). These services demand very high bandwidths, as well as robustness and flexibility, for supporting a diversity of service levels. The coherent optics technology embodiments described herein advantageously and fully address these growing service requirements for this market segment.

As described above, related patents to the present inventors demonstrate how direct wavelength services may overlay with aggregation connections, such as with 10 G/25 G intensity-modulated signals and/or 100 G coherent signals. This type of overlay is thus lambda/wavelength deep for edge-to-edge services. In the use cases described herein, the coherent optic links are effectively terminated at the edge customer, and then the WDM multiplexer/demultiplexer at the headend/hub may be used for aggregating multiple P2P optical links onto a single fiber. In an exemplary embodiment, such WDM systems may include a hybrid system having a mix of data rates and modulation formats.

The capability for coexistence with legacy optical channels is a significant advantage realized according to the present systems and methods. The following description illustrates several testing embodiments that verify these coexistence advantages. As described above, the expectation from cable operators has been that it is preferable to add more 100 G coherent services, by using free channels in the WDM grid, but without impacting existing services, that is, essentially creating a hybrid 10 G/100 G network in which multiple services coexist. However, 10 G signals based on analog amplitude modulation (AM) or OOK have a much higher power density than coherent 100 G, which causes the analog AM signals to have a much greater impact on the refractive index of the system for nonlinear effects, such as XPM and four-wave mixing (FWM). Additionally, crosstalk penalties in ITU-T grid networks having mixed rates have led to system degradation due to optical Mux/DeMux in-band residual power or non-uniform channel grid allocation in DWDM systems.

The following description therefore demonstrates the effectiveness of the present systems and methods to enable network operators to sufficiently support 100 G applications on existing networks infrastructures. The following experimental verification results quantitatively explore performance challenges in the proposed coexistence applications. Previous performance comparisons, due to the limited availability of the number of analog optical channels, tested three co-propagating analog DOCSIS channels along with single coherent channels. Nevertheless, the results of these previous experiments showed that coherent optics transmissions remain robust, even in close proximity to the much stronger analog optical carriers, and also that coherent optical carriers impose a negligible impact on the proximate analog optical carriers. The following experimental results therefore expand upon these previous discoveries, through the innovative testing techniques described herein to evaluate the transmission performance of fully-loaded coexisting systems over longer transmission distances.

FIGS. 65A-B are graphical illustrations of comparative optical spectrum plots 6500, 6502, respectively. More specifically, optical spectrum plot 6500 represents power over wavelength for a channel corresponding to CH21, and optical spectrum plot 6502 represents power over wavelength for a channel corresponding to CH24. Optical spectrum plots 6500, 6502 thus demonstrate the effectiveness of DWDM components for Mux and Demux 3.1.

In the examples illustrated in FIGS. 65A-B, results are depicted from testing three different kinds of optical multiplexors/de-multiplexors have been evaluated in the testing: (1) an 8-port thin-film filter (TFF); (2) a 40-port array waveguide grating (AWG)-based optical multiplexer/demultiplexer; and (3) a 48-port AWG-based optical multiplexer/demultiplexer. The TFF uses concatenated interference filters, each of which is fabricated with a different set of dielectric coatings designed to pass a single wavelength. Optical spectrum plot 6500 includes a first sub-plot 6504 illustrating the optical spectrum using the 8-port TFF, a second sub-plot 6506 illustrating the upstream optical spectrum using the 40-port AWG, and a third sub-plot 6508 illustrating the upstream optical spectrum using the 48-port AWG. Similarly, optical spectrum plot 6502 includes a first sub-plot 6510 for the 8-port TFF, a second sub-plot 6512 for the 40-port AWG, and a third sub-plot 6514 for the 48-port AWG.

As can be seen from plots 6500, 6502, the TFFs demonstrate better optical performance, in terms of flatter passband ripple and higher isolation in neighboring channels, in comparison with the AWGs. The TFFs also work effectively in the case of low channel counts, and particularly for analog WDM systems, but present challenges in the case of higher channel counts and narrower spacing due to the TFFs requiring several hundred layers of coating, and therefore more strict error control. In contrast to TFFs, AWG devices use a parallel multiplexing approach based on planar waveguide technology, and have an advantage over TFFs in that the cost of an AWG devices is not dependent on wavelength count, which renders the AWG significantly more cost-effective for high channel count applications. Accordingly, existing long-haul coherent DWDM systems typically use AWG for Mux and DeMux implementations. In the experimental setup to achieve the results depicted in FIGS. 65A-B, the insertion loss was approximately 1.5 dB for the TFFs, and approximately 3.5 dB for the 40-port AWG, and described further below with respect to FIG. 66.

FIG. 66 is a schematic illustration of a coherent optics network architecture test subsystem 6600. Subsystem 6600 is similar to portions of the several network architectures described herein, and refers to substantially equivalent components thereof by similar labels. More particularly, subsystem 6600 includes a coherent transmitter side 6602 (e.g., TX) and a coherent receiver side 6604 in operable communication with one another over an optical fiber 6606 (e.g., an SMF-28). Transmitter side 6602 includes an 8-port multiplexer 6608 (e.g., TFF) for analog channels, and a 40-port multiplexer 6610 (e.g., AWG) for coherent channels, which operably communicate with an optical combiner 6612 (e.g., 3 dB, in this example) before amplification by an EDFA 6614 disposed between combiner 6612 and optical fiber 6606. Receiver side 6604 similarly includes an 8-port demultiplexer 6616 for the analog channels, and a 40-port demultiplexer 6618 for the coherent channels, which operably communicate with an optical splitter 6620 (e.g., also 3 dB).

In operation, subsystem 6600 demonstrates an effective analog-plus-coherent coexistence implementation using an 8-port Mux/DeMux (e.g., 8-port multiplexer 6608/demultiplexer 6616). In this experimental setup of a first case with 40-port multiplexer 6610/demultiplexer 6618 (the topology to substitute or add 48-port AWG Mux/DeMux is not significantly different), all of eight analog DOCSIS channels (up to 1.2 GHz, with channel labels depicted in FIG. 66 corresponding to the standard ITU-T wavelength grid) are multiplexed through TFF-based 8-port multiplexer 6608, while four coherent channels are multiplexed through AWG-based 40-port multiplexer 6610 with a 100-GHz optical grid spacing. Both of these different types of multiplexed signals are then combined at optical combiner 6612.

The nonuniform selection of the analog wavelength plan thus serves to mitigate fiber nonlinear impairments, and FWM in particular. The selection of the coherent wavelength plans, on the other hand, considers which criteria may create the worst nonlinear crosstalk impairments. Accordingly, once the combined analog-plus-coherent signals are amplified by EDFA 6614 (e.g., configured for long-distance analog signal amplification, and a maximum output power of approximately 18 dBm), and the amplified signals are transmitted over optical fiber 6606 (e.g., 80-km SMF), and then split at optical splitter 6620 prior to reaching the respective demultiplexer 6616, 6618 for analog and coherent channels. The launched and received power of both types of channels, as well as the gain/attenuation of optical devices along the optical link of subsystem 6600, are shown below in Table 2. For this experimental setup, a 10-dB power difference was set between the analog and coherent channels.

TABLE 2

| Signal Type | Tx Output Power (dBm) | Mux Loss (dB) | Coupler Loss (dB) | EDFA Gain (dB) | Fiber Attenuation (dB) | Splitter Loss (dB) | DeMux Loss (dB) | Received Power (dBm) |
|---|---|---|---|---|---|---|---|---|
| Analog | 9.5 | −1.5 | −3 | +2.5 | −5.5 for 26.1 km; | −3 | −1.5 | −2.5 for 26.1 km; −6.5 for 51.8 km |
| Coherent | −1 | −3.5 | −3 | +5 | −9.5 for 51.8 km | −3 | −3.5 | −14.4 for 26.1 km; −18.4 for 51.8 km |

FIGS. 67A-B are graphical illustrations of comparative optical spectrum plots 6700, 6702, respectively. More specifically, optical spectrum plot 6700 represents power over wavelength for all analog and coherent signals transmitted over test subsystem 6600, FIG. 66, before and after optical amplification. That is, optical spectrum plot 6700 includes a first sub-plot 6704 illustrating the optical spectrum of the hybrid channels prior to amplification by EDFA 6614, and a second sub-plot 6706 illustrating the optical spectrum of the combined channels after amplification by EDFA 6614. Similarly, optical spectrum plot 6702 represents power over wavelength for the hybrid channels before and after optical fiber transmission, and includes a first sub-plot 6708 illustrating the optical spectrum of the hybrid channels prior to optical transmission over optical fiber 6606, and a second sub-plot 6710 illustrating the optical spectrum of the transmitted channels after transmission over optical fiber 6606. In both of plots 6700, 6702, it may be seen that CH23, CH 25, CH 26, and CH27 are coherent channels having wider spectra and lower power in comparison with the to eight analog channels.

FIG. 68A is a graphical illustration of a comparative plot 7000 of modulation error ratio (MER) against carrier frequency for the analog channels transmitted by subsystem 6600, FIG. 66. More specifically, for the system setup of subsystem 6600, the MER transmission performance of analog channel CH 52 illustrates that a negligible penalty is observed after 26.3-km or 51.8-km fiber transmission, evaluating the respective impact with and without coherent signals on the analog channel. FIG. 68A illustrates the performance effect on only CH 52 for ease of explanation, and not in a limiting sense. Similar performance test results were obtained by evaluating the other analog channels under the substantially similar transmission conditions, i.e., with and without coherent channel signals over the same fiber.

FIG. 68B is a graphical illustration of a comparative plot 7002 of BER against modulation format for the coherent channels transmitted by subsystem 6600, FIG. 66. More specifically, and also for the system setup of subsystem 6600, the BER transmission performance of coherent channel CH 26 illustrates that only a minor BER difference is observed for 8 QAM-based and 16 QAM-based 200 Gbps channels, at 0-dBm transmitter output power. That is, in contrast to plot 7000, which illustrates the impact of coherent channels on analog channels, plot 7002 illustrates the reverse case of the impact of analog channels on coherent channels. Nevertheless, when compared with back-to-back coherent signal sensitivity, a power penalty less than 0.5-dB is found for the coherent transmission having an analog channel overlay through amplification by EDFA 6614 over the same fiber (e.g., optical fiber 6606).

FIG. 69 is a graphical illustration of a comparative optical spectrum plot 6900. More specifically, optical spectrum plot 6900 represents power over wavelength for an analog-plus-OOK-plus-coherent coexistence using a 16-port multiplexer. As depicted in FIG. 69, plot 6900 illustrates the optical spectrum distribution of analog signals 6902 (e.g., eight channels), coherent CFP2 signals 6904 (e.g., two coherent CFP2-DCO channels), coherent 400 G signals 6906 (e.g., two coherent channels), and NRZ signals 6908 (e.g., two 10 G NRZ channels), all coexisting in a transmission over the same optical fiber.

As shown in FIG. 69, an effective coexistence hybrid scheme is provided by the present systems and methods, which is shown to include essentially all the major modulation formats in use today, as well as services under different data rates/baud rates. To generate the test results depicted in FIG. 69, a pair of 16-channel TFF-based WDMs were used for channel multiplexing and demultiplexing.

Further to this testing example, the corresponding input power level, i.e., the power at the output port of each transmitter before entering the WDM Mux, was measured for several typical operating conditions, and for different detection schemes. The results of these measurements, namely, the optical transmitted power of the analog, OOK, and coherent signals, are shown below Table 3.

TABLE 3

| Application Scenarios | Channel Index | Input Power (dBm) |
|---|---|---|
| DOCSIS Analog | 21 | 9.64 |
|  | 24 | 9.48 |
|  | 28 | 9.43 |
|  | 33 | 9.64 |
|  | 39 | 9.48 |
|  | 52 | 9.11 |
|  | 60 | 9.01 |
|  | 62 | 8.92 |
| 400G Coherent | 22 | 2.68 |
|  | 61 | 3.15 |
| CFP2 Coherent | 36 | 0.08 |
|  | 44 | −0.14 |
| 10G NRZ | 26 | −0.89 |
|  | 57 | −0.75 |

For the measurements shown in Table 3, the power level for the analog channels was set to approximately 9.5 dBm, and the power level for the 56-GBaud 400 G coherent channels was set to approximately 3 dBm. To improve the spectral efficiency and confine the optical power within each WDM channel, in some embodiments, the coherent signals may be further shaped using square root raised cosine filters.

FIG. 70 is a graphical illustration of a comparative plot 7000 of normalized power penalty against data rate. More specifically, plot 7000 represents an alternative demonstration for the analog-plus-OOK-plus-coherent coexistence scheme depicted in FIG. 69, and also using a 16-port multiplexer. In the example depicted in FIG. 70, plot 7000 illustrates the normalized power requirements (i.e., penalties) for net data rates of 200 G, 300 G, and 400 G. Plot 7000 further illustrates these experimental results, with respect to coherent channels, for back-to-back (B2B) operation, and for 50-km transmission with and without coexistence of analog-plus-NRZ channels. As can be seen from FIG. 70, the performance difference is insignificant for the analog channels, in comparison with coexistence schemes using an 8-port Mux. That is, a power penalty of less than 0.6 dB was observed in the coexistence scenarios relative to the non-coexistence scenarios.

Coherent Optics Access Interfaces

The typical optical access network includes some components that are generally considered to be fundamental. In this regard, "fundamental" refers to those components that have been heretofore most widely used in the access network, and which are expected to play a significant role in the access networks of the future. Such components are generally grouped into three categories: (1) the optical transmitter; (2) the optical channel; and (3) the optical receiver. Optical transceivers may typically include both an optical transmitter and an optical receiver. These components are described further below with respect to the following embodiments.

FIG. 71 is a schematic illustration of a transceiver 7100 having a dual optical interface structure. In the embodiment depicted in FIG. 71, transceiver 7100 is disposed with respect to an electrical client side 7102 (or host side 7102) and an optical line side 7104. In this example, transceiver 7100 includes an electrical receive interface 7106 and an electrical transmit interface 7108 at client side 7102, and optical transmit interface 7110 and an optical receive interface 7112 at line side 7104. That is, client side/host side 7102 corresponds to electrical interfaces 7106, 7108, and line side 7104 corresponds to optical interfaces 7110, 7112. In an exemplary embodiment, transceiver 7100 further includes a management interface 7114 in communication with a control layer 7116 of transceiver 7100.

Dual optical interface transceiver 7100 thus utilizes separate optical interfaces 7110, 7112 capable of operable communication with the transmit and receive functions of transmitter and receiver portions 7118 of transceiver 7100, respectively. In an embodiment, transceiver 7100 further includes a framing unit 7120 in communication with electrical interfaces 7106 and 7108 at host side 7102 (e.g., a 100 Gb Ethernet physical coding sublayer (PCS) 7122 and/or an optional optical transport unit (OTN) 7124).

FIG. 72 is a schematic illustration of a transceiver 7200 having a single optical interface structure. In the embodiment depicted in FIG. 72, transceiver 7200 is similar to transceiver 7100, FIG. 71, and is similarly disposed with respect to an electrical client/host side 7202 and an optical line side 7204, and includes both an electrical receive interface 7206 and an electrical transmit interface 7208 at client side 7202. Transceiver 7200 differs from transceiver 7100 though, in that transceiver 7200 includes a single optical interface 7210 at line side 7204. Optical interface 7210 is further able to communicate with a directional element 7212 of transceiver 7200, and is also capable of functionally directing transmitted and received optical signals between the respective transmitter and receiver portions 7214 of transceiver 7200.

In an exemplary embodiment, transceiver 7200 still further includes a management interface 7216 in communication with a control layer 7218 of transceiver 7200. In some embodiments, transceiver 7200 also similarly includes a framing unit 7220 in communication with electrical interfaces 7206 and 7208 at host side 7202 (e.g., a 100 Gb Ethernet PCS 1122 and/or an optional optical transport unit 7224).

Implementation of the single optical interface structure of transceiver 7200 is particularly useful in the case where only a single fiber is available from the hub to the node. In such cases, signal direction functionality may be incorporated into transceiver 7200 (e.g., by directional element 7212) to enable the transmitter optical signal (i.e., Opt. Tx) to be directed to the single optical interface (i.e., optical interface 7210), while enabling the receiver optical signal (i.e., Opt. Rx), incoming through the single optical interface, to be directed to the respective receiver of transmitter/receiver portions 7214, with a performance impact that is expected to be negligible, and while also utilizing the same communication frequency in both the transmit and receive directions.

Further architectural considerations using a single interface transceiver are described functionally below with respect to FIGS. 73 and 74, which are provided for illustration purposes, but not in a limiting sense. Other transmitter and receiver implementations, used for similar purposes, may follow different sequences and different feedback dependencies.

FIG. 73 is a functional schematic illustration of a transmitter 7300. In an exemplary embodiment, transmitter 7300 is configured to perform relevant transmitter functions occurring, for example, in a coherent optical transceiver (e.g., transceiver 7100, FIG. 71, transceiver 7200, FIG. 72) from the electrical input on the host side (e.g., host side 7102, FIG. 71, host side 7202, FIG. 72) to the optical output on the line side (e.g., line side 7104, FIG. 71, line side 7204, FIG. 72).

In exemplary operation, transmitter 7300 includes one or more functional units, which may operate in the order listed, or in some cases in a different order, and which may be individually implemented by hardware elements, software modules, or by combinations of hardware and software. In some embodiments, transmitter 7300 may include fewer functional units, or additional functional units to those described herein, without departing from the scope of this description.

Transmitter 7300 may, for example, include without limitation one or more of an Ethernet mapping and optional optical transport network (OTN) framing unit 7302, an FEC coding unit 7304, a symbol mapping unit 7306, a linear and nonlinear pre-emphasis unit 7308, a DAC unit 7310, an IQ modulation and polarization combining unit 7310, and an optional directional element unit 7314. That is, directional element unit 7314 may be implemented in the case of a single optical interface transceiver (e.g., transceiver 7200, FIG. 72), but may not be needed in the case of a dual optical interface transceiver (e.g., transceiver 7100, FIG. 71).

In an exemplary embodiment, the optical signal transmitted through transmitter 7300 may be described using parameters including, without limitation, one or more of the encoding scheme, line rate, polarization imbalance, quadrature and polarization skew, transmitter clock jitter, frequency tolerance, optical output power, laser wavelength, laser linewidth, and transmitter OSNR. The optical distribution medium of the access network (e.g., cable environment, telecommunication environment, etc.) may include various elements over the respective link, including one or more of an optical fiber, optical splitters, optical circulators, wavelength multiplexers, wavelength demultiplexers, and other optical passive components. Various impairments that may impact the optical signals traversing the link may include optical loss or gain, chromatic dispersion, polarization mode dispersion (PMD), polarization dependent loss, polarization rotation, optical crosstalk, and optical SNR degradation.

An optical signal that is generated by such an "imperfect" implementation of transmitter 7300 may be further degraded by one or more impairments from the optical distribution medium, such as those entering the line side of the transceiver (e.g., transceiver 7100, FIG. 71, transceiver 7200, FIG. 72) for detection, compensation and processing by a receiver portion thereof. An exemplary receiver configuration is described further below with respect to FIG. 74.

FIG. 74 is a functional schematic illustration of a receiver 7400. In an exemplary embodiment, receiver 7400 is configured to perform relevant receiver functions occurring, for example, in the coherent optical transceiver (e.g., transceiver 7100, FIG. 71, transceiver 7200, FIG. 72) from the optical input on the line side (e.g., line side 7104, FIG. 71, line side 7204, FIG. 72) to the electrical output on the host side (e.g., host side 7102, FIG. 71, host side 7202, FIG. 72). In exemplary operation, receiver 7400 includes one or more functional units which generally correspond to relevant functional units of transmitter 7300, FIG. 73, and which may similarly operate in the order listed, or in a different order, and may be individually implemented by hardware elements, software modules, or by combinations of hardware and software.

The receiver functional units may include, without limitation, one or more of an optional directional element unit 7402 (e.g., in the case of a single optical interface transceiver such as transceiver 7200, FIG. 72), a detection unit 7404 for detecting I and Q orthogonal channels for each X and Y polarizations, an ADC unit 7406, a deskew and orthogonality compensation unit 7408, a chromatic dispersion estimation and compensation unit 7410, a PMD compensation and polarization multiplexing unit 7412, a clock recovery unit 7414, a carrier frequency offset estimation and compensation unit 7416, a carrier phase estimation and compensation unit 7418, a symbol demapping unit 7420, an FEC decoding unit 7422, and an Ethernet demapping and optional OTN framing unit 7424. In an embodiment, receiver 7400 may include one or more feedback channels 7426 to ADC unit 7406, from one or more of units 7408, 7410, 7412, 7414, respectively.

In an exemplary embodiment, the optical signal processed through receiver 7400 may be described using parameters including, without limitation, one or more of the modulation, symbol rate, symbol mapping, FEC, line rate, encoding scheme, frequency tolerance, frame format and mapping, optical input power, laser wavelength, laser linewidth, receiver OSNR, polarization imbalance, quadrature and polarization skew, transmitter clock jitter, chromatic dispersion, polarization dispersion, and polarization rotation (SoP track).

With respect to both transmitter 7300 and receiver 7400, some general transceiver characteristics may also be considered, such as (i) the end-to-end link latency, which includes both the transmitter and receiver latencies, as well as the transmission delay of the optical channel, and (ii) the reflectances of the transmitter and receiver optical interfaces, which are characterized by its optical return loss. Additionally, the operation of the transceiver may also be impacted by the ambient temperature, for which some additional compensation may be desirable. With respect to receiver 7400 in particular, the present systems and methods may further utilize the data reacquisition time as a useful metric to indicate the time the receiver takes to turn back on after loss of signal.

With respect to the optical ports and frequencies of the transceivers described above (e.g., transceiver 7100, FIG. 71, transceiver 7200, FIG. 72), these transceivers may be configured to have either one or two optical ports to handle the respective transmit and receive functions. A transceiver having two separate transmit and receive ports, for example, may use the same frequency. In an exemplary embodiment, a transceiver may use a single port for both transmit and receive, either by using two separate frequencies, or through bi-directional transmission on a single fiber at the same frequency. In at least one embodiment, a two-frequency, two-port solution is achieved through a hybrid implementation of these approaches. In some cases, a single optical interface transceiver may relax some of its minor requirements relative to those provided for a dual optical interface transceiver.

Accordingly, a transceiver according to the above embodiments is expected to support either one or two optical ports for transmit and receive functions, and also to support use of the same frequency for transmit and receive functions. Nevertheless, the transceiver may be further configured to support transmitting and receiving on two different frequencies.

That is, referring back to FIGS. 71 and 72, two different line side interface options are described herein, namely, a dual optical interface option (e.g., transceiver 7100), and a single optical interface option (e.g. transceiver 7200). According to the present systems and methods, either interface option is capable of supporting a single frequency for transmitting and receiving, on the one hand, or separate frequencies for transmitting and receiving come on the other hand. Thus, the present embodiments are configured to support both line side interface options. In an exemplary embodiment, the transceiver is configured to support use of the same frequency for transmitting and receiving, and may further be optionally configured to be capable of supporting transmitting and receiving using different frequencies.

The transmitter optical output power is defined as the total optical launch power, measured in dBm, from the output port of a transceiver in operation, and this parameter may be measured with a calibrated optical power meter (OPM) capable of power measurement, for example, in the 1550 nm wavelength range. During a transmitter startup (e.g., power up, power down, or a change of wavelength sequence), the transmitter may generate "fast transients," such as sudden spikes in power across a range of frequencies, which may briefly impact any operating channels that are on the same optical plant as the starting up transceiver. Accordingly, in at least one embodiment, the present transceiver may be further configured with blanking capability, which enables the transceiver to suppress optical output until, for example, the transceiver output has stabilized. Accordingly, different transmit power requirements may be provided for the dual optical interface and single optical interface approaches, namely, to account for the loss incurred by the directional element within the single optical interface transceiver.

For example, in the exemplary case of a transceiver supporting the present dual optical interface approach, the transceiver may be configured to support a transmitter optical output power of at least −6 dBm (or higher). In contrast, in the case of a transceiver supporting the present single optical interface approach, the transceiver may be configured to support a transmitter optical output power of −6.75 dBm or higher. Consistent with the operation of the several embodiments described herein, the transceiver may be still further configured to prevent a transmitter optical output power above a particular desired value (e.g., +7 dBm or higher).

In some embodiments, the transceiver may be further configured to include capability to: (i) report its minimum and maximum supported optical output powers; (ii) report its transmitter optical output power with an accuracy of ±1.5 dB; (iii) optionally support adjustment of its transmitter optical output power (e.g., adjustments in steps of 0.1 dB); and (iv) optionally support blanking to protect the optical plant during startup.

Under other conditions, such as in the case of an optical amplifier being close to the receiving transceiver, the optical received power may be considered relatively high, but the OSNR may be considered to be relatively low in comparison. This discrepancy may occur due to the noise added by optical amplification, and because optical amplifiers may boost both of the signal and the noise power levels. In this case, the transceiver will be limited by its sensitivity to OSNR, rather than power, which is referred to as an "OSNR-limited case," and represents a baseline requirement for received OSNR.

In addition to the baseline received OSNR requirement that applies to the dual optical interface transceiver option, an adjustment (described above) in the receive power requirement of the single optical interface option may also be introduced to account for the loss incurred by directional elements within the transceiver to enable the single optical interface option.

Accordingly, where the transceiver supports dual optical interfaces, the transceiver may be configured, for example, to achieve a post-FEC BER of $\leq 10^{-15}$ when the link OSNR is $\geq 14.5$ dB and the received optical power is $\geq -10$ dBm (i.e., the "baseline received optical power requirement"). In contrast, where the transceiver supports a single optical interface, the transceiver may be alternatively configured to achieve a post-FEC BER of $\leq 10^{-15}$ when the link OSNR is $\geq 14.5$ dB and the received optical power is $\geq -9.25$ dBm (i.e., the "baseline received OSNR requirement"). In these examples, the transceiver may thus be further configured to report the received OSNR.

In some implementations of the single optical interface transceiver approach described herein, a performance degradation in OSNR (i.e., received OSNR penalty) may occur due to discrete optical reflections and from back scattering caused by fiber imperfections. High-quality fiber splicing, cleanliness of fiber-optic connector mating surfaces, and the use of angle-polished connectors, for example, may contribute to a lower back reflection power. Thus, in an optical link using a single optical interface transceiver, a 0.5 dB penalty in link OSNR may be observed with an aggregate back reflection power of $-33$ dBm over a 50-km SMF transmission and a receive optical power of $\geq -20$ dBm. In this scenario, a link OSNR $\geq 15$ dB may be desirable to address this reflection impairment.

Based on the systems and methods described herein, and as verified by the innovative testing schemes demonstrating proofs of concept thereof, several coexistence measurement experiments confirmed that: (i) both coherent and analog/NRZ signals work may be effectively configured to coexist, with approximately a 0.6-dB maximum power penalty in the case of 100-GHz channel spacing and 50/80-km fiber transmission distance; (ii) legacy analog system components and devices (e.g., analog EDFA, optical Mux/DeMux) may be effectively configured for multiplexing and amplification of coherent signals, which exhibit strong robustness when deployed with traditional analog DWDM transmission; and (iii) conventional AWG-based optical Mux and DeMux, which are conventionally used for coherent channels, are undesirable for use with conventional analog channels.

Therefore, as the industry evolves toward Node+0 architectures, the volume of optical connections to intelligent nodes will increase substantially in comparison with conventional, traditional architectures. The present coherent optics technology-based systems and methods though, offer future-proofing solutions that will be of particular value for cable operators to meet bandwidth demand without having to retrench new fibers.

As described herein, extensive experimental verification under different coexistence scenarios provides significant operational and deployment guidance for the use cases described, and for similar use cases that would be understood by persons of ordinary skill in the art. These experimental results demonstrate that coherent optics transmissions are robust, even in close proximity to much stronger analog and intensity-modulated optical carriers. According to these advantageous embodiments, cable operators are effectively enabled to support 100 G (or higher) coherent channels on existing cable access networks without significant performance degradation.

Exemplary embodiments of full duplex coherent optics systems and methods for communication networks are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A full duplex communication network, comprising:
   a first coherent optics transceiver having a first transmitting portion, a first receiving portion, and a control layer;
   a second coherent optics transceiver having a second transmitting portion and a second receiving portion;
   an optical transport medium operably coupling the first coherent optics transceiver to the second coherent optics transceiver; and
   a coherent optics interface disposed within the first coherent optics transceiver, and including (i) a lineside interface portion, (ii) a clientside interface portion, and (iii) a management interface portion in communication with the control layer separately from the lineside interface portion and the clientside interface portion,
   wherein the clientside interface portion is in electrical communication with the first transmitting portion and the first receiving portion,
   wherein the lineside interface portion comprises a directional element disposed between (i) the optical transport medium, and (ii) the first transmitting portion and the first receiving portion, such that the directional element provides a dual optical communication interface with the first transmitting portion and the first receiving portion, respectively, and a single optical communication interface with the optical transport medium.

2. The network of claim 1, wherein the optical transport medium is a single mode fiber.

3. The network of claim 1, wherein at least one of the first transmitting portion and the second transmitting portion comprises a coherent modulator.

4. The network of claim 3, wherein the coherent modulator is configured to convert an electrical signal from the clientside interface portion into at least one coherent optical carrier for transmission to the lineside interface portion over the optical transport medium through the directional element.

5. The network of claim 1, wherein at least one of the first receiving portion and the second receiving portion comprises a coherent detector.

6. The network of claim 5, wherein the coherent detector is configured to convert the at least one coherent optical carrier from the optical transport medium into an electrical signal within the coherent optics interface.

7. The network of claim 1, wherein the first transmitting portion comprises at least one of an Ethernet mapping unit, an optical transport network (OTN) framing unit, a forward error correction (FEC) coding unit, a symbol mapping unit, a linear and nonlinear pre-emphasis unit, a digital-to-analog converter, and an I/Q modulation and polarization combining unit.

8. The network of claim 7, wherein the first receiving portion comprises at least one of an I/Q detection unit, an analog-to-digital converter, a deskew and orthogonality compensation unit, a chromatic dispersion compensation unit, a polarization mode dispersion compensation unit, a polarization multiplexing unit, a clock recovery unit, a carrier frequency offset compensation unit, a carrier phase compensation unit, a symbol demapping unit, an FEC decoding unit, an Ethernet demapping unit, and an OTN framing unit.

9. The network of claim 1, wherein the first transceiver further comprises a framing unit in operable communication with the clientside interface portion and the control layer.

10. The network of claim 9, wherein the framing unit further comprises at least one of a physical coding sublayer and an optical transport unit.

11. The network of claim 9, wherein the framing unit is disposed between (i) the clientside interface portion, and (ii) the first transmitting portion and the first receiving portion.

12. The network of claim 9, wherein the first transmitting portion and the first receiving portion are in separate communication with the framing unit and the control layer.

13. An interface subsystem for a coherent optical transceiver, comprising:
   a directional element for optical communication with;
   an optical transmitter for transmitting optical signals to an optical transport medium;
   an optical receiver for receiving optical signals from the optical transport medium;
   a control layer;
   an electrical interface portion in communication with the coherent optical transceiver on a host side of the interface subsystem;
   a management interface portion in operable communication with the control layer; and
   an optical interface portion disposed between (i) the optical transmitter and the optical receiver, and (ii) the optical transport medium, on a line side of the interface subsystem,
   wherein the optical interface portion comprises a single interface structure to the optical transport medium, and a respective dual interface structure to the optical transmitter and the optical receiver.

14. The interface subsystem of claim 13, wherein the optical interface portion further comprises a directional element in optical communication with the optical transport medium, the optical transmitter, and the optical receiver.

15. The interface subsystem of claim 13, further comprising a framing unit disposed between (i) the electrical interface portion, and (ii) the optical transmitter and the optical receiver.

* * * * *